United States Patent
Zhang et al.

(10) Patent No.: US 11,930,469 B2
(45) Date of Patent: Mar. 12, 2024

(54) TIMING ADVANCE IN FULL-DUPLEX COMMUNICATION

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 17/410,909

(22) Filed: Aug. 24, 2021

(65) Prior Publication Data

US 2022/0078734 A1    Mar. 10, 2022

Related U.S. Application Data

(60) Provisional application No. 63/074,950, filed on Sep. 4, 2020, provisional application No. 63/074,910, filed on Sep. 4, 2020.

(51) Int. Cl.
*H04W 56/00* (2009.01)
*H04L 5/14* (2006.01)
(Continued)

(52) U.S. Cl.
CPC ............ *H04W 56/005* (2013.01); *H04L 5/14* (2013.01); *H04W 24/10* (2013.01); *H04W 74/006* (2013.01); *H04W 88/06* (2013.01)

(58) Field of Classification Search
None
See application file for complete search history.

(56) References Cited

U.S. PATENT DOCUMENTS 10,567,202 B2 *   2/2020  Kishiyama ............ H04L 5/0007
11,184,144 B2 *  11/2021  Choi .................... H04L 5/14
(Continued)

OTHER PUBLICATIONS

Huawei., et al., "Enhancements for Simultaneous Operation of MT and DU", 3GPP TSG RAN WG1 Meeting #102-e, 3GPP Draft, R1-2005261, 3rd Generation Partnership Project (3GPP), Mobile Competence Centre, 650, Route Des Lucioles, F-06921 Sophia-Antipolis Cedex, France, vol. RAN WG1, No. E-meeting, Aug. 17, 2020-Aug. 28, 2020, Aug. 8, 2020 (Aug. 8, 2020), 11 Pages, XP051917309, Retrieved from the Internet: URL: https://www.3gpp.org/ftp/tsg_ran/WG1_RL1/TSGR1_102-e/Docs/R1-2005261.zip—[retrieved on Aug. 8, 2020], Paragraph [02.3]—Paragraph [02.4].

(Continued)

*Primary Examiner* — Kodzovi Acolatse
*Assistant Examiner* — Anindita Sen
(74) *Attorney, Agent, or Firm* — Patterson + Sheridan, LLP

(57) ABSTRACT

Aspects of the disclosure relate to a user equipment (UE) that receives a timing advance command from a network access node, sends a value indicative of a timing advance capability to the network access node, adjusts a timing advance indicated by the timing advance command based on the timing advance capability to yield an adjusted timing advance, and transmits an uplink signal to the network access node using the adjusted timing advance. Further aspects relate to a network access node that transmits a timing advance command to a user equipment (UE), receives a value indicative of a timing advance capability of the UE, and receives an uplink signal adjusted by a timing advance according to the timing advance capability of the UE. The timing advance capability may indicate that the UE has, or does not have, a capability to adjust the timing advance indicated by the timing advance command.

28 Claims, 33 Drawing Sheets

(51) Int. Cl.
*H04W 24/10* (2009.01)
*H04W 74/00* (2009.01)
*H04W 88/06* (2009.01)

(56) References Cited

U.S. PATENT DOCUMENTS

| | | | |
|---|---|---|---|
| 2014/0198773 A1 | 7/2014 | Yin et al. | |
| 2018/0279334 A1* | 9/2018 | Lim | H04L 27/2607 |
| 2020/0235980 A1 | 7/2020 | John Wilson et al. | H04L 5/143 |
| 2021/0329660 A1* | 10/2021 | Zhang | H04W 72/0446 |
| 2022/0182160 A1* | 6/2022 | Su | H04L 27/2691 |

OTHER PUBLICATIONS

International Search Report and Written Opinion—PCT/US2021/047570—ISA/EPO—dated Dec. 10, 2021.

Qualcomm Incorporated: "On Enhancements for Simultaneous Operation of IAB-Node's Child and Parent Links", 3GPP TSG RAN WG1 Meeting #102-e, 3GPP Draft, R1-2006826, 3rd Generation Partnership Project (3GPP), Mobile Competence Centre, 650, Route Des Lucioles, F-06921 Sophia-Antipolis Cedex, France, vol. RAN WG1, No. Aug. 17, 2020-Aug. 28, 2020, Aug. 8, 2020 (Aug. 8, 2020), 5 Pages, XP051918276.

* cited by examiner

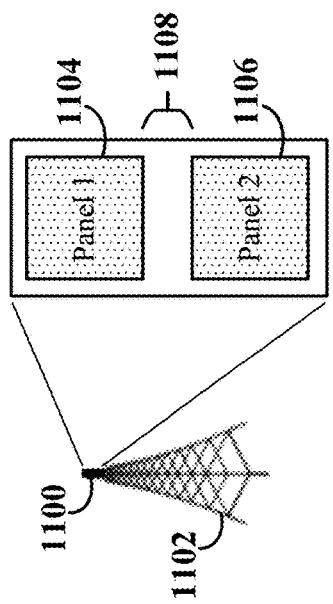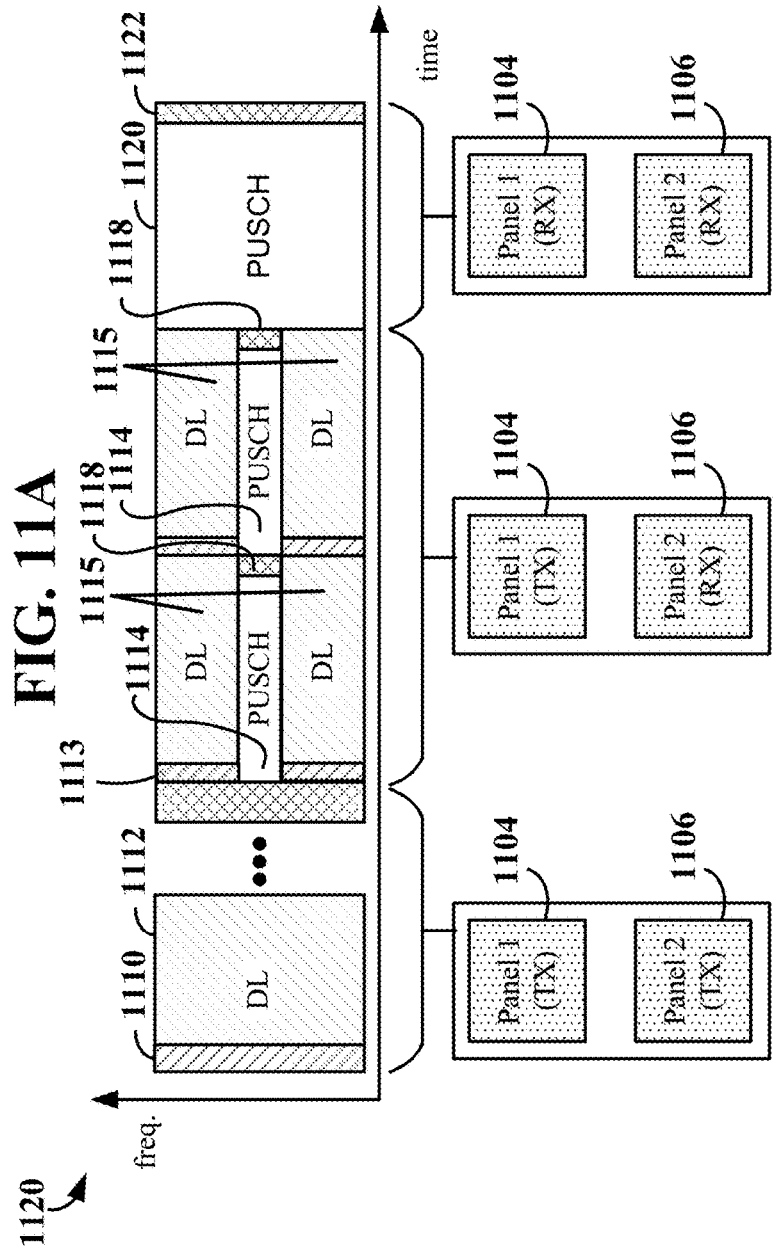
FIG. 11A
FIG. 11B

TIMING ADVANCE IN FULL-DUPLEX COMMUNICATION

CROSS-REFERENCE TO RELATED APPLICATIONS

This application claims benefit of and priority to U.S. Provisional Application Nos. 63/074,910 and 63/074,950, filed Sep. 4, 2020, both of which are hereby assigned to the assignee hereof and hereby expressly incorporated by reference herein in their entirety as if fully set forth below and for all applicable purposes.

TECHNICAL FIELD

The technology discussed below relates generally to wireless communication networks, and more particularly, to techniques for timing alignment in full-duplex (FD) wireless communications.

INTRODUCTION

In wireless communication systems, such as those specified under standards for 5G New Radio (NR), a base station and user equipment (UE) exchange signals using various duplex modes. Duplex modes include half-duplex and full-duplex. In half-duplex communication, only one node (e.g., UE or base station) can transmit or receive at a given time. In full-duplex communication, two nodes (e.g., UE and base station) can transmit and receive at the same time (e.g., simultaneous transmission and reception between at least two nodes). An example of half-duplex communication is time division duplex (TDD) communication. In 5G NR TDD, uplink signaling (e.g., from a UE to a base station) and downlink signaling (e.g., form the base station to the UE) are separately scheduled in time. Thus, uplink and downlink communications do not occur simultaneously. However, uplink and downlink communications may be transmitted on the same frequencies (e.g., on the same carrier). An example of full-duplex communication is frequency division duplex (FDD) communication. In 5G NR FDD, uplink signaling and downlink signaling are simultaneously scheduled in time; however, uplink and downlink may be transmitted at different frequencies (e.g., on different and spaced apart carriers). Examples of full-duplex (FD) modes of communication include, but are not limited to, sub-band full-duplex (SBFD), in-band full-duplex (IBFD), flexible TDD, partial frequency division duplex (FDD) communication (where uplink signaling and downlink signaling are simultaneously scheduled in time and may be transmitted on partially overlapped frequencies), and other FD modes of communication in which uplink and downlink signaling are simultaneously scheduled in time and may be transmitted on the same fully overlapped frequencies.

Base stations and UEs may be configured to operate in FD mode when they are each configured with two or more antenna panels. An antenna panel includes an array of a plurality of antenna elements. The antenna panel may be referred to as an antenna array module. Antenna panels may be used in beamforming applications. Beamforming may be used to provide spatial diversity between receivers and transmitters. For example, a base station with two antenna panels may direct a transmit beam to a first UE and direct a receive beam toward a second UE, where the first and second UE are at different azimuths relative to the base station. The beams do not interfere with each other because they are directed toward targets that are separated from each other by some angular distance relative to the base station. In another example, a base station and a UE may each have two panels; one panel for transmission and a second panel for reception. Even though the two panels on each device are co-located, full-duplex simultaneous reception and transmission may be achieved in the FD mode.

To provide service to a plurality of UEs at a plurality of distances from a base station, the timing between uplink and downlink frames for each UE may be managed. For example, a base station may compensate for propagation delay between the base station and each of the UEs by determining a respective timing advance for each of the UEs to utilize for uplink transmissions to the base station.

Brief Summary of Some Examples

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

The disclosure relates in some aspects to a method for timing alignment of signals in a wireless communication system. In particular, the method, performed by a base station, includes determining that at least a user equipment (UE) in the wireless communication system is operating in a full-duplex (FD) mode with the base station. Further, the method includes sending a timing advance (TA) indication for the UE, wherein the TA indication indicates a selection of one of a fixed TA value or a TA value range to be used by the UE while operating in the FD mode.

In some aspects, a base station is disclosed. The base station includes a transceiver; a memory; and a processor communicatively coupled to the transceiver and the memory, wherein the processor and the memory are configured to: determine that at least a user equipment (UE) in a wireless communication system is operating in a full-duplex (FD) mode with the base station, and send, from the base station, a timing advance (TA) indication for the UE, wherein the TA indication indicates a selection of one of a fixed TA value and a TA value range to be used by the UE while operating in the FD mode.

In some aspects, a base station is disclosed. The base station may comprise means for determining that at least a user equipment (UE) in the wireless communication system is operating in a full-duplex (FD) mode with the base station; and means for sending a timing advance (TA) indication for the UE, wherein the TA indication indicates a selection of one of a fixed TA value and a TA value range to be used by the UE during FD mode.

In some aspects, a non-transitory computer-readable medium is disclosed. The non-transitory computer-readable medium includes instructions executable by one or more processors of a user equipment (UE) to: determine at least a user equipment (UE) in the wireless communication system is operating in a full-duplex (FD) mode with the base station and send a timing advance (TA) indication for the UE, wherein the TA indication indicates a selection of one of a fixed TA value or a TA value range to be used by the UE while operating in the FD mode.

In some aspects, a method, performed by a user equipment (UE), for timing alignment of signals in a wireless communication system is disclosed. The method includes receiving, from the base station, a timing advance (TA) indication for the UE, wherein the TA indication indicates a selection of one of a fixed TA value or a TA value range is to be used by the UE while operating in a full-duplex (FD). Further, the method includes transmitting one or more uplink signals to the base station at a timing advance based on the fixed TA value or the TA value range.

In some aspects, a user equipment (UE) is disclosed. The UE includes a transceiver; a memory; and a processor communicatively coupled to the transceiver and the memory, wherein the processor and the memory are configured to: receive, from a base station, a timing advance (TA) indication for the UE, wherein the TA indication indicates a selection of one of a fixed TA value or a TA value range is to be used by the UE memory comprising executable instructions and one or more processors configured to execute the executable instructions and cause the base station to. The processor and memory are also configured to transmit one or more uplink signals to the base station at a timing advance based on the fixed TA value or the TA value range.

In some aspects, a user equipment (UE) is disclosed, including means for receiving, from a base station, a timing advance (TA) indication for the UE, wherein the TA indication indicates a selection of one of a fixed TA value or a TA value range is to be used by the UE during FD mode. The UE also includes means for transmitting one or more uplink signals to the base station at a timing advance based on the fixed TA value or the TA value range.

In some aspects, a non-transitory computer-readable medium is disclosed. The non-transitory computer-readable medium includes instructions executable by one or more processors of a user equipment (UE) to: receive, from the base station, a timing advance (TA) indication for the UE, wherein the TA indication indicates a selection of one of a fixed TA value or a TA value range is to be used by the UE while operating in a full-duplex (FD) and transmit one or more uplink signals to the base station at a timing advance based on the fixed TA value or the TA value range.

The disclosure relates in some aspects to techniques for adjusting timing advances provisioned to UEs in timing advance commands sent from a base station. In one example, a method of wireless communication by a user equipment (UE) in a wireless communication network is described. The method includes receiving a timing advance command from a network access node, sending a value indicative of a timing advance capability to the network access node, adjusting a timing advance indicated by the timing advance command based on the timing advance capability to yield an adjusted timing advance, and transmitting an uplink signal to the network access node using the adjusted timing advance.

In some aspects, a user equipment (UE) in a wireless communication network is described. The UE includes a transceiver; a memory; and a processor communicatively coupled to the transceiver and the memory, wherein the processor and the memory are configured to: receive a timing advance command from a network access node, send a value indicative of a timing advance capability to the network access node, adjust a timing advance indicated by the timing advance command based on the timing advance capability to yield an adjusted timing advance, and transmit an uplink signal to the network access node using the adjusted timing advance.

In some aspects, a user equipment (UE) in a wireless communication network is described. In the example, the UE includes means for receiving a timing advance command from a network access node, means for sending a value indicative of a timing advance capability to the network access node, means for adjusting a timing advance indicated by the timing advance command based on the timing advance capability to yield an adjusted timing advance, and means for transmitting an uplink signal to the network access node using the adjusted timing advance.

In some aspects, a non-transitory computer-readable medium is disclosed. The non-transitory computer-readable medium includes instructions executable by one or more processors of a user equipment (UE) to: receive a timing advance command from a network access node, send a value indicative of a timing advance capability to the network access node, adjust a timing advance indicated by the timing advance command based on the timing advance capability to yield an adjusted timing advance, and transmit an uplink signal to the network access node using the adjusted timing advance In some aspects, a method of wireless communication by a user equipment (UE) in a wireless communication network is described. The method includes operating in either a half-duplex (HD) mode or a full-duplex (FD) mode, transmitting an uplink signal, during the HD mode, adjusted by a first timing advance indicated by a first timing advance command, and transmitting the uplink signal, during the FD mode, adjusted by a second timing advance received during an assigned FD mode window, wherein the second timing advance is different from the first timing advance.

In some aspects, a method of wireless communication by a user equipment (UE) in a wireless communication network is described. In the example, the method includes operating in either: a half-duplex (HD) mode, or a full-duplex (FD) mode, receiving a timing advance command comprised of; a timing advance, and a delta value, transmitting an uplink signal, during the HD mode, adjusted by the timing advance, and transmitting the uplink signal, during the FD mode, adjusted by the timing advance and further adjusted by the delta value.

In some aspects, another method of wireless communication by a network access node in a wireless communication network is described. In the example, the method includes transmitting a timing advance command to a user equipment (UE), receiving a value indicative of a timing advance capability of the UE, and receiving an uplink signal adjusted by a timing advance according to the timing advance capability of the UE.

In some aspects, a network access node in a wireless communication network is described. The network access node includes a transceiver; a memory; and a processor communicatively coupled to the transceiver and the memory, wherein the processor and the memory are configured to: transmit a timing advance command to a user equipment (UE), receive a value indicative of a timing advance capability of the UE, and receive an uplink signal adjusted by a timing advance according to the timing advance capability of the UE.

In some aspects, a network access node in a wireless communication network is described. The network access node is described as including means for transmitting a timing advance command to a user equipment (UE), means for receiving a value indicative of a timing advance capability of the UE, and means for receiving an uplink signal adjusted by a timing advance according to the timing advance capability of the UE.

In some aspects, a non-transitory computer-readable medium is disclosed. The non-transitory computer-readable medium includes instructions executable by one or more processors of a user equipment (UE) to: transmit a timing advance command to a user equipment (UE), receive a value indicative of a timing advance capability of the UE, and receive an uplink signal adjusted by a timing advance according to the timing advance capability of the UE.

In some aspects, another method of wireless communication by a network access node in a wireless communication network is described. in the example the method includes transmitting a timing advance command to a user equipment (UE), wherein the timing advance command comprises a first timing advance associated with a half-duplex (HD) mode and a second timing advance associated with a full-duplex (FD) mode, receiving an uplink signal, during the HD mode, adjusted by the first timing advance, and receiving the uplink signal, during the FD mode, adjusted by the second timing advance during an assigned FD mode window, wherein the second timing advance is different from the first timing advance.

In some aspects, a method of wireless communication by a network access node in a wireless communication network is described. In the example, the method includes transmitting a timing advance command comprised of; a first timing advance associated with the HD mode, and a second timing advance associated with the FD mode, and receiving an uplink signal, during the HD mode, adjusted by the first timing advance, and receiving the uplink signal, during the FD mode, adjusted by the second timing advance, wherein the second timing advance is different from the first timing advance.

In some aspects, a method of wireless communication by a network access node in a wireless communication network is described. In the example, the method includes transmitting a timing advance command to a user equipment (UE), wherein the timing advance command comprises a timing advance and a delta value, receiving an uplink signal, during the HD mode, adjusted by the timing advance, and receiving the uplink signal, during the FD mode, adjusted by the timing advance and further adjusted by the delta value.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 11A is a schematic diagram depicting an antenna array atop a tower according to some aspects.

FIG. 11B is a diagram depicting the transmission or reception configuration of two antenna panels.

DETAILED DESCRIPTION

Figure 1:
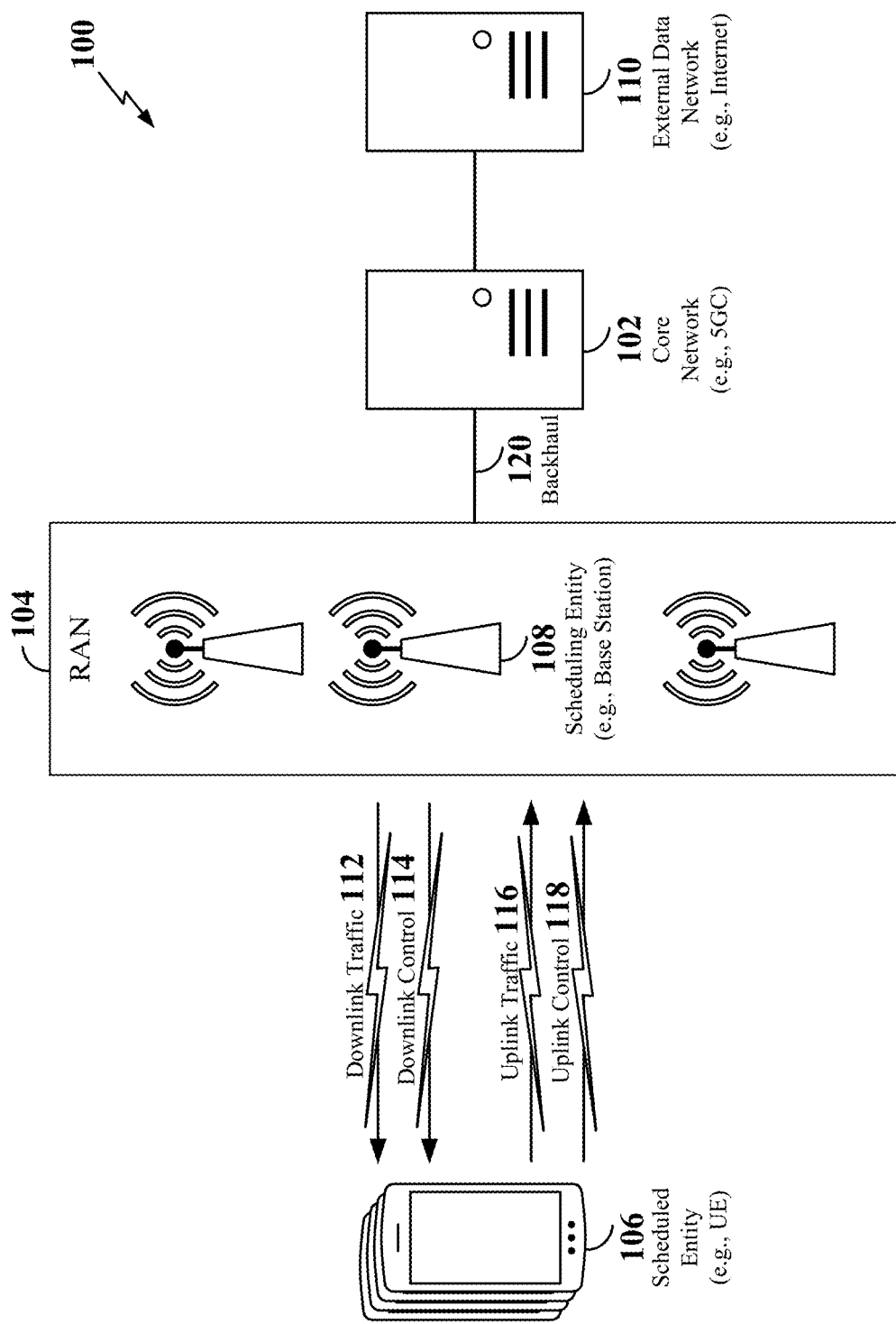
FIG. 1 is a schematic illustration of a wireless communication system according to some aspects.

Aspects of the present disclosure provide apparatus, methods, processing systems, and computer readable mediums for timing alignment in a cell including signaling or indication of the application of either a fixed timing advance (TA) value or a range of TA values. In some cases, timing alignment may be achieved by using techniques known as a timing advance that instructs a user equipment (UE) to either advance or retard its timing relative to a current uplink timing. Generally, timing alignment has been achieved using a fixed TA value.

In some cases, full-duplex (FD) communication may be used by at least one of the UE or a serving base station in which downlink transmission and uplink transmissions are transmitted and received simultaneously. However, FD communication presents certain challenges to maintaining timing alignment based on a fixed TA value. Accordingly aspects of the present disclosure provide techniques whereby the UE may by signaled a range of TA values. In some cases, range of TA values may allow the base station to manage timing differentials that are less than a cyclic prefix (CP), while still affording the UE flexibility to adjust a TA value in consideration timing differentials of the UE.

Further, in addition to being configured to apply timing advance to uplink transmissions (e.g., such as a fixed TA value or range of TA values), UEs according to some aspects described herein, may further be configured with a capability to adjust the timing advances provisioned to UEs in timing advance commands sent from a base station. The capability to adjust the timing advances provisioned to UEs in timing advance commands may further improve latency and spectral efficiency by allowing each UE to fine tune the timing advance provisioned to it by the base station.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a network access node, a transmission and reception point (TRP) or some other suitable terminology. In some examples, a base station may include two or more TRPs that may be co-located or non-co-located. Each TRP may communicate on the same or different carrier frequency within the same or different frequency band.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-topoint transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
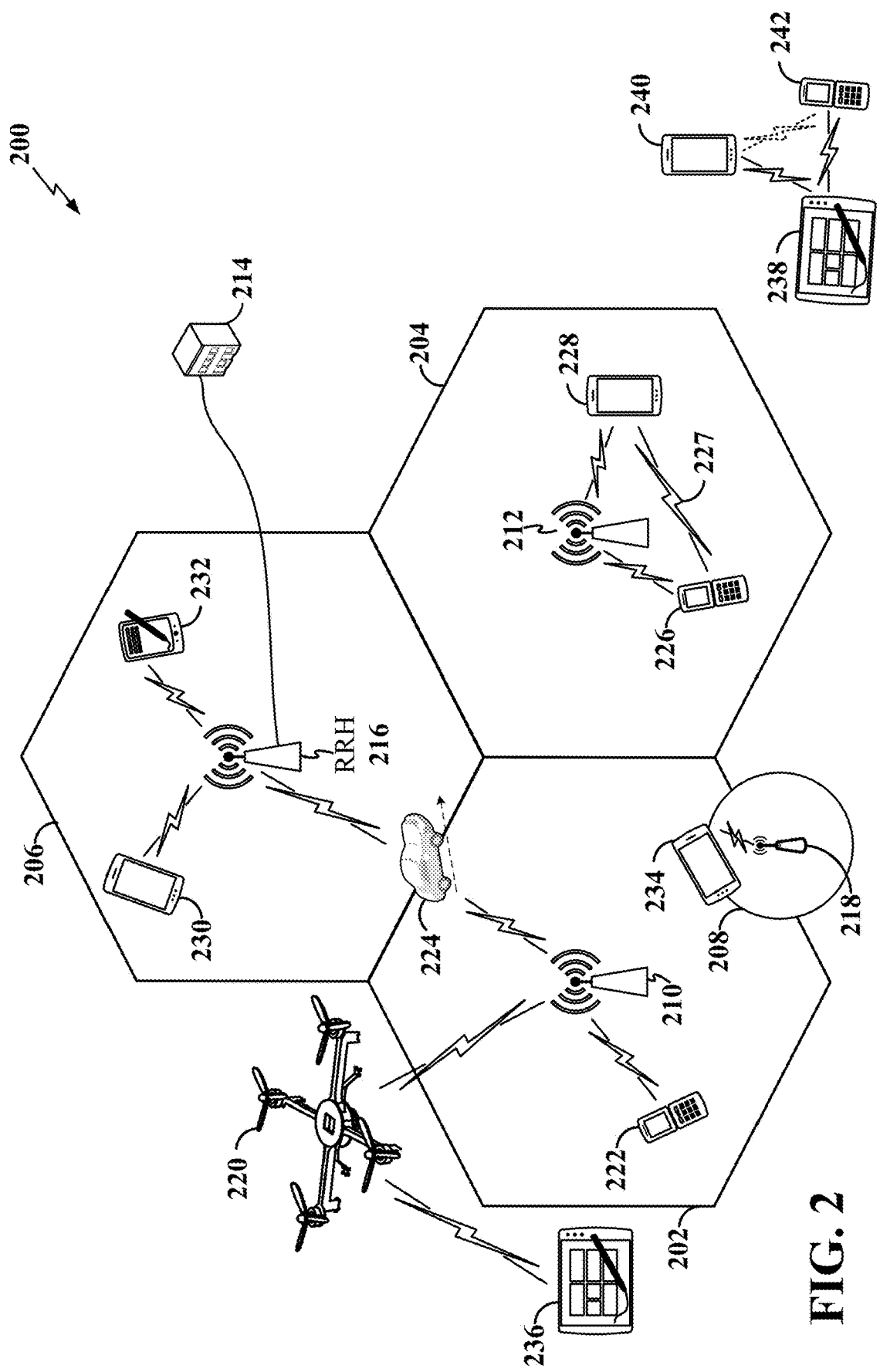
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may each function as a scheduled entity or a non-primary (e.g., secondary) sidelink device. In still another example, a UE may function as a scheduling entity or scheduled entity in a device-to-device (D2D), peer-to-peer (P2P), vehicle-to-vehicle (V2V) network, vehicle-to-everything (V2X) and/or in a mesh network. In a mesh network example, UEs 240 and 242 may optionally communicate directly with one another in addition to communicating with the UE 238 (functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequency implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation, spatial separation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
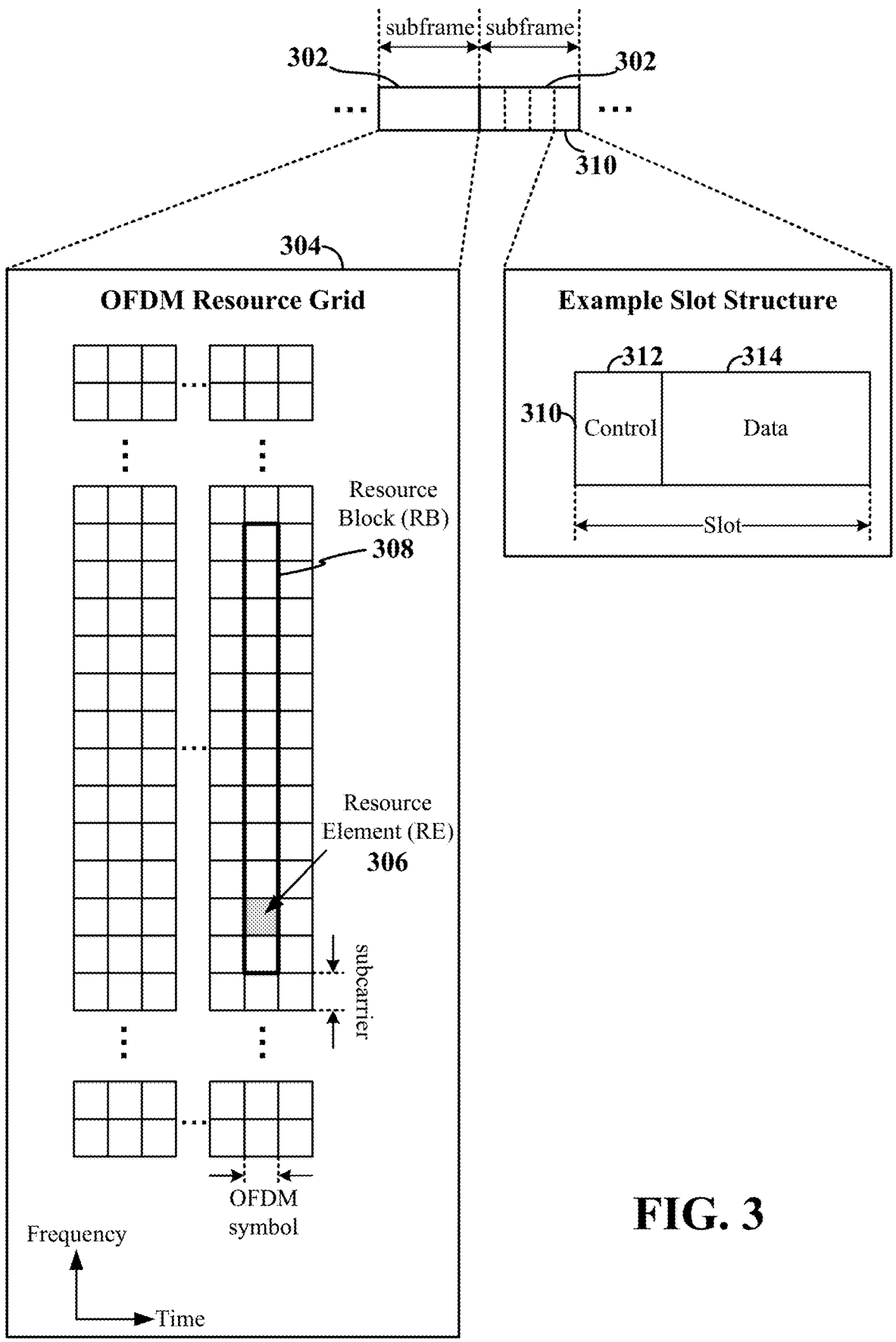
FIG. 3 is a diagram illustrating an example of a frame structure for use in a radio access network according to some aspects.

Referring now to FIG. 3, an expanded view of an example DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more REs 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the DL subframe 302, with some subcarriers illustrated above and below the RB 308. In a given implementation, the DL subframe 302 may have a bandwidth corresponding to any number of one or more RBs 308. Further, in this illustration, the RB 308 is shown as occupying less than the entire duration of the DL subframe 302, although this is merely one possible example.

Each 1 ms DL subframe 302 may consist of one or multiple adjacent slots. In the example shown in FIG. 3, one DL subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH and/or a physical downlink control channel (PDCCH), etc., to one or more scheduled entities. The PDCCH carries downlink control information (DCI) including but not limited to power control commands, scheduling information, a grant, and/or an assignment of REs for DL and UL transmissions. The transmitting device may further allocate one or more REs 306 to carry other DL signals, such as a DMRS; a phase-tracking reference signal (PT-RS); a channel state information—reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The synchronization signals PSS and SSS, and in some examples, the PBCH and a PBCH DMRS, may be transmitted in a synchronization signal block (SSB) that includes 4 consecutive OFDM symbols, numbered via a time index in increasing order from 0 to 4. In the frequency domain, the SSB may extend over 240 contiguous subcarriers, with the subcarriers being numbered via a frequency index in increasing order from 0 to 249. Of course, the present disclosure is not limited to this specific SSB configuration. Other non-limiting examples may utilize greater or fewer than two synchronization signals; may include one or more supplemental channels in addition to the PBCH; may omit a PBCH; and/or may utilize a different number of symbols/frequencies and/or nonconsecutive symbols/frequencies for an SSB, within the scope of the present disclosure.

The PBCH may further include a master information block (MIB) that includes various system information, along with parameters for decoding a system information block (SIB). The SIB may be, for example, a SystemInformation-Type 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

As discussed above, a BS may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over PBCH and may broadcast the RMSI and/or the OSI over the PDSCH.

A UE attempting to access the network may perform an initial cell search by detecting a PSS from a BS (e.g., the PSS of a cell of the BS). The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive system information from the BS. The system information may take the form of a master information block (MIB) and system information blocks (SIBs). The system information includes essential or critical information for a UE to access the network such as downlink (DL) channel configuration information, uplink (UL) channel configuration information, access class information, and cell barring information, as well as other less critical information. The MIB may include system information for initial network access and scheduling information for RMSI and/or OSI. After decoding the MIB, the UE may receive RMSI and/or OSI.

After obtaining the MIB, the RMSI and/or the OSI, the UE may perform a random access procedure for initial access to a RAN (e.g., the RAN 200 of FIG. 2). The RAN (e.g., a base station) broadcasts information that enables a UE to determine how to conduct the initial access. This information may include a configuration for a random access channel (RACH) that the UE uses to communicate with the RAN during initial access. The RACH configuration may indicate, for example, the resources allocated by the RAN for the RACH (e.g., resources allocated for transmitting RACH preambles and receiving random access responses).

For the random access procedure, the UE may transmit a random access preamble and the BS may respond with a random access response. Upon receiving the random access response, the UE may transmit a connection request to the BS and the BS may respond with a connection response (e.g., contention resolution message). After establishing a connection, the UE and the BS may enter a normal operation stage, where operational data may be exchanged. For example, the BS may schedule the UE for UL communication and/or DL communication.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or an SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include hybrid automatic repeat request (HARQ) feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry SIBs (e.g., SIB1), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
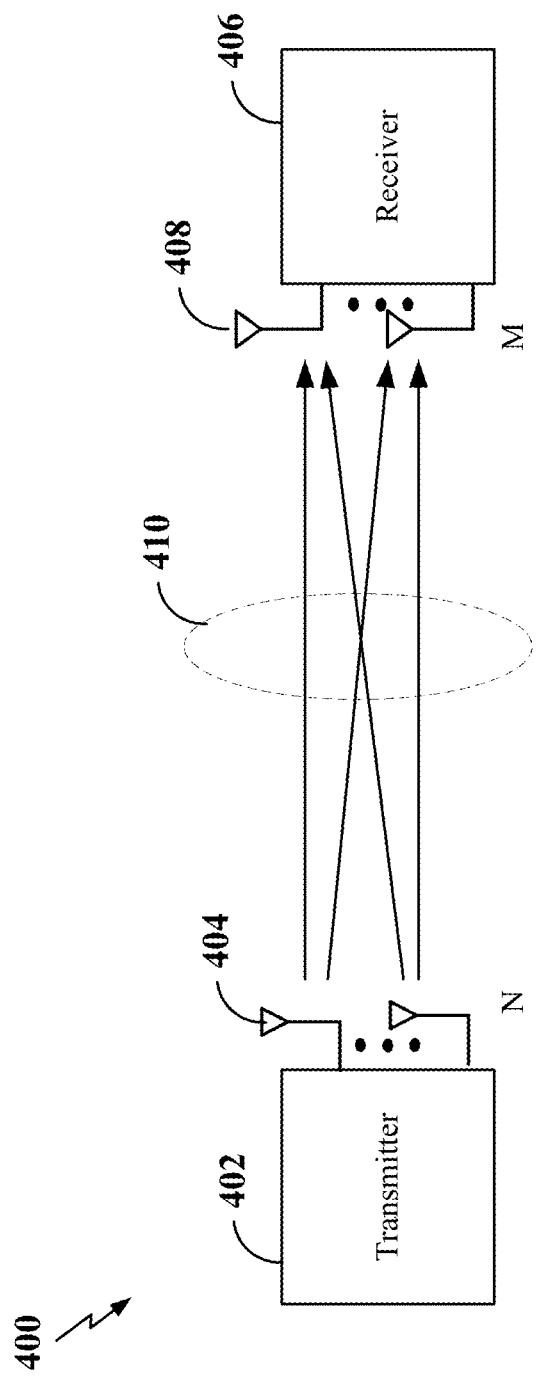
FIG. 4 is a block diagram illustrating an example of a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system 400 (MIMO system) is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G NR systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 5:
FIG. 5 is a diagram illustrating an example of communication between a radio access network (RAN) node and a wireless communication device using beamforming according to some aspects.

FIG. 5 is a diagram illustrating communication between a base station 504 and a UE 502 using beamformed signals according to some aspects. The base station 504 may be any of the base stations (e.g., gNBs) or scheduling entities illustrated in FIGS. 1 and/or 2, and the UE 502 may be any of the UEs or scheduled entities illustrated in FIGS. 1 and/or 2.

In the example shown in FIG. 5, the base station 504 is configured to generate a plurality of beams 506a-506h, each associated with a different beam direction. In addition, the UE 502 is configured to generate a plurality of beams 508a-508e, each associated with a different beam direction. The base station 504 and UE 502 may select one or more beams 506a-506h on the base station 504 and one or more beams 508a-508e on the UE 502 for communication of uplink and downlink signals therebetween using a downlink beam management scheme and/or an uplink beam management scheme.

In an example of a downlink beam management scheme for selection of downlink beams, the base station 504 may be configured to sweep or transmit on each of a plurality of downlink transmit beams 506a-506h during one or more synchronization slots. For example, the base station 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 506a-506h transmitted during a same symbol may not be adjacent to one another. In some examples, the base station 504 may transmit more or less beams distributed in all directions (e.g., 360 degrees).

In addition, the UE 502 is configured to receive the downlink beam reference signals on a plurality of downlink receive beams 508a-508e. In some examples, the UE 502 searches for and identifies each of the downlink transmit beams 506a-506h based on the beam reference signals. The UE 502 then performs beam measurements (e.g., RSRP, SINR, RSRQ, etc.) on the beam reference signals on each of the downlink receive beams 508a-508e to determine the respective beam quality of each of the downlink transmit beams 506a-506h as measured on each of the downlink receive beams 508a-508e.

The UE 502 can generate and transmit a beam measurement report, including the respective beam index and beam measurement of each downlink transmit beam 506a-506h on each downlink receive beam 508a-508e to the base station 504. The base station 504 may then select one or more downlink transmit beams on which to transmit unicast downlink control information and/or user data traffic to the UE 502. In some examples, the selected downlink transmit beam(s) have the highest gain from the beam measurement report. In some examples, the UE 502 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 504 or the UE 502 may further select a corresponding downlink receive beam on the UE 502 for each selected serving downlink transmit beam to form a respective downlink beam pair link (BPL) for each selected serving downlink transmit beam. For example, the UE 502 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 506d) on the base station 504 and a single downlink receive beam (e.g., beam 508c) on the UE may form a single downlink BPL used for communication between the base station 504 and the UE 502. In another example, multiple downlink transmit beams (e.g., beams 506c, 506d, and 506e) on the base station 504 and a single downlink receive beam (e.g., beam 508c) on the UE 502 may form respective downlink BPLs used for communication between the base station 504 and the UE 502. In another example, multiple downlink transmit beams (e.g., beams 506c, 506d, and 506e) on the base station 504 and multiple downlink receive beams (e.g., beams 508c and 508d) on the UE 502 may form multiple downlink BPLs used for communication between the base station 504 and the UE 502. In this example, a first downlink BPL may include downlink transmit beam 506c and downlink receive beam 508c, a second downlink BPL may include downlink transmit beam 506d and downlink receive beam 508c, and a third downlink BPL may include downlink transmit beam 506e and downlink receive beam 508d.

When the channel is reciprocal, the above-described downlink beam management scheme may also be used to select one or more uplink BPLs for uplink communication from the UE 502 to the base station 504. For example, the downlink BPL formed of beams 506d and 508e may also serve as an uplink BPL. Here, beam 508c is utilized as an uplink transmit beam, while beam 506d is utilized as an uplink receive beam.

In an example of an uplink beam management scheme, the UE 502 may be configured to sweep or transmit on each of a plurality of uplink transmit beams 508a-508e. For example, the UE 502 may transmit an SRS on each beam in the different beam directions. In addition, the base station 504 may be configured to receive the uplink beam reference signals on a plurality of uplink receive beams 506a-506h. In some examples, the base station 504 searches for and identifies each of the uplink transmit beams 508a-508e based on the beam reference signals. The base station 504 then performs beam measurements (e.g., RSRP, SINR, RSRQ, etc.) on the beam reference signals on each of the uplink receive beams 506a-506h to determine the respective beam quality of each of the uplink transmit beams 508a-508e as measured on each of the uplink receive beams 506a-506h.

The base station 504 may then select one or more uplink transmit beams on which the UE 502 will transmit unicast downlink control information and/or user data traffic to the base station 504. In some examples, the selected uplink transmit beam(s) have the highest gain. The base station 504 may further select a corresponding uplink receive beam on the base station 504 for each selected serving uplink transmit beam to form a respective uplink beam pair link (BPL) for each selected serving uplink transmit beam. For example, the base station 504 can utilize the beam measurements to select the corresponding uplink receive beam for each serving uplink transmit beam. In some examples, the selected uplink receive beam to pair with a particular uplink transmit beam may have the highest gain for that particular uplink transmit beam.

The base station 504 may then notify the UE 502 of the selected uplink transmit beams. For example, the base station 504 may provide the SRS resource identifiers (IDs) identifying the SRSs transmitted on the selected uplink transmit beams. In some examples, the base station 504 may apply each selected uplink transmit beam (and corresponding uplink receive beam) to an uplink signal (e.g., PUCCH, PUSCH, SRS, etc.) and transmit the respective SRS resource IDs associated with the selected uplink transmit beams applied to each uplink signal to the UE 502. When the channel is reciprocal, the above-described uplink beam management scheme may also be used to select one or more downlink BPLs for downlink communication from the base station 504 to the UE 502. For example, the uplink BPLs may also be utilized as downlink BPLs.

Figure 6:
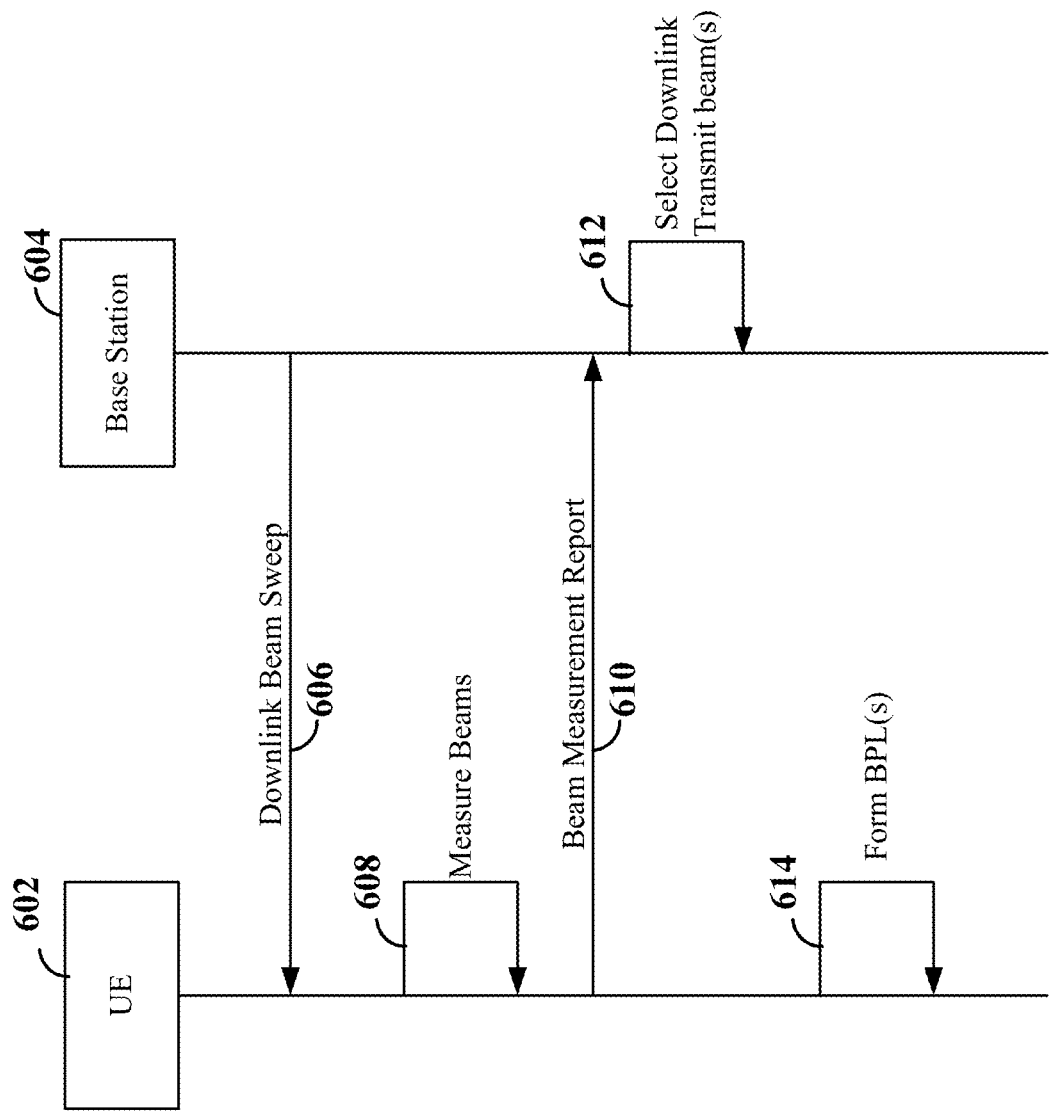
FIG. 6 is a signaling diagram illustrating an example of signaling between a user equipment (UE) and a base station for downlink beam management according to some aspects.

FIG. 6 illustrates an example of signaling between a UE 602 and a base station 604 for downlink beam management according to some aspects. The UE 602 may correspond to any of the UEs or scheduled entities shown in FIGS. 1, 2, 4, and/or 5. In addition, the base station 604 may correspond to any of the base stations or scheduling entities shown in FIGS. 1, 2, 4, and/or 5.

At 606, the base station 604 performs a beam sweep to transmit a reference signal (e.g., an SSB or CSI-RS) on each of a plurality of downlink transmit beams to the UE 602. At 608, the UE 602 identifies and measures the RSRP or other suitable beam measurement of a respective beam reference signal on each downlink receive beam of the UE for each downlink transmit beam received by the UE. In addition, at 610, the UE 602 transmits a beam measurement report, including the beam measurements, to the base station 604. At 612, the base station 604 may then select one or more serving downlink transmit beams on which to transmit unicast downlink control information and/or user data traffic to the UE 602. In some examples, the selected serving downlink transmit beam(s) have the highest gain from the beam measurement report.

At 614, the UE 602 forms downlink BPLs between the serving downlink transmit beams and serving downlink receive beams. In some examples, the UE 602 may select a corresponding serving downlink receive beam for each selected serving downlink transmit beam to form the downlink BPLs. For example, the UE 602 can identify the serving downlink transmit beams (e.g., the downlink transmit beams with the highest gain, where the number of downlink transmit beams is known based on, for example, UE capabilities). The UE 602 can then select the corresponding downlink receive beam for each serving downlink transmit beam based on the beam measurements. In some examples, the selected downlink receive beam to pair with a particular downlink transmit beam may have the highest gain for that particular downlink transmit beam.

Figure 7:
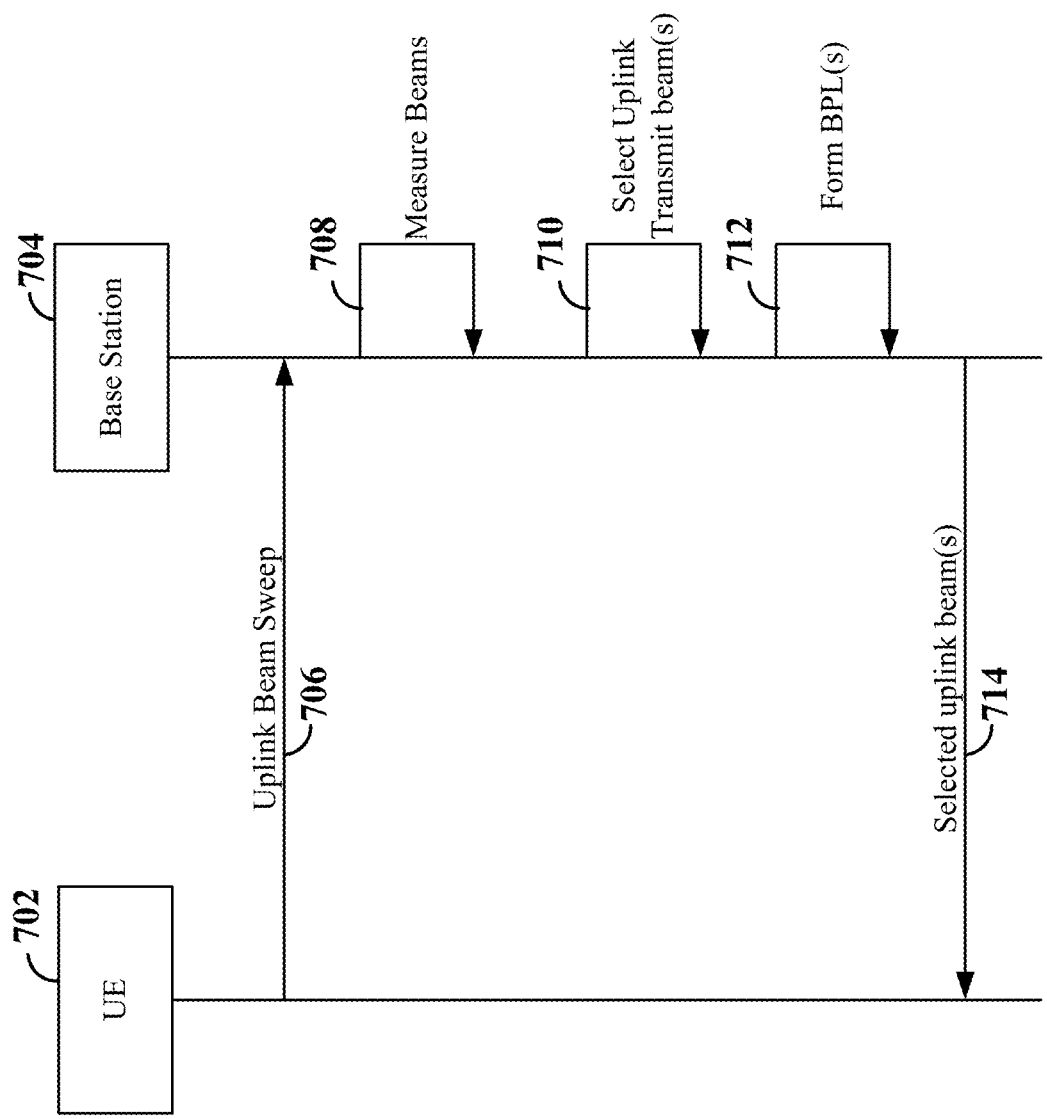
FIG. 7 is a signaling diagram illustrating an example of signaling between a UE and a base station for uplink beam management according to some aspects.

FIG. 7 illustrates an example of signaling between a UE 702 and a base station 704 for uplink beam management according to some aspects. The UE 702 may correspond to any of the UEs or scheduled entities shown in FIGS. 1, 2, 4, 5, and/or 6. In addition, the base station 704 may correspond to any of the base stations or scheduling entities shown in FIGS. 1, 2, 4, 5, and/or 6.

At 706, the UE 702 performs a beam sweep to transmit a reference signal (e.g., an SRS) on each of a plurality of uplink transmit beams to the base station 704. At 708, the base station 704 identifies and measures the RSRP or other suitable beam measurement of a respective beam reference signal on each uplink receive beam of the base station for each uplink transmit beam received by the base station. At 710, the base station 704 may then select one or more serving uplink transmit beams on which the UE 702 will transmit unicast downlink control information and/or user data traffic to the base station 704. In some examples, the selected serving uplink transmit beam(s) have the highest gain from the beam measurement report.

At 712, the base station 704 forms uplink BPLs between the serving uplink transmit beams and serving uplink receive beams. In some examples, the base station 704 may select a corresponding serving uplink receive beam for each selected serving uplink transmit beam to form the uplink BPLs. For example, the base station 704 can select the corresponding uplink receive beam for each serving uplink transmit beam based on the beam measurements. In some examples, the selected uplink receive beam to pair with a particular uplink transmit beam may have the highest gain for that particular uplink transmit beam. At 714, the base station 704 notifies the UE 702 of the selected uplink transmit beams. For example, the base station 704 may provide the SRS resource ID associated with each selected serving uplink transmit beam. The base station 704 may further indicate the selected uplink transmit beam(s) applied to each uplink signal (e.g., PUCCH, PUSCH, SRS, etc.).

Figure 8A:
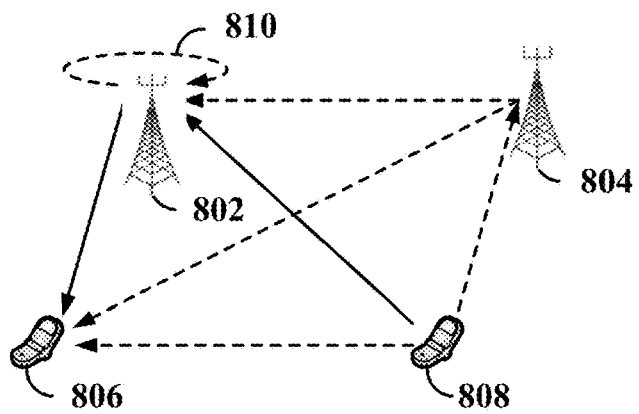
FIGS. 8A, 8B, and 8C are schematic illustrations of a wireless communication network and sources of interference for a full-duplex (FD) gNB, a half-duplex (HD) UE, a first full-duplex UE, and a second full-duplex UE according to some aspects.
Figure 8B:
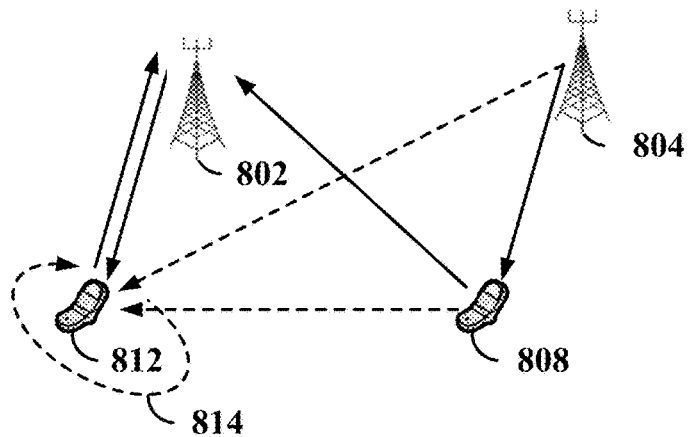
Figure 8C:
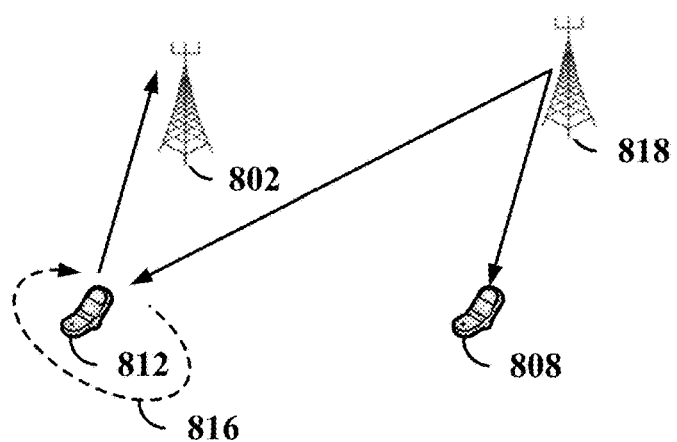

As mentioned above, a UE and a base station (e.g., gNB) may use full-duplex communication. FIGS. 8A, 8B, and 8C are schematic illustrations of a wireless communication network 800 and sources of interference for a full-duplex gNB 802 (e.g., a scheduling entity), a half-duplex UE 806, a first full-duplex UE 812, and a second full-duplex UE 808 according to some aspects of the disclosure. The UE 806, 808, or 812 may correspond to any of the UEs or scheduled entities shown in FIGS. 1, 2, 4, 5, 6, and/or 7.

In FIG. 8A, the full-duplex gNB 802 is transmitting to the half-duplex UE 806. During the time of the transmission from the full-duplex gNB 802 to the half-duplex UE 806, the full-duplex gNB 802 is receiving, at its receiver (not shown), self-interference 810 from its own transmission to the half-duplex UE 806 as well as interference from a neighboring gNB 804 and an uplink transmission from a second full-duplex UE 808. The half-duplex UE 806 is also receiving interference from the second full-duplex UE 808 and the neighboring gNB 804. Because it is a half-duplex UE, the half-duplex UE 806 is not transmitting during the time of the transmission from the full-duplex gNB 802 to the half-duplex UE 806, and therefore, the half-duplex UE 806 receives no self-interference. The full-duplex gNB 802 and neighboring gNB 804 may each correspond to any of the base stations or scheduling entities shown in FIGS. 1, 2, 4, 5, 6, and/or 7.

In FIG. 8B, the full-duplex gNB 802 is transmitting a downlink transmission to the first full-duplex UE 812. During the time of the transmission of the downlink transmission from the full-duplex gNB 802 to the first full-duplex UE 812, the full-duplex gNB 802 is receiving, at its receiver (not shown), a simultaneous uplink transmission from the first full-duplex UE 812. At the same time as the just mentioned simultaneous downlink and uplink transmissions, the first full-duplex UE 812 is receiving, at its receiver (not shown), self-interference 814 from its own transmission to the full-duplex gNB 802 as well as interference from the neighboring gNB 804 and interference from the second full-duplex UE 808.

In FIG. 8C, the full-duplex gNB 802 is receiving an uplink transmission from the first full-duplex UE 812. During the time of the transmission of the uplink transmission to the full-duplex gNB 802, the first full-duplex UE 812 is also receiving a transmission from the neighboring gNB 804. In addition to the signal received from the neighboring gNB 804, the first full-duplex UE 812 is also receiving, at its receiver (not shown), self-interference 816 from its own transmission to the full-duplex gNB 802. The illustration of FIG. 8C may also be considered, for example, as an illustration depicting two transmit receive points (TRPs) and two UEs. For example, the first the full-duplex gNB 804 could be replaced with a first transmit receive point (TRP) and the neighboring gNB 804 could be replaced by a second TRP. The first TRP may be configured to only receive uplink signals and the second TRP may be configured to only transmit downlink signals. The first TRP and the second TRP may be co-located or spaced apart.

For the half-duplex UE 806 of FIG. 8A, interference may be mitigated if the interference from the neighboring gNB 804 and second full-duplex UE 808 are at frequencies other than those occupied by the downlink transmission from the full-duplex gNB 802 to the half-duplex UE 806. Similarly, for the first full-duplex UE 812 of FIGS. 8B and 8C, interference may be mitigated if the self-interference 816 from the first full-duplex UE 812, interference from the neighboring gNB 804, and/or interference from the second full-duplex UE 808 are at frequencies other than those occupied by the downlink transmission from the full-duplex gNB 802 to the half-duplex UE 806.

Figures 9A, 9B, 9C, 9D:
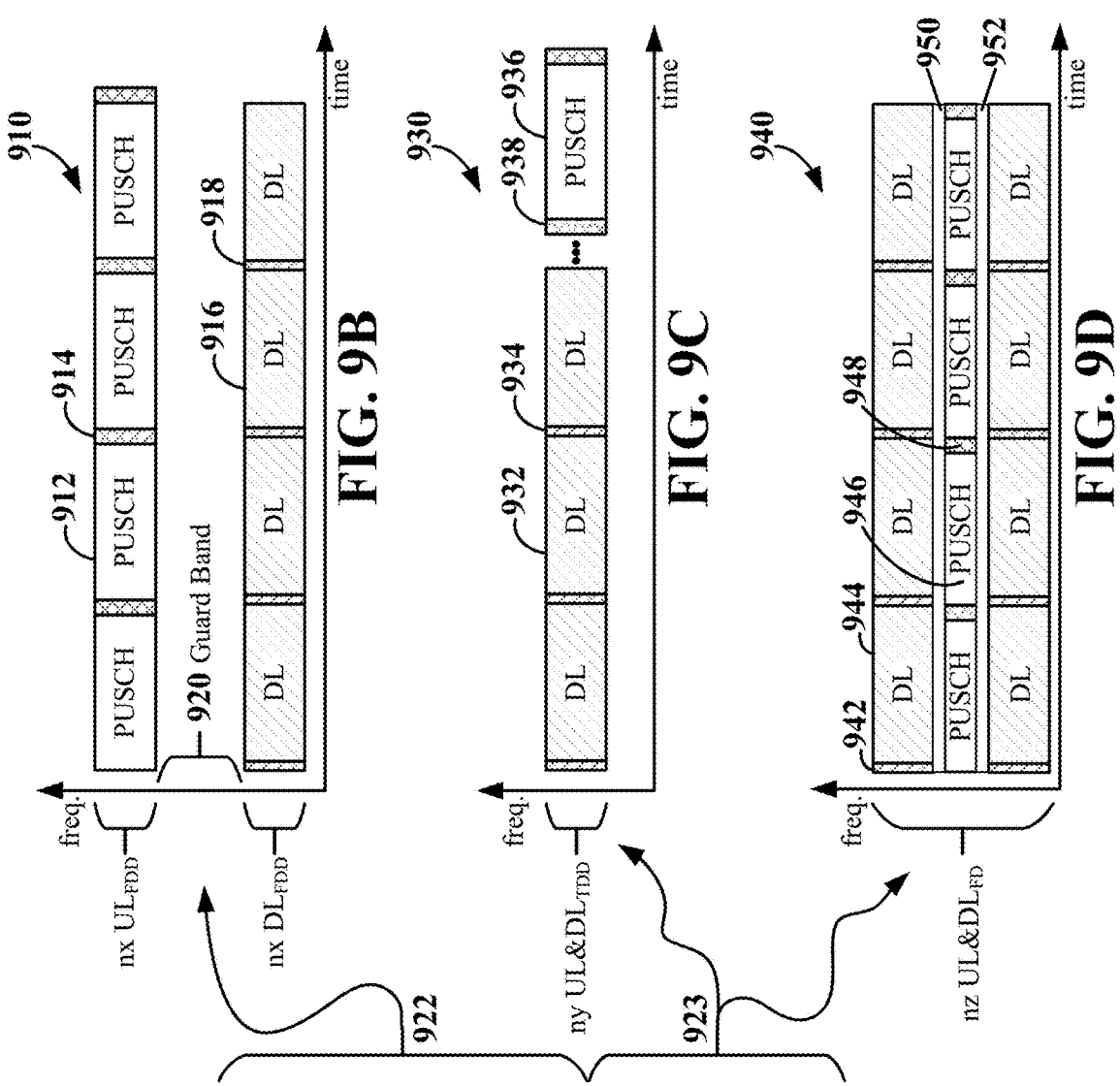
FIG. 9A is a tabular depiction of a plurality of fifth generation (5G) new radio (NR) operating bands (e.g., radio channels), uplink operating band frequencies, downlink operating band frequencies, and the duplex mode associated with each of the 5G NR operating bands according to some aspects.
FIG. 9B is a diagram illustrating a frequency division duplex (FDD) full-duplex (FD) modulation scheme according to some aspects.
FIG. 9C is a diagram illustrating a time division duplex (TDD) half-duplex (HD) modulation scheme according to some aspects.
FIG. 9D is a diagram illustrating a TDD FD modulation scheme according to some aspects.

FIG. 9A is a tabular depiction 900 of a plurality of 5G NR operating bands 902 (e.g., radio channels), UL operating band frequencies 904, DL operating band frequencies 906, and duplex modes 908 associated with each of the 5G NR operating bands 902 according to some aspects of the disclosure.

FIG. 9B is a diagram illustrating an FDD FD modulation scheme 910 according to some aspects of the disclosure. In the example shown in FIG. 9B, time is illustrated along the horizontal axis while frequency is illustrated along the vertical axis. A plurality of physical uplink shared channels (PUSCHs) 912 and uplink control channels 914 are depicted as occupying the UL operating band identified as nx $UL_{FDD}$. A plurality of downlink data channels 916 (e.g., physical downlink shared channels (PDSCHs)) and downlink control channels 918 are depicted as occupying the DL operating band identified as nx $DL_{FDD}$. The UL operating band, nx $UL_{FDD}$, and the DL operating band, nx $DL_{FDD}$, are depicted as being separated in frequency by a guard band 920. The paired use of the nx $UL_{FDD}$ uplink operating band and the nx $DL_{FDD}$ operating band of a given, nx operating band may be referred to as paired spectrum. The nomenclature "nx" represents any one of the 5G NR operating bands 902 designated for FDD mode in the duplex modes 908. A sub-group 922 of all 5G NR operating bands 902 designated for FDD mode in the duplex modes 908 is denoted in FIG. 9A. The operating bands are examples and non-limiting.

FIG. 9C is a diagram illustrating a TDD HD modulation scheme 930 according to some aspects of the disclosure. In the example shown in FIG. 9C, time is illustrated along the horizontal axis while frequency is illustrated along the vertical axis. A plurality of downlink data channels 932 and downlink control channels 934 are depicted as occupying the operating band identified as ny $UL\&DL_{TDD}$. The single operating band, ny $UL\&DL_{TDD}$, is utilized for uplink and downlink by separating the UL and DL information in time (e.g., they do not occupy the same time slots simultaneously). The unpaired use of the nx $UL_{FDD}$ uplink operating band and the nx $DL_{FDD}$ operating band (both at a same frequency, or a same frequency band) of a given, nx operating band may be referred to as unpaired spectrum. A physical uplink shared channel (PUSCH) 936 and uplink control channel 938 are depicted as occupying the single operating band, ny $UL\&DL_{TDD}$. The nomenclature "ny" represents any one of the 5G NR operating bands 902 designated for TDD mode in the duplex modes 908. A sub-group 923 of all 5G NR operating bands 902 designated for TDD mode in the duplex modes 908 is denoted in FIG. 9A. The operating bands are examples and non-limiting.

Figure 10B:
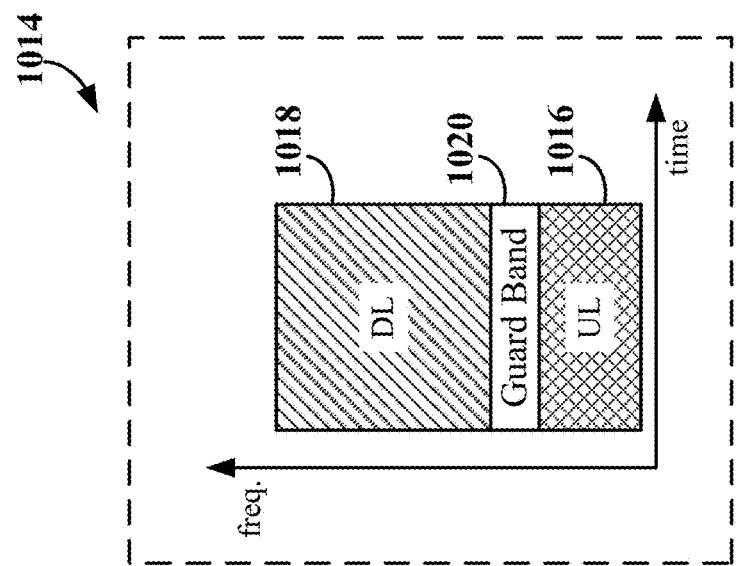
FIG. 10B is a diagram illustrating an example of sub-band FD according to some aspects.

FIG. 9D is a diagram illustrating a TDD FD modulation scheme 940 (also referred to as sub-band full-duplex (SBFD) and flexible TDD) according to some aspects of the disclosure. In the example shown in FIG. 9D, time is illustrated along the horizontal axis while frequency is illustrated along the vertical axis. As illustrated in the example diagram of FIG. 9D, a full-duplex network may utilize "sub-band FDD" (e.g., as illustrated in FIG. 10B) in unpaired spectrum, in which transmissions in different directions are carried in different sub-bands or BWPs of the same carrier bandwidth. A plurality of downlink data channels 944 and downlink control channels 942 and a plurality of PUSCHs 946 and uplink control channels 948 are all depicted as occupying the operating band identified as nz UL&DL$_{FD}$. The single operating band, nz UL&DL$_{FD}$, is utilized for uplink and downlink without separating the UL and DL information in time (e.g., they do occupy the same time slots simultaneously). The nomenclature "nz" represents any one of the 5G NR operating bands 902 designated for TDD mode in the duplex modes 908. A sub-group 923 of all 5G NR operating bands 902 designated for TDD mode in the duplex modes 908 is denoted in FIG. 9A. A first guard band 950 and a second guard band 952 are depicted in FIG. 9D. The first guard band 950 and the second guard band 952 may be the same bandwidth or different bandwidths. Either or both of the first guard band 950 and the second guard band 952 may be zero bandwidth guard bands. The first guard band 950 and the second guard band 952 (individually or collectively) in the unpaired spectrum may be smaller than the guard band 920 in the paired spectrum.

Figure 10A:
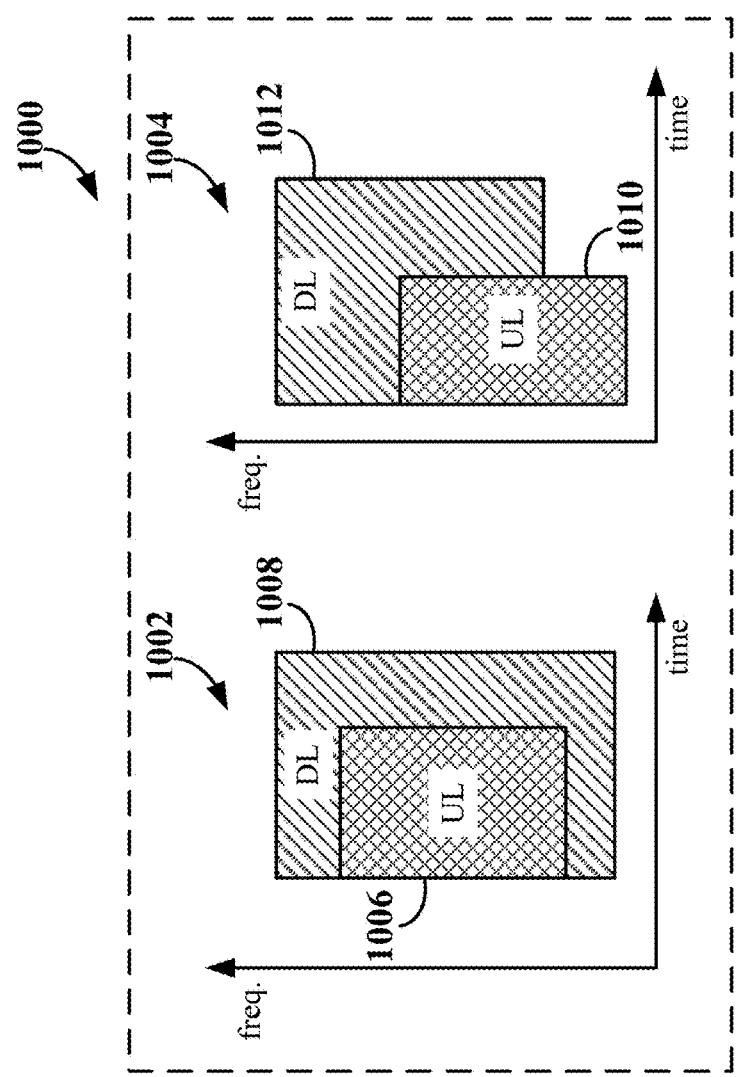
FIG. 10A is a diagram illustrating two examples of in-band full-duplex (IBFD) modulation according to some aspects.

Various examples of TDD FD operation are illustrated in FIGS. 10A and 10B. FIG. 10A is a diagram illustrating two examples of in-band full-duplex (IBFD) modulation 1000 according to some aspects of the disclosure. IBFD is the overlap of the same UL and DL time-frequency resources, and could be applied in situations of either partial or full overlap of the time-frequency resource used for both DL and UL transmissions as is illustrated in FIGS. 10A and 10B. In the examples shown in FIG. 10A, time is illustrated along the horizontal axis while frequency is illustrated along the vertical axis. A first example 1002 of IBFD is depicted on the left while a second example 1004 is depicted on the right. In the first example 1002, the UL time-frequency resources 1006 completely overlap with a portion of the DL time-frequency resources 1008. In the second example 1004, the UL time-frequency resources 1010 partially overlap with a portion of the DL time-frequency resources 1012. Accordingly, a device, for example a base station and/or a scheduled entity, employing IBFD may transmit and receive on the same time and frequency resources. That is, the device may transmit and receive at the same time(s) at the same frequency (or frequencies). The UL and DL share the same time and frequency resources. The overlap in time-frequency resources may be complete, as in the first example 1002, or partial, as in the second example 1004.

FIG. 10B is a diagram illustrating an example of sub-band FDD 1014 (also known as flexible duplex) according to some aspects of the disclosure. In the example shown in FIG. 10B, time is illustrated along the horizontal axis while frequency is illustrated along the vertical axis. In sub-band FDD 1014, a device may transmit and receive at the same time but on different frequency resources in unpaired spectrum (e.g., within the same carrier bandwidth). The UL resources 1016 are separated from the DL resources 1018 by a guard band 1020.

FIG. 11A is a schematic diagram depicting an antenna array 1100 of a TRP 1102 according to some aspects of the disclosure. The antenna array 1100 is divided into two panels (panel 1 1104, panel 2 1106) with a physical separation 1108 therebetween. Each of the two panels may be a subarray of antennas. A given panel may transmit and/or receive a beam or a beam group. The TRP 1102 may be a base station. The discussion that follows also may be applicable to an antenna array in another type of device, such as UE. If implemented in a UE, the panels of the antenna array would be located at separate locations on the UE (e.g., a front panel, a back panel, etc.).

FIG. 11B is a diagram depicting the transmission or reception configuration of the two panels (panel 1 1104, panel 2 1106) of FIG. 11A. The transmission (TX) and reception (RX) configurations of the two panels are depicted for various DL and UL channels as may be implemented in a device (e.g., a scheduling entity or a scheduled entity). Exemplary signaling is depicted above the transmission or reception configurations of the two panels. In the example, time is illustrated along the horizontal axis while frequency is illustrated along the vertical axis.

At the left of FIG. 11B, when the antenna array 1100 is communicating in only a single direction at a time, both panel 1 1104 and panel 2 1106 may be configured for the single-direction communication. For example, both panel 1 1104 and panel 2 1106 may be configured to transmit DL control 1110 and DL data 1112. At the center of FIG. 11B, when the antenna array 1100 is simultaneously transmitting a combination of DL control and DL data (similar to DL control 1110 and DL data 1112) and receiving UL data (e.g., PUSCH 1114) and UL control 1118, panel 1 1104 may be configured for DL transmission and panel 2 1106 may be configured for UL reception. This configuration allows for full-duplex operation. According to one aspect, the full-duplex operation depicted at the center of FIG. 11B may be referred to as "sub-band full-duplex" (SBFD) in unpaired spectrum, in which transmissions in different directions are carried in different sub-bands or BWPs of the same carrier bandwidth. At the right of FIG. 11B, when the antenna array 1100 is only receiving UL data (e.g., PUSCH 1120) and UL control 1122, both panel 1 1104 and panel 2 1106 may be configured for UL reception. The antenna array 1100 may thus be configured for TDD or full-duplex operation (e.g., flexible TDD). The physical separation 1108 between panel 1 1104 and panel 2 1106 may provide improved isolation between the panels (e.g., greater than about 50 dB of improved isolation) when compared to two panels without the physical separation 1108. By way of example, flexible TDD may describe the use of two panels to operate in either: a TDD mode (with both panels on the gNB and one or more panels on the UE configured for either DL or UL), or an SBFD mode (with one panel on each of the gNB and UE configured for UL and another panel on each of the gNB and UE configured for DL). Accordingly, SBFD provides for simultaneous uplink and downlink communication. Additionally, IBFD provides for simultaneous uplink and downlink communication. In IBFD uplink time-frequency resources may completely or partially overlap with downlink time-frequency resources. Flexible TDD, SBFD, and IBFD are some examples of full-duplex multiplexing, which provide for simultaneous transmission and reception.

Introduction to Full-Duplex Communication and Timing Advances

The disclosure relates to full-duplex (FD) communications with simultaneous UL and DL transmissions as discussed earlier, which is termed herein as "FD mode." This term may include SBFD in flexible TDD, but may also include FDD in paired spectrum, SBFD in unpaired spectrum, in-band full-duplex (IBFD), or partially overlapped frequency band full-duplex or fully overlapped frequency band full-duplex or other types of full-duplex operation. Various aspects of the disclosure may be applicable to FD mode in FR2 and/or other frequency bands.

An FD mode capability may be implemented at a base station (e.g., a gNB), a UE, or both. In one example, a UE that supports FD mode may have two antenna panels (e.g., one front and one rear). The UE may transmit uplink signaling from a front panel and receive downlink signaling at a back panel. Some UEs may have four panels (or four antenna array modules); one at each corner of the UE. The disclosure is not limited to UEs with two or four panels. A base station usually supports more than four panels. This allows the base station to direct multiple antenna beams with precision throughout the base station's field of view (e.g., 180 or 360 degrees).

In some aspects, FD mode operation may be conditioned on whether there is sufficient beam separation between antennas and/or other factors. The term beam separation relates to a degree to which a first beam receives energy from a second beam. The first beam may be beamformed at a first panel and the second beam may be beamformed at a second panel. Both panels may be at the same entity (e.g., both panels may be co-located at a base station or both panels may be co-located at a UE). Beam separation may depend on a degree to which a first beam of a first panel receives energy from a second beam of the second panel. Beamformed antenna beams are formed from a plurality of antenna elements. The beamformed beam is not isotropic; the gain of the beam changes with azimuth and elevation relative to the panel. Accordingly, the beams have a directionality. Even when the first beam and the second beam are pointed in the same direction (i.e., the beams are not pointed toward one another), sidelobes of each beam may interact and facilitate a transfer energy from one beam to another beam. The term beam separation therefore is not only dependent on physical separation, but also is dependent on beam shape (e.g., a narrowness of a main lobe of the beam as well as locations and gains of sidelobes) and beam pointing angle, for example.

A pair of transmit and receive beams may have insufficient beam separation if the interference (e.g., unwanted energy, noise) transmitted from a transmit beam to a receive beam raises the noise (e.g., unwanted energy in a given bandwidth, for example) to an extent that makes it impossible to discern a desired signal from the noise.

Beam separation and FD mode, implementing SBFD for example, allow a UE or base station to support uplink and downlink signaling at the same time (simultaneously) and at the same frequency (e.g., within one carrier bandwidth).

In some aspects, FD mode capability may improve (e.g., reduce) latency. For example, a UE operating according to half-duplex TDD must wait for a scheduled uplink subframe before it is able to send an uplink message to the base station. However, using FD mode, the UE can respond with an uplink frame while it is receiving a downlink frame. For example, ultra-reliable low latency communication (URLLC) requires low latency between DL and UL. In FD mode, the UE can transmit uplink and receive downlink at the same time, thereby improving latency (by eliminating a need to wait for an uplink subframe to transmit an uplink signal).

During operation, a 5G NR uplink allows for uplink intracell orthogonality, so that uplink transmissions received from different devices (e.g., UEs) within a cell do not cause interference to each other. A feature for this uplink orthogonality is that the uplink subframe boundaries for a given numerology are (approximately) time aligned at the base station. More specifically, any timing misalignment between received signals should fall within the duration of the cyclic prefix. To ensure such receiver-side time alignment, 5G NR includes a mechanism for transmitting a timing advance (TA) signal. The mechanism is similar to the corresponding mechanism in LTE, however 5G NR uses different timing advance step sizes for different numerologies.

Generally, timing advance is a negative offset, at the device (e.g., UE), between the start of a downlink subframe as observed by the device and the start of a subframe in the uplink. By controlling the offset appropriately for each device, the network (e.g., base station, gNB) may control the timing of the signals received at the base station from the devices. Devices located far from the base station encounter a larger propagation delay, and therefore should start their uplink transmissions somewhat in advance, compared to devices located closer to the base station.

Figure 12:
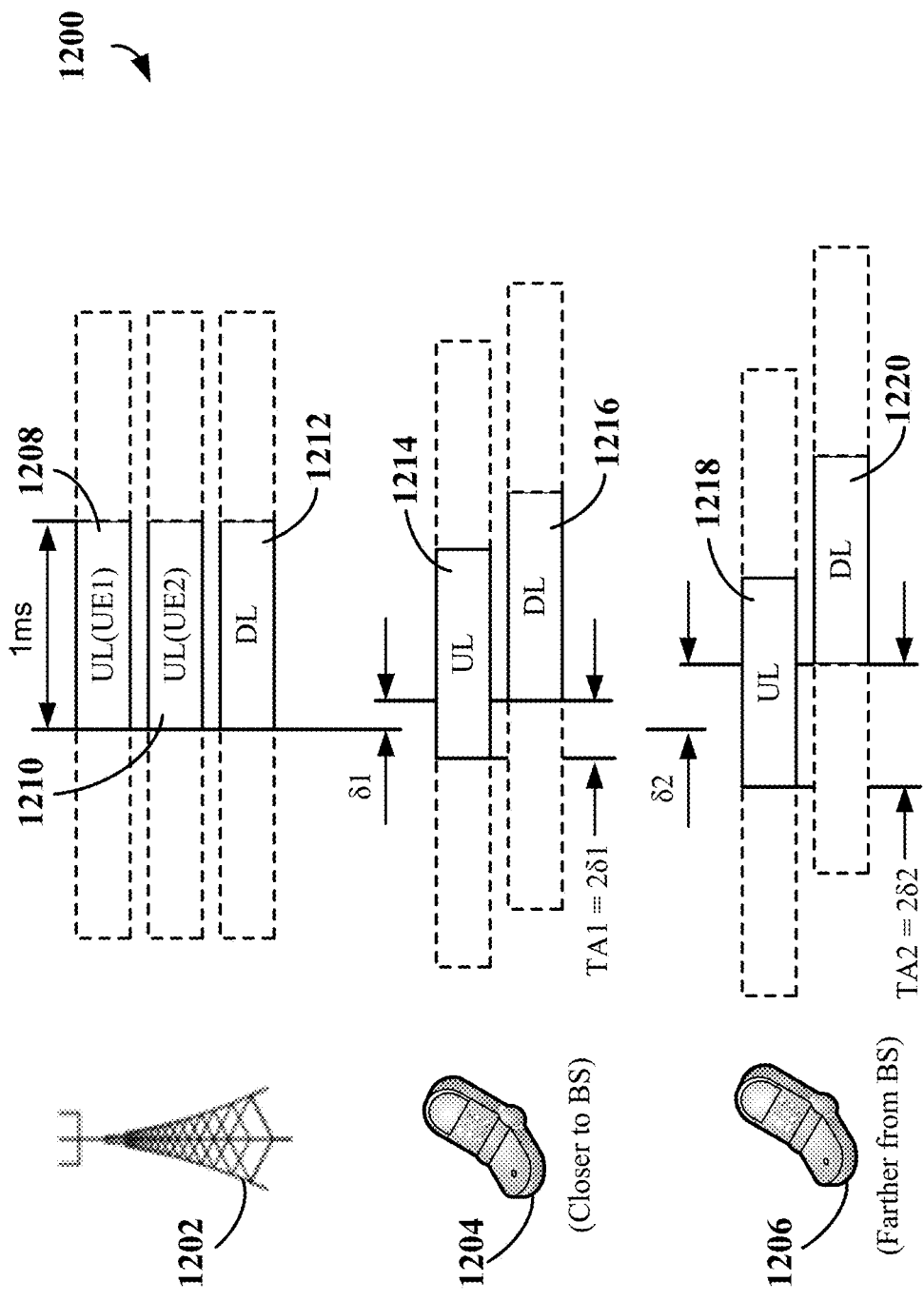
FIG. 12 is a timing diagram illustrating a timing advance operation for multiple UEs in a wireless communication system.

FIG. 12 is a signal diagram 1200 illustrating a timing advance operation according to some aspects of the disclosure. In this example, a first UE 1204 is shown as located closer to a base station 1202 and a second UE 1206 is shown as located farther from the base station 1202. The time-aligned uplink reception and downlink transmissions are illustrated where base station 1202 has a first uplink reception 1208 from the first UE 1204, a second uplink reception 1210 from the second UE 1206, and a downlink transmission subframe 1212. The first UE 1204 is shown experiencing a small propagation delay $\delta 1$ relative to the downlink subframe 1216. Accordingly, for this device, a small value of the timing advance offset $TA1=2\delta 1$ is sufficient to compensate for the propagation delay for the uplink subframe 1214 and to ensure the correct timing at the base station. However, as can be seen in the FIG. 12, a larger value of the timing advance would be required for the second UE 1206, which is located at a larger distance from the base station and thus experiences a larger propagation delay $\delta 2$ relative to the downlink subframe 1220. Accordingly, for the second UE 1206, a larger value of the timing advance offset $TA2=2\delta 2$ would be required to compensate for the propagation delay for the uplink subframe 1218 and to ensure the correct timing at the base station.

The timing advance (TA) value for each UE (e.g., 1204, 1206) may be determined by the network (e.g., 1202) based on measurements on the respective uplink transmissions. Thus, as long as a UE carries out uplink data transmission, the receiving base station can use this to estimate the uplink receive timing, and thus be a source for the TA commands. In addition, sounding reference signals may also be used to determine the TA value, but a person of ordinary skill in the art will appreciate that the base station can use any signal transmitted from the UEs.

Based on the uplink measurements, a base station (e.g., 1202) may determine the required timing correction for each device. If the timing of a specific device needs correction, the network issues a TA command for the specific device, instructing it to retard or advance its timing relative to the current uplink timing. According to some examples, time alignment is accomplished at a subframe level; however, the disclosure is not limited to timing alignment at the subframe level. For example, timing alignment at the slot level is within the scope of the disclosure. The UE-specific TA command may be transmitted as a MAC control element on a downlink shared channel (DL-SCH). TA commands to a UE may be transmitted relatively infrequently (e.g., one or a few times per second), or may be transmitted on a more frequent basis, depending on how fast the UE is moving. As the target of TA is to keep the timing misalignment within the size of the cyclic prefix, the step size of the timing advance may be chosen as a fraction of the cyclic prefix. However, as 5G NR supports multiple numerologies with the cyclic prefix being shorter with the higher subcarrier spacing, the TA step size may be scaled in proportion to the cyclic prefix length and given by the subcarrier spacing of the active uplink bandwidth part.

For carrier aggregation, there may be multiple component carriers transmitted from a single device. In this case, the same timing-advance value may be applied for all uplink component carriers. However, if different uplink component carriers are received at different geographical locations, for example, by using remote radio head TRP configurations for some carriers but not others, different carriers would require different TA values. For dual connectivity systems, different uplink component carriers may be terminated at different sites. Accordingly, uplink component carriers may be grouped into timing advanced groups (TAGs) and allow for different TA commands for different TAGs. In such a configuration, all component carriers in the same group would be subjected to the same TA command. The timing advance step size may be determined by the highest subcarrier spacing among the carriers in a timing advance group.

Aspects Related to Timing Advance in Full-Duplex Communication

The present disclosure relates in some aspects to timing alignment in a cell including signaling or indication of the application of either a fixed timing advance (TA) value or a range of TA values. Provisioning of a range of values provides more flexibility to a UE or base station to adjust or compensate within the range in order to provide timing alignment.

It is noted that some systems will send or specify an absolute TA value to be used by a UE for timing advance. In some examples, this absolute TA value may be a default value sent in TA command normally used in the communication system, such as "2a1" or "2a1" with some minor adjustment based on base station's decision, as described below. In order to achieve timing alignment at both the gNB and the UE for an FD mode, in some aspects, a base station or gNB may be configured to indicate a range of TA values that may be allowed at the UE. In an example, the base station or gNB may be configured to provide a TA indication, such as through the use of a single bit field (e.g., a TA command field in RACH random access response (RAR) or MAC-CE) that directs the UE to either apply an absolute TA value or a TA range of values. In some cases, the base station or gNB may further be configured to signal a particular TA range to the UE through one of a radio resource control (RRC) signaling, MAC-CE signaling, or DCI signaling. In other cases, the range may be predefined such that the UE may be configured to apply the predefined range when the TA indication indicates that application of the range of TA values is allowed at the UE. The TA range may allow the base station or gNB to deal with timing differentials that are less than a cyclic prefix (CP), while still affording the UE the flexibility to adjust the TA value in consideration of the UE's timing differentials.

In some cases, if the UL and DL reception timing difference of a UE is within the cyclic prefix (e.g., timing is aligned within the CP at the UE), the gNB may provide a TA indication to the UE to apply a normal absolute TA. Further, if the UL and DL reception timing difference at the UE is between the time of one cyclic prefix and a time of two cyclic prefixes, the gNB may provide a TA indication to the UE to apply a TA range to help with timing alignment at the UE. The indication to apply the TA range may indicate that the gNB is provisioning some flexibility in the UE to be able to apply the TA value based on measurements made within the UE. Further, in some cases, if the UL and DL reception timing difference at the UE is beyond the time duration of two cyclic prefixes, the UE may not be able to achieve timing alignment using the TA range at UE.

In some cases, the present timing alignment disclosed herein relates to FD communications with simultaneous UL and DL transmissions as discussed earlier, which is termed herein as "FD mode." This term may include SBFD in flexible TDD, but may also include FDD in paired spectrum, SBFD in unpaired spectrum, IBFD, or other types of full-duplex operation.

Figure 13:
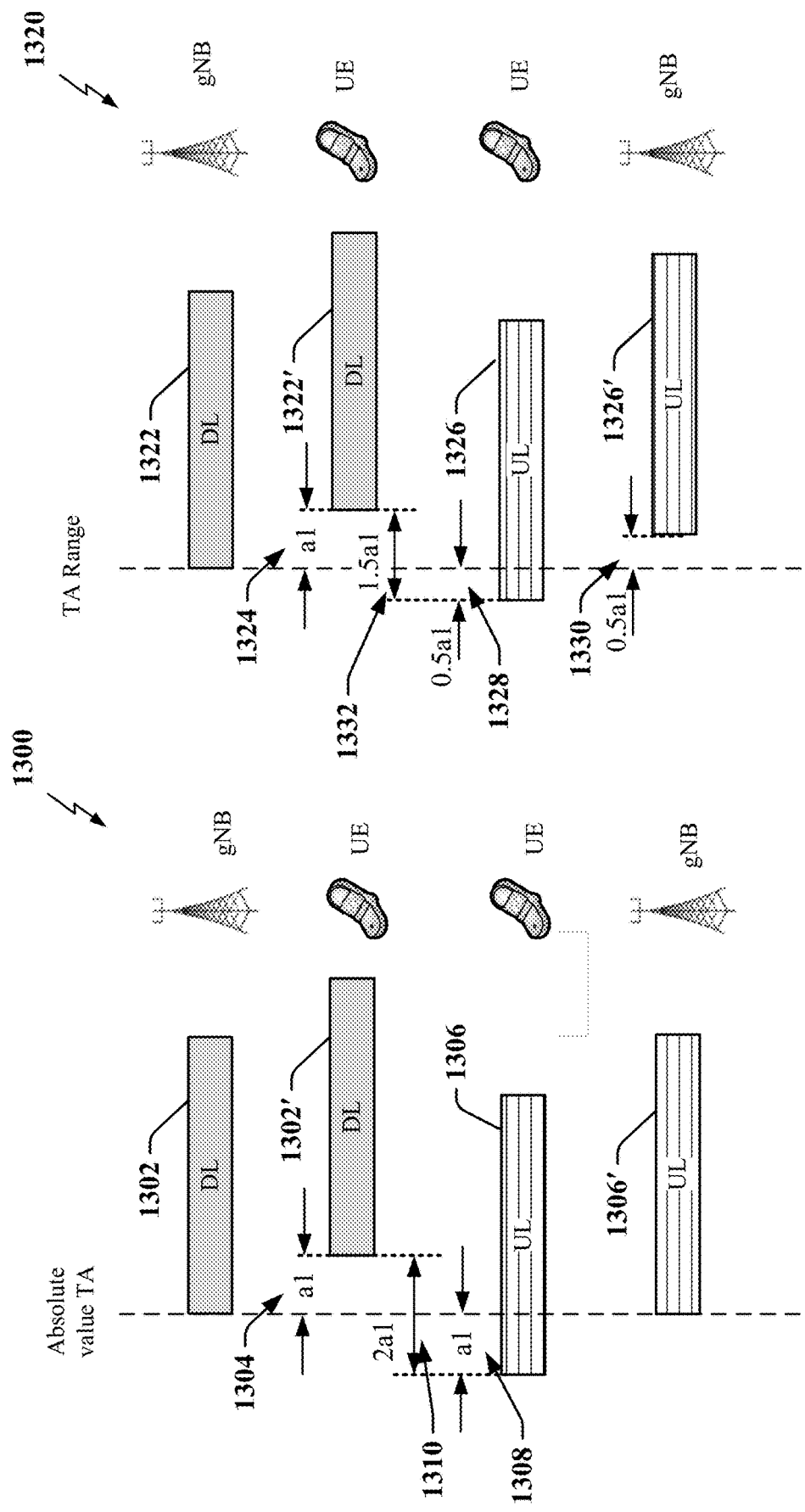
FIG. 13 illustrates timing diagrams showing the use of an absolute timing advance and a timing advance range according to some aspects.

FIG. 13 illustrates timing diagrams 1300 and 1320 showing the use of an absolute or fixed timing advance and a timing advance range, according to some aspects. Timing diagram 1300 illustrates the timing of DL and UL symbols for a system having a gNB and UE that is using a fixed TA value, which may have been indicated in the TA indication discussed above. In this case, a standard timing advance value (e.g., 2×a1 or "2a1") is used. This may be seen by the DL transmission 1302 (e.g., symbol, subframe, slot, etc.) that is transmitted by a gNB. Similar to the example of FIG. 12, the propagation delay for the DL transmission 1302 is a1 where the DL transmission 1302 arrives at the UE after this time delay (e.g., as shown by DL transmission 1302' arriving at the UE). At the UE, when transmitting in full-duplex mode, the UE transmits an UL transmission 1306 (e.g., symbol, subframe, slot, etc.) at a timing advance of a1 1308 such that the UL transmission 1306 arrives at the gNB at the same time as the transmission of DL transmission 1302 as indicated by UL transmission 1306'. It is noted that the timing in timing diagram 1300 is based on the assumption that the transmit and receive time is the same at the gNB side and the UE side, and therefore, the transmit to receive differential is 2×a1 or "2a1", which is the TA value.

Additionally, FIG. 13 illustrates a timing diagram 1320 where the gNB or base station has configured the TA indication value (e.g., the one bit value discussed above) to indicate that a TA range is allowable. In this example, although not limited to such, a timing advance value of 1.5a1 is used (which may be determined by the UE or based on an indication by the gNB), which is within a calculated or bounded range discussed in more detail below. The DL transmission 1322 is transmitted by the gNB and the propagation delay for the DL transmission 1322 is a1 where the DL transmission 1322 arrives at the UE after propagation time delay (e.g., as shown by DL transmission 1322' arriving at the UE). At the UE, when transmitting in full-duplex mode, the UE may also transmit the UL transmission 1326 at a timing advance of 1.5×a1 at 1328. In this case, since the transmission time or delay is a1, the UL transmission 1326 arrives at the gNB at approximately 0.5a1 delay after the DL transmission 1322 time as indicated by UL transmission 1326' and time delay 1330.

In the example of timing diagram 1320, on the gNB side, the transmit to receive differential is TA/4 or 0.5a1 (e.g., see 1330), assuming a normal, legacy, or typical value of TA=2a1. At the UE side, the transmit to receive differential is 3/4TA or 1.5a1 which is smaller than the typical value as shown at 1332. This example illustrates that when the TA range is indicated, the UE is allowed flexibility for deciding the TA value within a particular bounded range.

With regard to what range may be applied, it is noted that a typical TA value used in a legacy system is 2a1, as mentioned above. Thus, when a fixed TA is indicated (hereinafter, a "$TA_{indicated}$" value) in a TA command, this value may be the predetermined TA value, although it will be appreciated by those skilled in the art that some other fixed value could be used as well. At a UE side, it is noted that a TA value that is applied (hereinafter, a "$TA_{applied}$" value) may be based on the received $TA_{indicated}$ value, but applied within a bounded range.

In some cases, the gNB or base station may determine or select a $TA_{indicated}$ value that is to be used by the UE, but that also ensures that the TA value applied in the UE (i.e., the $TA_{applied}$ value) will fall within a range bounded by zero and the time duration of a CP. In an example, the $TA_{indicated}$ value may be determined based on ensuring the following relationship:

$$TA_{indicated} - CP \leq TA_{applied} \leq TA_{indicated} \quad (1)$$

where CP is the time duration of the cyclic prefix based on the selected numerology for the communication system (e.g., 4.69 μsec for a system having SCS of 15 kHz, or 2.34 μsec for a system having SCS of 30 kHz).

Figure 14:
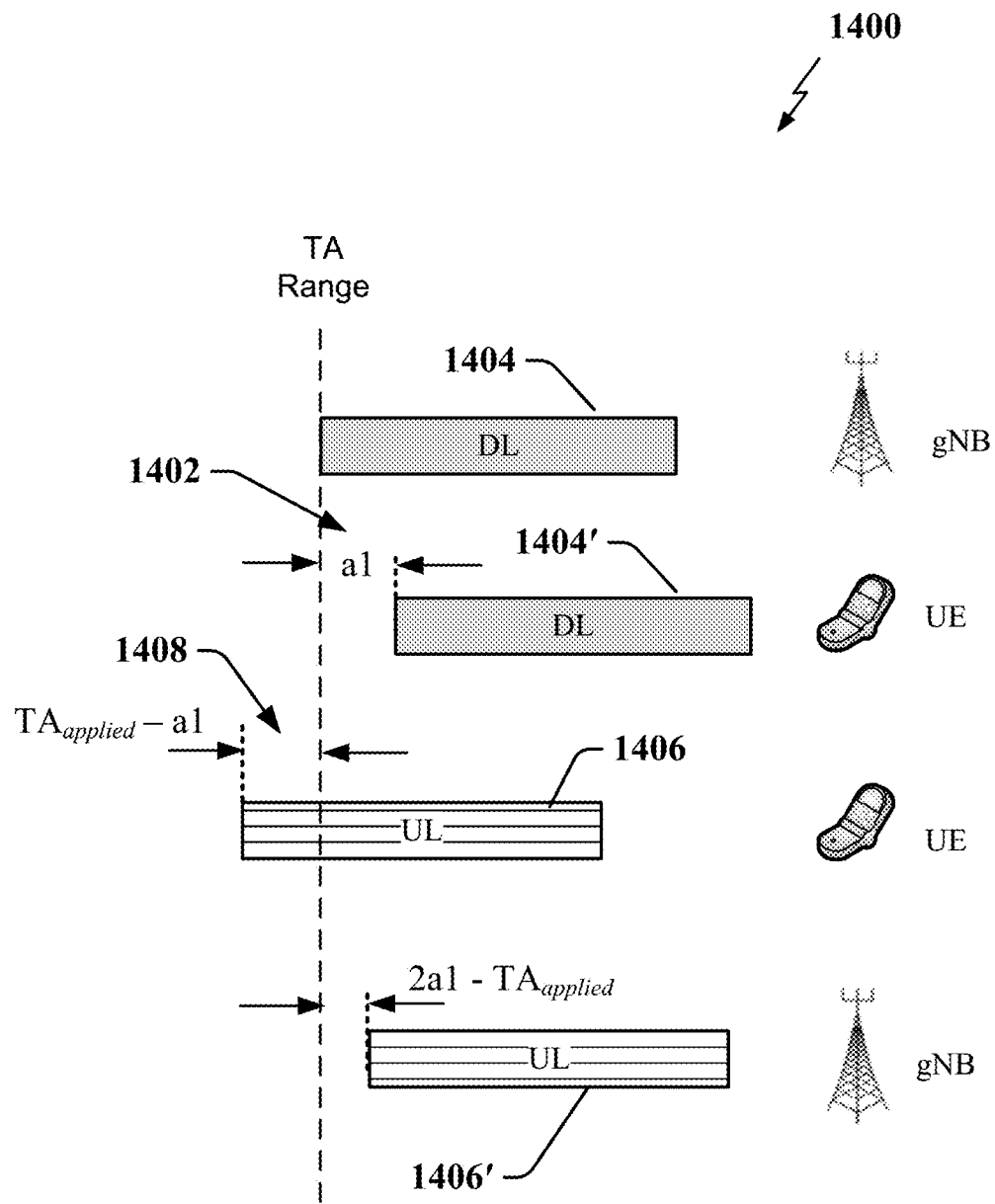
FIG. 14 illustrates a further timing diagram illustrating an example of an application of a timing advance range in a wireless communication system according to some aspects.

As an illustration, FIG. 14 illustrates a timing diagram 1400 that shows a propagation delay of a1 that is assumed for the DL transmission of a DL transmission 1404 and reception of the DL transmission 1404 at a UE after the a1 time as shown by the DL transmission 1404'. After receiving a $TA_{indicated}$ value 2a1 from the gNB, for example, the TA value that may be applied by the UE for timing advance (i.e., the $TA_{applied}$ value) may be set within the following bounded range assuming the $TA_{indicated}$ value 2a1:

$$0 \leq 2a1 - TA_{applied} \leq CP \quad (2)$$

which may be restated as the following:

$$2a1 - CP \leq TA_{applied} \leq 2a1 \quad (3)$$

FIG. 14 further illustrates that the UL transmission 1406 may be transmitted at a timing advance of $TA_{applied}$–a1 as shown at 1408, with $TA_{applied}$ being bounded by equation (3) above. Accordingly, the UL transmission 1406 is received at the gNB at a delay of $2a1-TA_{applied}$ with $2a1-TA_{applied}$ being bounded by equation (2) above from the transmission time of DL transmission 1404 as shown by UL transmission 1406'.

In further aspects, it is noted that the above relationships in equations (1)-(3) may also account for a delay spread (DS) of the downlink transmissions (or a downlink propagation delay time or downlink delay time), which refers to the time differential for receiving a signal along multiple paths. Accordingly, equations (1)-(3) above may be written as the following to account for the delay spread.

$$TA_{indicated} - CP + DS \leq TA_{applied} \leq TA_{indicated} \quad (4)$$

$$0 \leq 2a1 - TA_{applied} \leq CP - DS \quad (5)$$

$$2a1 - CP + DS \leq TA_{applied} \leq 2a1 \quad (6)$$

In some instances where the 2a1 value is greater than the cyclic prefix value at the UE, for example (although not limited to this case), the UE may determine and apply a compensation or corrective factor termed herein as delta (δ), which helps to determine a real range for the $TA_{applied}$ value and is bounded itself between zero and the value of the CP. Thus, the $TA_{applied}$ value may be determined based on the following equations which are derived from equations (1) and (4) for non-DL delay spread and DL delay spread cases, respectively:

$$TA_{applied} = TA_{indicated} - \delta \text{ where } \delta = [0, CP] \quad (7)$$

$$TA_{applied} = TA_{indicated} - \delta, \text{ where } \delta = [0, CP - DS] \quad (8)$$

Concerning the δ value, the UE may be configured to determine this value by measuring reception times of the downlink and uplink signals. In an example, the UE may be configured to select a δ value that ensures the following condition is met:

$$Trx\_d1\_i - Trx\_u1\_j\_new = Trx\_d1\_i - Trx\_u1\_j + \delta < CP, \quad (9)$$

where $Trx\_d1\_i$ is the reception time of the downlink signal from an "$i^{th}$" node (e.g., an ith transmission and reception point (TRP)), $Trx\_u1\_j$ is the reception time of the uplink signal for a "$j^{th}$" node (e.g., a $j^{th}$ transmission and reception point (TRP)), and $Trx\_u1\_j\_new = Trx\_u1\_j - \delta$. In a further example, the $Trx\_d1\_i$ and $Trx\_u1\_j$ values in equation (9) may be determined based on layer 1 (L1) signal to interference plus noise ratio (SINR) measurements. In a particular example, when performing the L1-SINR measurements, the UE may utilize CSI-RS with multiple beam sweeps and SRS with multiple beam sweeps to determine the $Trx\_d1\_i - Trx\_u1\_j$ per DL and UL beam pair. Additionally, it is noted that if the value of δ is close to the value of $Trx\_d1\_i - Trx\_u1\_j$, this may minimize the timing differentials. Also, with a particular range for δ as discussed above, this also serves to relax the criteria at a UE to satisfy timing alignment within CP.

Figure 15:
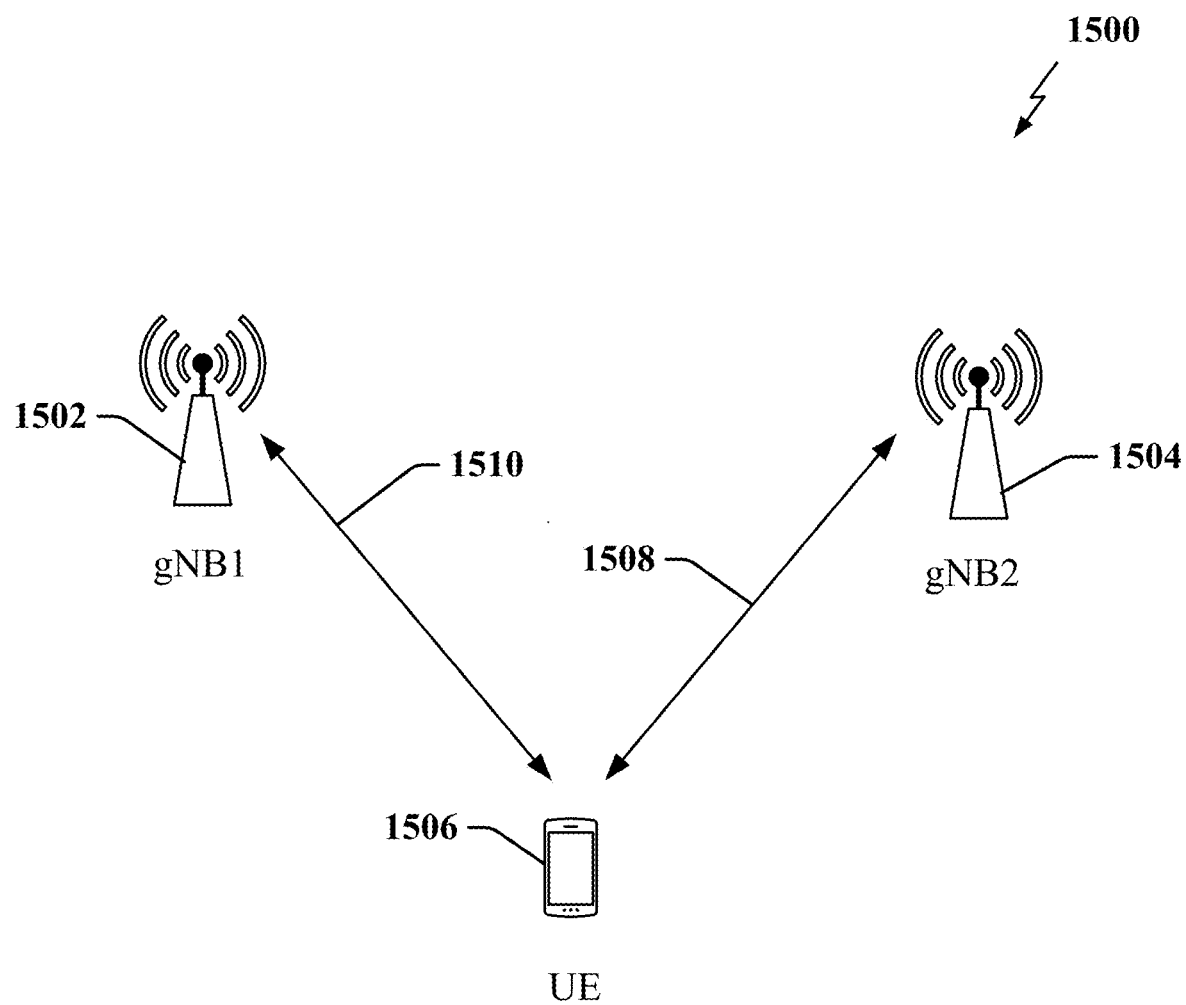
FIG. 15 illustrates a diagram of a wireless communication system utilizing multiple transmission and reception points according to some aspects.

FIG. 15 illustrates a diagram of a wireless communication system 1500 utilizing multiple transmission and reception points in which the concepts disclosed herein may be applied according to some aspects. As illustrated, the wireless communication system 1500 includes a first gNB 1502, a second gNB 1504 and at least one UE 1506. In some cases, the first gNB 1502 and the second gNB 1504 may each be a different transmission reception point (TRP). In this system, the UE 1506 may communicate in simultaneous FD mode with both of the gNBs 1502 and 1504. For example, as shown at 1508, the UE 1506 may communicate transmissions (e.g., UL and/or DL transmissions) with the first gNB 1502. Additionally, as shown at 1510, the UE 1506 may communicate transmissions (e.g., UL and/or DL transmissions) with the second gNB 1504. It is noted that the determination of the timing advance within the ranges as discussed above may be used in the UE for the UL transmissions with both gNBs based on δ, which helps to determine a real range for the $TA_{applied}$ value.

Figure 16:
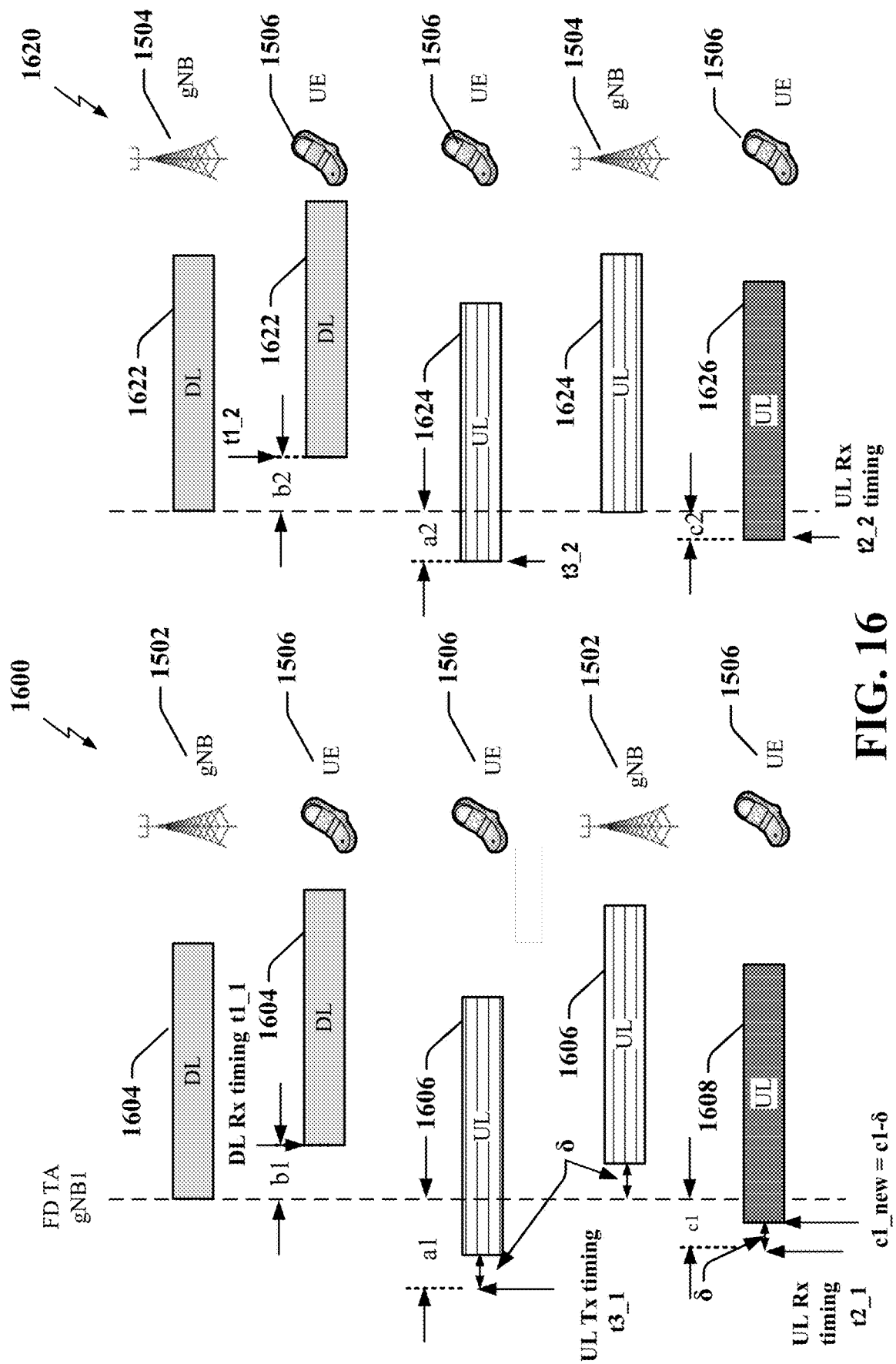
FIG. 16 illustrates an example timing diagram of transmitted symbols and the application of timing advance range for the system of FIG. 15.

FIG. 16 illustrates timelines 1600 and 1620 of FD transmissions in the wireless communication system 1500 of FIG. 15, for example. In particular, FIG. 16 illustrates further details concerning the delta (δ) value, particularly in a multi-TRP or gNB environment. In particular, timeline 1600 illustrates the timing of transmissions transmitted between the first gNB 1502 and UE 1506. The second gNB 1504 transmits a DL transmission 1604, which then is received at the UE 1506 at a downlink receive timing t1_2 after a propagation delay of b2.

On the UE side, an UL transmission 1606 transmitted from the UE 1506 to the first gNB 1502 is advanced in time by a time advance, a1, to an UL transmit timing of t3_1. In this case, however, the UL transmit timing may be delayed by the delta (δ) value to allow the UE 1506 to wait the time of the delta (δ) value before transmitting UL transmission 1606. As shown further, UL transmission 1606 may arrive at the gNB 1502 at a time δ after the transmit time of the DL transmission 1604.

Additionally, timeline 1600 shows an UL transmission 1608 for illustrating that the UE's UL transmission may be received on the UE's DL receive panel (which is self-interference (SI)). Here, a timing advance of c1 is also delayed by the time δ following the UL transmission 1606 such that a new c1 (c1_new) is equal to the c1 value less the δ value. UL transmission 1608 thus illustrates a real receiver time at a DL receiving panel of the UE 1506.

Timeline 1620 illustrates transmissions between a second gNB (e.g., the second gNB 1504) and the UE. As illustrated, the second gNB 1504 transmits a DL transmission 1622, which is then received at the UE 1506 at time t1_2 after a propagation delay of b2. The UE 1506 transmits an UL transmission 1624 at a UL transmit time 3_2 with a timing advance of a2. The UL transmission 1024 is received at the second gNB 1504 at a same time as the transmission of DL transmission 1022. Due to SI, for example, an UL transmission 1026 is illustrated to show the real UL receive timing at a DL receive panel of the UE 1506 with an advance of c2. Again, the UE 1506 is configured to set the delta value such that the difference between the downlink reception time (e.g., t1_2) and the uplink reception time (e.g., t2_1) at the UE 1506 minus the delta value is less than CP length, indicating that the relationship Trx_d1_i−Trx_u1_j_new=Trx_d1_i−Trx_u1_j+delta=b2+c1−delta<CP remains true.

Stated another way, a timing t1 may represent a DL reception time and a timing t2 may represent an UL signal reception time. In this case, determination of the correction factor δ is based on measurement of a timing difference between a first timing t1 for the DL transmission from a first gNB received at the UE and a second timing t2 for an uplink transmission to a second gNB also received at the UE, where the correction factor δ is then determined or defined according to a relationship:

$$t1-t2-\delta<CP \tag{10}$$

Figure 17:
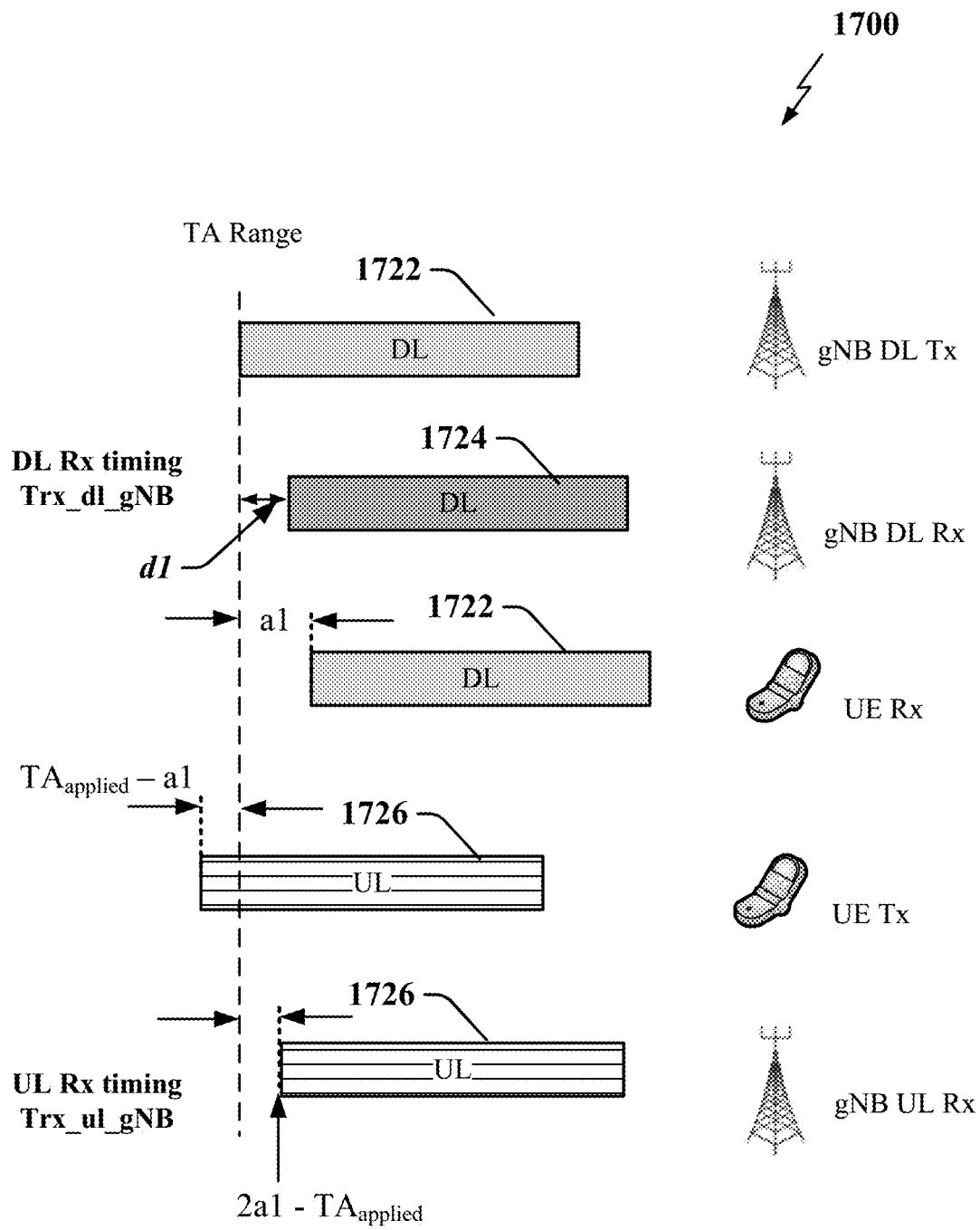
FIG. 17 illustrates another example timing diagram of transmitted symbols and the application of timing advance range according to some aspects.

FIG. 17 illustrates another signal timeline 1700 illustrating the consideration of a gNB DL self-interference propagation delay d1 to its UL beam (i.e., self-interference of the DL transmission on an UL receive beam of the gNB). In this example, a DL transmission transmitted to a UE is shown at 1722. On the UL Rx beam, however, the gNB may receive the DL transmission 1722 as illustrated by DL transmission 1724, which may include a gNB side propagation delay d1 as part of self-interference that may occur at the gNB. Additionally, the DL transmission 1722 is received at the UE.

On the UE side, an UL transmission 1726 may be transmitted by the UE at a timing advance of $TA_{applied}$-a1 compared to the gNB boundary time. After a partial propagation delay of $2a1-TA_{applied}$ compared to the gNB boundary time, the gNB receives the UL transmission 1726. In some examples, the application or compensation for the delay d1 may be accomplished according to the following relationships for non-DS systems (e.g., using Equations 10-12) and for DS systems (e.g., using Equations 13-15), respectively:

$$0 \leq 2a1 - TA_{applied} - d1 \leq CP \tag{11}$$

$$2a1 - CP - d1 \leq TA_{applied} \leq 2a1 - d1 \tag{12}$$

$$TA_{indicated} - CP - d1 \leq TA_{applied} \leq TA_{indicated} - d1 \tag{13}$$

(if $TA_{indicated}=2a1$); and $$0 \leq 2a1 - TA_{applied} - d1 \leq CP - DS \tag{14}$$

$$2a1 - CP - d1 + d \leq TA_{applied} \leq 2a1 - d1 \tag{15}$$

$$TA_{indicated} - CP - d1 + DS \leq TA_{applied} \leq TA_{indicated} - d1 \tag{16}$$

(if $TA_{indicated}=2a1$).

Figure 18:
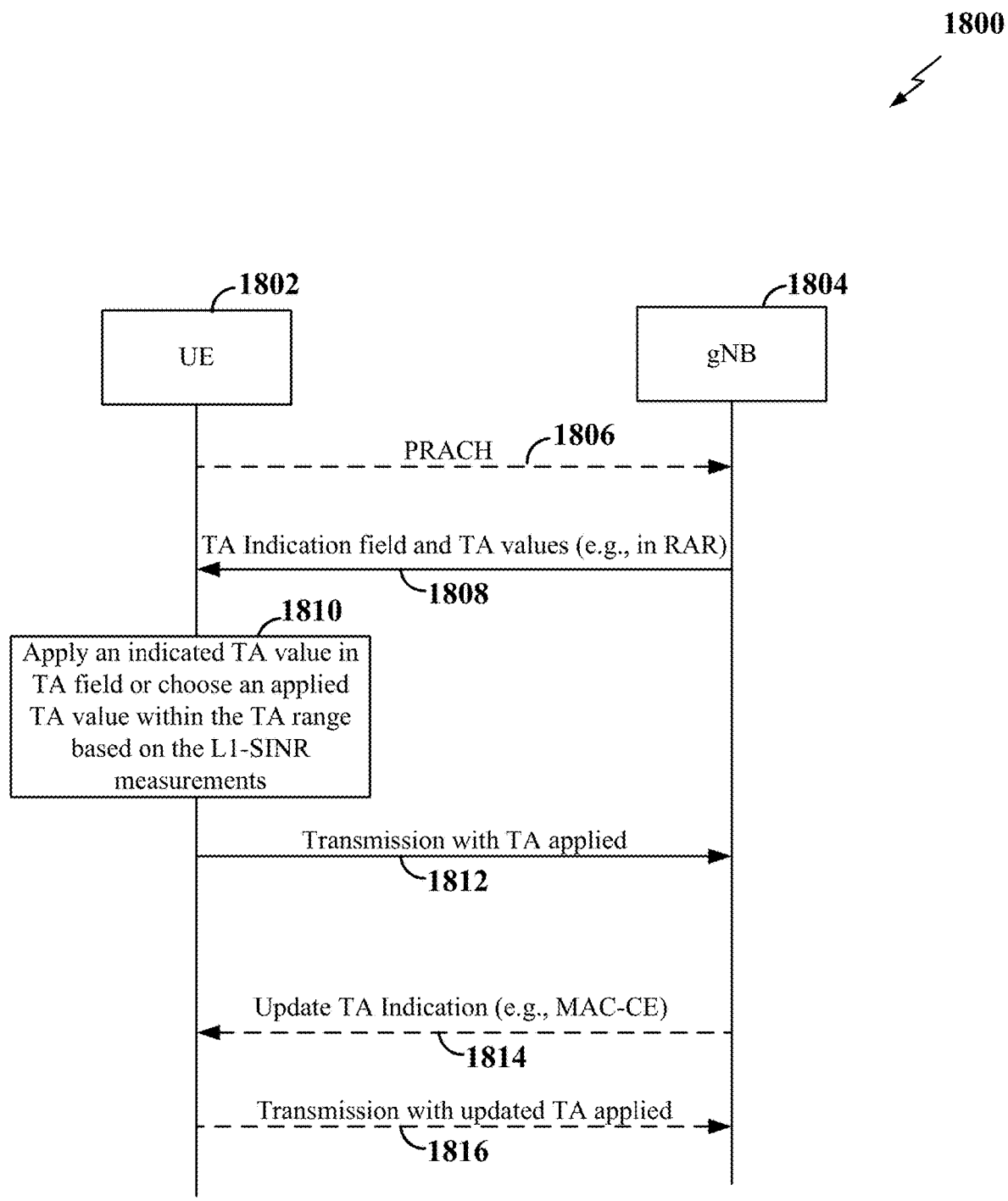
FIG. 18 is a call flow diagram of transmitted symbols in a communication system and the application of timing advance range according to some aspects.

FIG. 18 is a call flow diagram of transmissions in a communication system and the application of timing advance range according to some aspects. As illustrated, the call flow shown is between a UE 1802 and a gNB 1804, but is not limited to such and could be applied to a multi-TRP/multi-gNB system such as was shown in FIG. 15.

In the example of FIG. 18, initial access signaling or messaging such as a PRACH 1806 sent from the UE 1802 may be used by gNB 1804 to determine an initial TA to be used by the UE 1802. In aspects, the gNB 1804 may determine a TA range based on the signaling from the UE or, in other examples, have a preconfigured TA value that is not determined or based on signaling from the UE. After determination of the TA and whether a TA range may be used (i.e., thus establishing a state of the TA indication field, such as the bit state of a single bit to indicate whether or not the UE may apply a TA range or a TA absolute value, which may be a default TA value used in the communication system as discussed previously), the gNB 1804 transmits the TA indication and, in some examples, an indication of the TA (e.g., a $TA_{indicated}$) as shown at 1808. In some examples, this signaling of the TA indication may be transmitted by the gNB 1804 in a random access response (RAR) message.

Upon receipt of the TA indication at 1808, the UE 1802 may apply either a TA absolute value or a TA range for timing advance dependent on the TA indication value. Additionally, application of the TA range (e.g., determination of $TA_{applied}$) may include any of the processes discussed above in connection with FIGS. 13-17 including determination of the delta value and application of L1-SINR measurements for setting the delta value. This determination is illustrated by block 1810 showing that an indicated TA value in the TA field may be applied in one example, or the UE may choose an applied TA value within the TA range based on the L1-SINR measurements. When the TA to be applied is determined at block 1810, the UE may begin using the determined TA to transmit uplink transmissions to the gNB 1804 as illustrated at 1812.

In further aspects, the TA indication may be updated when network conditions change. Thus, when the gNB 1804 and/or the UE 1802 determine a change of the TA is required, the gNB 1804 may update the TA indication (and $TA_{indicated}$ value in some aspects) and send the updated indication (and $TA_{indicated}$, if so configured) as illustrated at 1814. In some cases, the updated TA indication may be transmitted to the UE 1802 in a MAC-CE. In other examples, the TA value range may be sent or communicated by the gNB 1804 to the UE via RRC signaling or in a DCI message. In response to the updated TA indication, the UE 1802 may apply the updated timing advance (i.e., $TA_{applied}$) to one or more additional uplink transmissions as illustrated at 1816.

Figure 19:
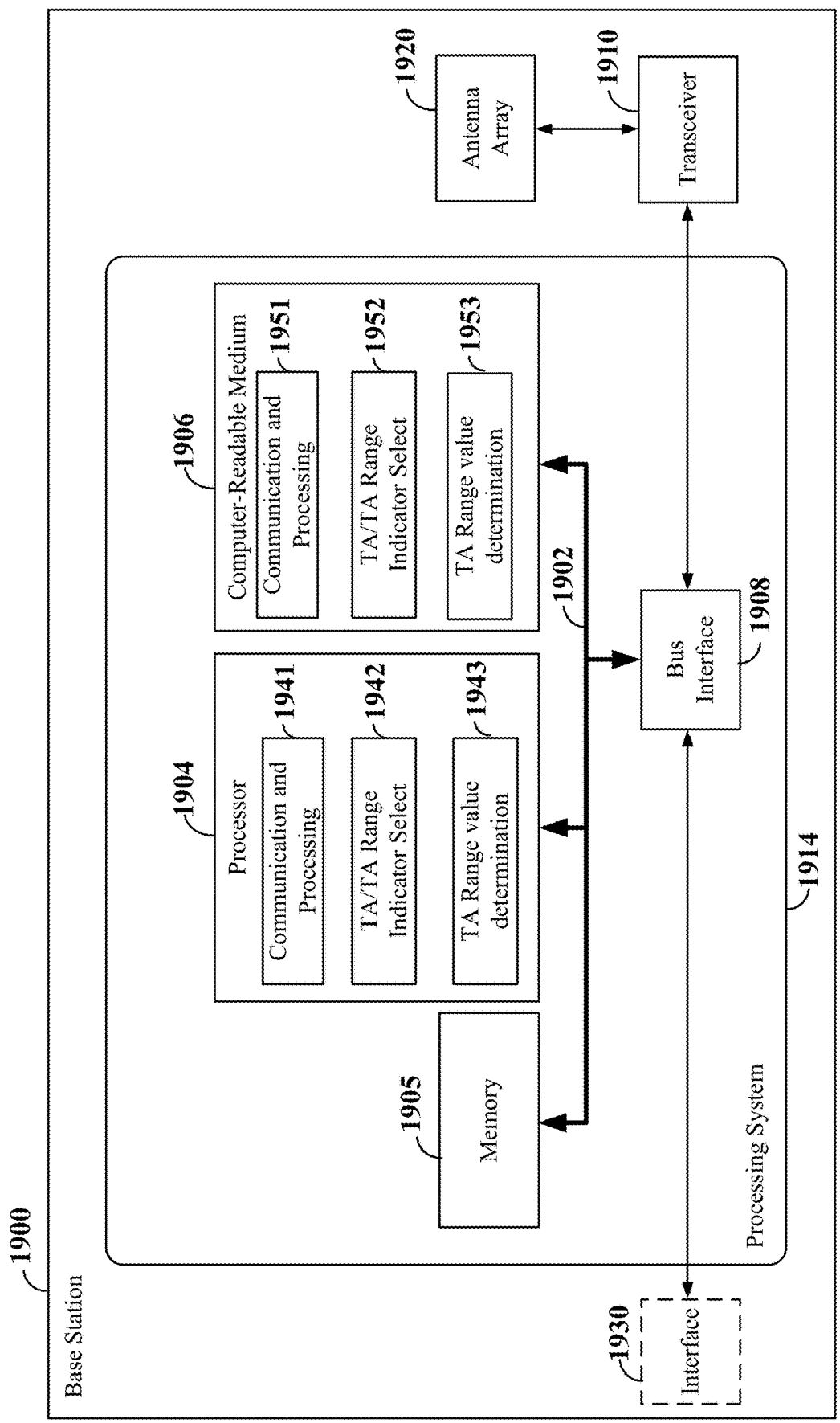
FIG. 19 is a block diagram illustrating an example of a hardware implementation for a base station employing a processing system according to some aspects.

FIG. 19 is a conceptual diagram illustrating an example hardware implementation for a base station (BS) 1900 (or gNB or other scheduling entity) employing a processing system 1914. In some implementations, the BS 1900 may correspond to any of the BSs (e.g., gNBs or scheduling entities) shown in any of FIGS. 1, 2, 4-8, and 11-18.

The BS 1900 may be implemented with a processing system 1914 that includes one or more processors 1904. Examples of processors 1904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the BS 1900 may be configured to perform any one or more of the functions described herein. That is, the processor 1904, as utilized in a BS 1900, may be used to implement any one or more of the processes described below in connection with FIG. 19.

The processor 1904 may in some instances be implemented via a baseband or modem chip and in other implementations, the processor 1904 may itself comprise a number of devices distinct and different from a baseband or modem chip (e.g., in such scenarios as may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1914 may be implemented with a bus architecture, represented generally by the bus 1902. The bus 1902 may include any number of interconnecting buses and bridges depending on the specific application of the processing system 1914 and the overall design constraints. The bus 1902 communicatively couples together various circuits including one or more processors (represented generally by the processor 1904), a memory 1905, and computer-readable media (represented generally by the computer-readable medium 1906). The bus 1902 may also link various other circuits such as timing sources, peripherals, voltage regulators, and power management circuits, which are well known in the art, and therefore, will not be described any further. A bus interface 1908 provides an interface between the bus 1902 and a transceiver 1910. The transceiver 1910 provides a means for communicating with various other apparatus over a transmission medium (e.g., air interface). Furthermore, the BS 1900 may include an interface 1930 (e.g., a network interface) that provides a means for communicating with at least one other apparatus within a core network and with at least one radio access network.

The processor 1904 is responsible for managing the bus 1902 and general processing, including the execution of software stored on the computer-readable medium 1906. The software, when executed by the processor 1904, causes the processing system 1914 to perform the various functions described below for any particular apparatus. The computer-readable medium 1906 and the memory 1905 may also be used for storing data that is manipulated by the processor 1904 when executing software.

One or more processors 1904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1906.

The computer-readable medium 1906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1906 may reside in the processing system 1914, external to the processing system 1914, or distributed across multiple entities including the processing system 1914. The computer-readable medium 1906 may be embodied in a computer program product. In some examples, the computer-readable medium 1906 may be part of the memory 1905. By way of example, a computer program product may include a computer-readable medium in packaging materials. Those skilled in the art will recognize how best to implement the described functionality presented throughout this disclosure depending on the particular application and the overall design constraints imposed on the overall system.

In various examples, the BS 1900 may be configured to perform any one or more of the operations described herein (e.g., as described above in conjunction with FIGS. 1-18 and as described below in conjunction with FIG. 20). In some aspects of the disclosure, the processor 1904, as utilized in the BS 1900, may include circuitry configured for various functions.

The processor 1904 may be include a communication and processing circuitry 1941 configured to generate, schedule, and modify a resource assignment or grant of time-frequency resources (e.g., a set of one or more resource elements). For example, the processor 1904 may schedule time-frequency resources within a plurality of time division duplex (TDD) and/or frequency division duplex (FDD) subframes, slots, and/or mini-slots to carry user data traffic and/or control information to and/or from multiple UEs. Additionally, communication and processing circuitry 1941 may be configured to implement FD mode communications, which may include SBFD in flexible TDD, FDD in paired spectrum, SBFD in unpaired spectrum, IBFD, or other types of full-duplex operations. The communication and processing circuitry 1941 may further be configured to communicate with a UE. The communication and processing circuitry 1941 may include one or more hardware components that provide the physical structure that performs various processes related to communication (e.g., signal reception and/or signal transmission) as described herein. The communication and processing circuitry 1941 may further include one or more hardware components that provide the physical structure that performs various processes related to signal processing (e.g., processing a received signal and/or processing a signal for transmission) as described herein. The communication and processing circuitry 1941 may further be configured to execute communication and processing software 1951 included on the computer-readable medium 1906 to implement one or more functions described herein.

In some examples, the communication and processing circuitry 1941 may be configured to receive an uplink signal on one or more uplink receive beams via one or more uplink receive beams applied to the uplink signal. For example, the communication and processing circuitry 1941 may be configured to receive the uplink signal on one or more uplink receive beams via at least one antenna panel of the antenna array 1920. The uplink signal may include, for example, a PUCCH, PUSCH, SRS, DMRS, or PRACH. Additionally, the communication and processing circuitry 1941 may be configured to receive one or more uplink transmit beams in an uplink beam sweep. Each uplink transmit beam may carry an uplink reference signal (e.g., an SRS) for measurement by the communication and processing circuitry 1941. The communication and processing circuitry 1941 may further be configured to obtain a plurality of beam measurements on each of a plurality of uplink receive beams of the antenna array 1920 for each of the uplink transmit beams. The communication and processing circuitry 1941 may further be configured to control the antenna array 1920 and transceiver 1910 to generate a plurality of downlink transmit beams during a downlink beam sweep. The downlink signals may include, for example, SSBs, PDCCH, PDSCH, DCI, or RAR.

In some implementations where the communication involves receiving information, the communication and processing circuitry 1941 may obtain information from a component of the BS 1900 (e.g., from the transceiver 1910 that receives the information via radio frequency signaling or some other type of signaling suitable for the applicable communication medium), process (e.g., decode) the information, and output the processed information. For example, the communication and processing circuitry 1941 may output the information to another component of the processor 1904, to the memory 1905, or to the bus interface 1908. In some examples, the communication and processing circuitry 1941 may receive one or more of signals, messages, other information, or any combination thereof. In some examples, the communication and processing circuitry 1941 may receive information via one or more channels. In some examples, the communication and processing circuitry 1941 may include functionality for a means for receiving. In some examples, the communication and processing circuitry 1941 may include functionality for a means for decoding.

In some implementations where the communication involves sending (e.g., transmitting) information, the communication and processing circuitry 1941 may obtain information (e.g., from another component of the processor 1904 such as TA/TA Range indicator selection circuitry 1942 or 1943 to be discussed below, the memory 1905, or the bus interface 1908), process (e.g., encode) the information, and output the processed information. For example, the communication and processing circuitry 1941 may output the information to the transceiver 1910 (e.g., that transmits the information via radio frequency signaling or some other type of signaling suitable for the applicable communication medium). In some examples, the communication and processing circuitry 1941 may send one or more of signals, messages, other information, or any combination thereof. In some examples, the communication and processing circuitry 1941 may send information via one or more channels. In some examples, the communication and processing circuitry 1941 may include functionality for a means for sending (e.g., a means for transmitting). In some examples, the communication and processing circuitry 1941 may include functionality for a means for encoding.

In yet other examples, the communication and processing circuitry 1941 may include a functionality for a means for determining that at least one UE in the cell or system is operating in an FD mode with the base station. This means helps determine whether to then utilize selection between an absolute TA or a TA range, which is beneficial for operation of the base station and UE in FD mode, in particular.

The processor 1904 may include a TA/TA Range indicator selection circuitry 1942 configured to perform a determination of the state of the TA indicator or indication as discussed above, which indicates the selection of either a fixed or absolute TA or a TA range to the UE as discussed herein (e.g., one or more of the operations described in conjunction with FIGS. 13-18). The TA/TA Range indicator selection circuitry 1942 also effectuates the sending of the TA indication to the UE via the transceiver 1910.

Additionally, the TA/TA Range indicator selection circuitry 1942 includes functionality for a means for sending the timing advance (TA) indication for the UE, wherein the TA indication indicates a selection of one of a fixed TA value and a TA value range is to be used by the UE during FD mode. As discussed before, this indication may be a one bit field where the state of the bit will indicate to the UE which TA mode (absolute or range) is to be used by the UE, and may be indicated in a RAR, MAC-CE, DCI, or RRC signaling. Additionally, the TA/TA Range indicator selection circuitry 1942 may communicate with communication and processing circuitry 1941 in order to send the TA indication via the transceiver 1910. The TA/TA Range indicator selection circuitry 1942 may further be configured to execute TA/TA Range indicator selection software 1952 included on the computer-readable medium 1906 to implement one or more functions described herein.

The processor 1904 may include a TA range value determination circuitry 1943 configured to perform a determination of a range value to ensure the various bounded conditions as discussed herein are met (e.g., with regard to one or more of the operations described in conjunction with FIGS. 13-18). In some examples, the TA range value determination circuitry 1943 may also determine the $TA_{indicated}$ value in light of the various range boundaries including accounting for the delta value, the delay spread, and the base station's own DL propagation delay. The TA range value determination circuitry 1943 may also include functionality for a means for determining the $TA_{indicated}$ value based on the particular cyclic prefix (CP) value for a given numerology presently being used in the communication system, as well as means for setting the $TA_{indicated}$ value to engender a particular $TA_{applied}$ value at the UE based on various bounded range conditions as were discussed before in conjunction with FIGS. 13-18. The TA range value determination circuitry 1943 may further be configured to execute TA range value determination software 1953 included on the computer-readable medium 1906 to implement one or more functions described herein.

Figure 20:
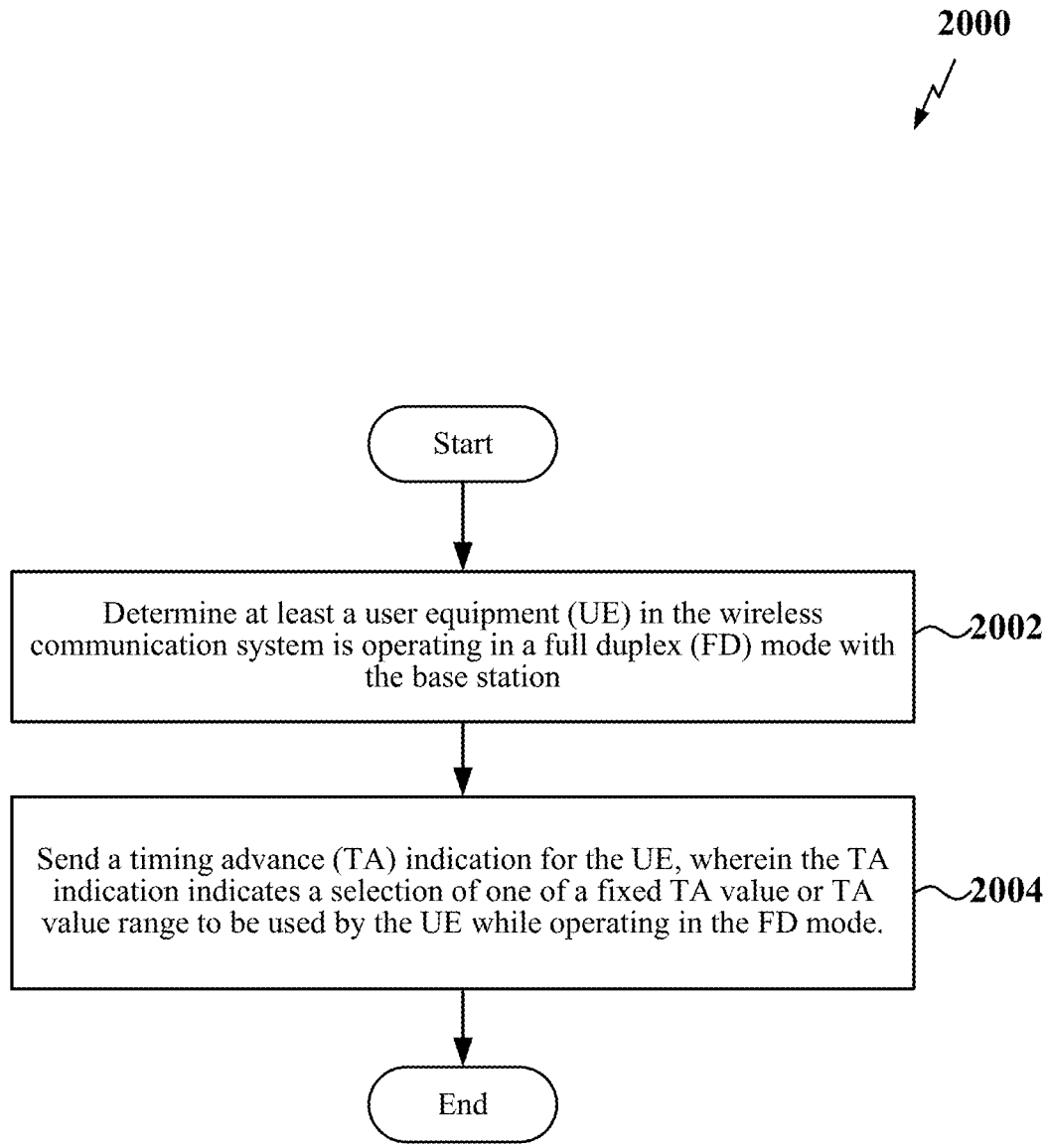
FIG. 20 is a flow chart of an example process for applying a timing advance according to some aspects.

FIG. 20 is a flow chart of an example process 2000 for timing alignment of signals by applying a timing advance according to some aspects. It is noted that some or all illustrated features may be omitted in a particular implementation within the scope of the present disclosure, and some illustrated features may not be required for implementation of all embodiments. In some examples, the process 2000 may be carried out by the BS 1900 illustrated in FIG. 19. In some examples, the process 2000 may be carried out by any suitable apparatus or means for carrying out the functions or algorithm described below.

At block 2002, the BS determines that at least a user equipment (UE) in the wireless communication system is operating according to a full-duplex (FD) mode with the base station where the UE and BS communicate simultaneously in both the UL and DL. For example, the communication and processing circuitry 1941 and the transceiver 1910, shown and described above in connection with FIG. 19, may determine if FD mode is being implemented in communication with at least one UE, or any equivalent means configured for making this determination.

At block 2004, the BS sends (e.g., transmits) a timing advance (TA) indication to the UE. In some cases, the TA indication indicates a selection where one of a fixed TA value or a TA value range to be used by the UE while operating in the FD mode. In an example, the TA/TA Range indicator selection circuitry 1942 may be configured to determine and send the TA indication to the UE during FD mode, or any equivalent means configured to achieve this functionality. In a further aspect, the TA indication may be configured for at least one of a particular panel in the UE, a particular beam group in the UE, or a particular beam pair in the UE. Of further note, the process 2000 may be able to implement the processes of block 2004 without first determining whether an FD mode is being implemented, and/or independent of such determination, such that the TA indication could be sent at predetermined times or conditions.

Figure 21:
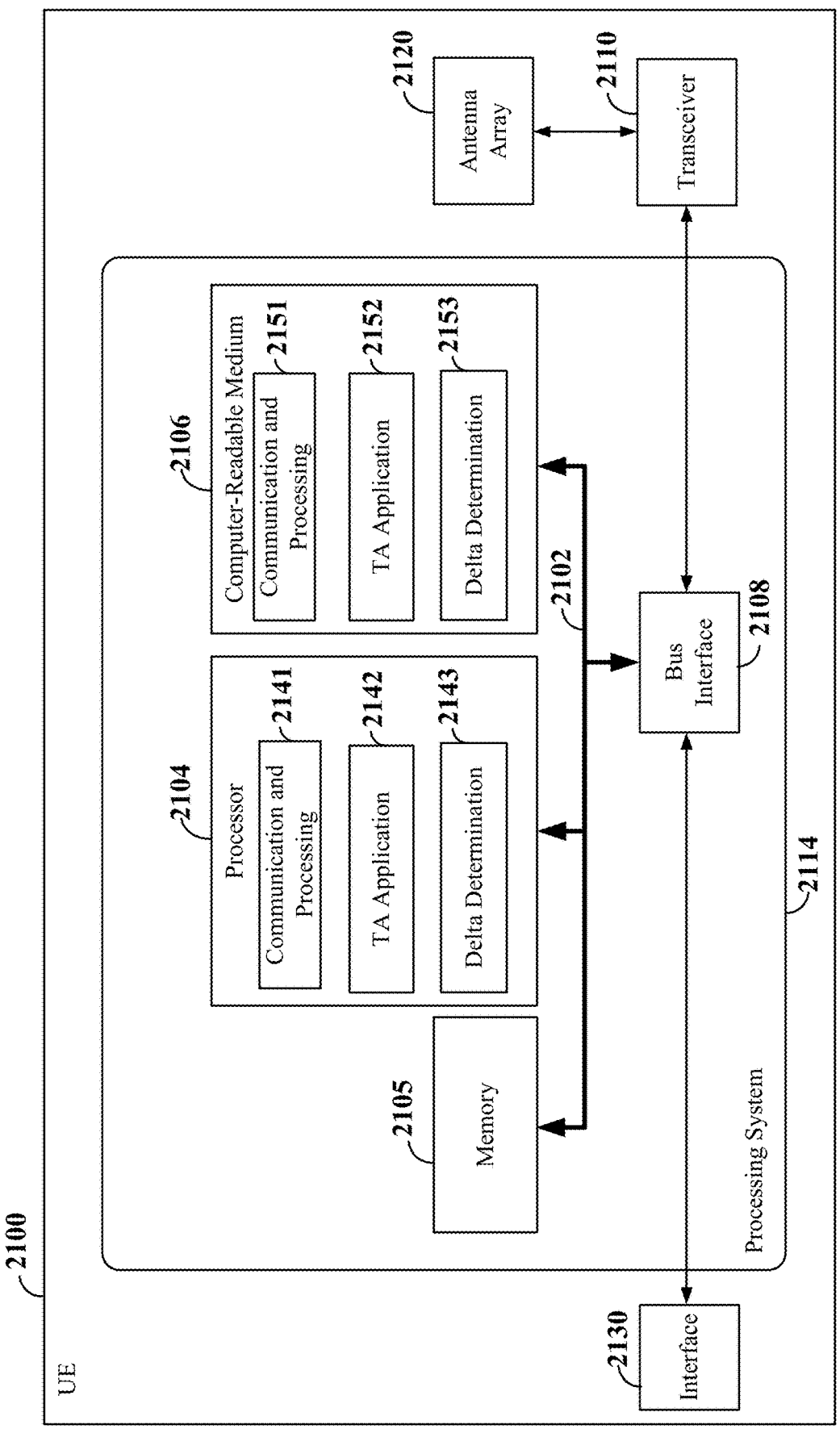
FIG. 21 is a block diagram illustrating an example of a hardware implementation for a base station employing a processing system according to some aspects.

FIG. 21 is a block diagram illustrating an example of a hardware implementation for a UE 2100 employing a processing system 2114. For example, the UE 2100 may be a user equipment (UE) or other device configured to wirelessly communicate with a base station, as discussed in any one or more of FIGS. 1, 2, 4-8, and 11-18. In some implementations, the UE 1304 may correspond to any of the UEs or scheduled entities shown in FIGS. 1, 2, 4-8, and 11-18 may be substantially the same as the processing system 1914 illustrated in FIG. 19.

In accordance with various aspects of the disclosure, an element, or any portion of an element, or any combination of elements may be implemented with the processing system 2114. The processing system 2114 may include one or more processors 2104. Examples of processors 2104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 2100 may be configured to perform any one or more of the functions described herein. That is, the processor 2104, as utilized in a UE 2100, may be used to implement any one or more of the processes and procedures described herein.

The processor 2104 may in some instances be implemented via a baseband or modem chip and in other implementations, the processor 2104 may itself comprise a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 2114 may be implemented with a bus architecture, represented generally by the bus 2102. The bus 2102 may include any number of interconnecting buses and bridges depending on the specific application of the processing system 2114 and the overall design constraints. The bus 2102 communicatively couples together various circuits including one or more processors (represented generally by the processor 2104), a memory 2105, and computer-readable media (represented generally by the computer-readable medium 2106). The bus 2102 may also link various other circuits such as timing sources, peripherals, voltage regulators, and power management circuits, which are well known in the art, and therefore, will not be described any further. A bus interface 2108 provides an interface between the bus 2102 and a transceiver 2110 and between the bus 2102 and an interface 2130. The transceiver 2110 provides a communication interface or means for communicating with various other apparatus over a wireless transmission medium. Depending upon the nature of the apparatus, the interface 2130 may include a user interface (e.g., keypad, display, speaker, microphone, joystick, etc.). Of course, such a user interface is optional, and may be omitted in some examples, such as an IoT device.

The processor 2104 is responsible for managing the bus 2102 and general processing, including the execution of software stored on the computer-readable medium 2106. The software, when executed by the processor 2104, causes the processing system 2114 to perform the various functions described below for any particular apparatus. The computer-readable medium 2106 and the memory 2105 may also be used for storing data that is manipulated by the processor 2104 when executing software.

One or more processors 2104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2106.

The computer-readable medium 2106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2106 may reside in the processing system 2114, external to the processing system 2114, or distributed across multiple entities including the processing system 2114. The computer-readable medium 2106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 2100 may be configured to perform any one or more of the operations described herein (e.g., as described above in conjunction with FIGS. 1-18). In some aspects of the disclosure, the processor 2104, as utilized in the UE 2100, may include circuitry configured for various functions.

The processor 2104 may include communication and processing circuitry 2141. The communication and processing circuitry 2141 may be configured to communicate with a base station, such as a gNB. The communication and processing circuitry 2141 may include one or more hardware components that provide the physical structure that performs various processes related to wireless communication (e.g., signal reception and/or signal transmission) as described herein. The communication and processing circuitry 2141 may further include one or more hardware components that provide the physical structure that performs various processes related to signal processing (e.g., processing a received signal and/or processing a signal for transmission) as described herein. In some examples, the communication and processing circuitry 2141 may include two or more transmit/receive chains, each configured to process signals in a different RAT (or RAN) type. The communication and processing circuitry 2141 may further be configured to execute communication and processing software 2151 included on the computer-readable medium 2106 to implement one or more functions described herein.

In some examples, the communication and processing circuitry 2141 may be configured to receive and process downlink beamformed signals at an mmWave frequency or a sub-6 GHz frequency via the transceiver 2110 and an antenna array 2120. For example, the communication and processing circuitry 2141 may be configured to receive a respective reference signal (e.g., SSB or CSI-RS) on each of a plurality of downlink beams from the base station during a downlink beam sweep via at least one antenna panel of the antenna array 2120. The communication and processing circuitry 2141 may further be configured to transmit a beam measurement report to the base station.

The communication and processing circuitry 2141 may further be configured to generate and transmit an uplink signal on one or more uplink transmit beams applied to the uplink signal. The uplink signal may include, for example, a PUCCH, PUSCH, SRS, DMRS, or PRACH.

The communication and processing circuitry 2141 may further be configured to control the antenna array 2120 and the transceiver 2110 to search for and identify a plurality of downlink transmit beams during a downlink beam sweep. The communication and processing circuitry 2141 may further be configured to obtain a plurality of beam measurements on each of a plurality of downlink receive beams via the antenna array 2120 for each of the identified downlink transmit beams. The communication and processing circuitry 2141 may further be configured to generate a beam measurement report for transmission to the base station using the communication and processing circuitry 2141.

In some implementations where the communication involves receiving information, the communication and processing circuitry 2141 may obtain information from a component of the UE 2100 (e.g., from the transceiver 2110 that receives the information via radio frequency signaling or some other type of signaling suitable for the applicable communication medium), process (e.g., decode) the information, and output the processed information. For example, the communication and processing circuitry 2141 may output the information to another component of the processor 2104, to the memory 2105, or to the bus interface 2108. In some examples, the communication and processing circuitry 2141 may receive one or more of signals, messages, other information, or any combination thereof. In some examples, the communication and processing circuitry 2141 may receive information via one or more channels. In some examples, the communication and processing circuitry 2141 may include functionality for a means for receiving.

In some implementations where the communication involves sending (e.g., transmitting) information, the communication and processing circuitry 2141 may obtain information (e.g., from another component of the processor 2104, the memory 2105, or the bus interface 2108), process (e.g., encode) the information, and output the processed information. For example, the communication and processing circuitry 2141 may output the information to the transceiver 2110 (e.g., that transmits the information via radio frequency signaling or some other type of signaling suitable for the applicable communication medium). In some examples, the communication and processing circuitry 2141 may send one or more of signals, messages, other information, or any combination thereof. In some examples, the communication and processing circuitry 2141 may send information via one or more channels. In some examples, the communication and processing circuitry 2141 may include functionality for a means for sending (e.g., a means for transmitting).

The processor 2104 may include TA application circuitry 2142 configured to apply the indicated TA from the BS as discussed herein. The TA application circuitry 2142 may include functionality for a means for applying the TA including ensuring a TA applied falls within the bounded ranges as discussed above with respect to equations 1-15. The TA application circuitry 2142 may further be configured to execute TA application software 2152 included on the computer-readable medium 2106 to implement one or more functions described herein.

The processor 2104 may further include a delta determination circuitry 2143 configured to perform a determination of the corrective factor S. The delta determination circuitry 2143 may include functionality for a means for determining the delta value according to the processes discussed in connection with FIGS. 13-17. The delta determination circuitry 2143 may further be configured to execute delta determination software 2153 included on the computer-readable medium 2106 to implement one or more functions described herein.

Figure 22:
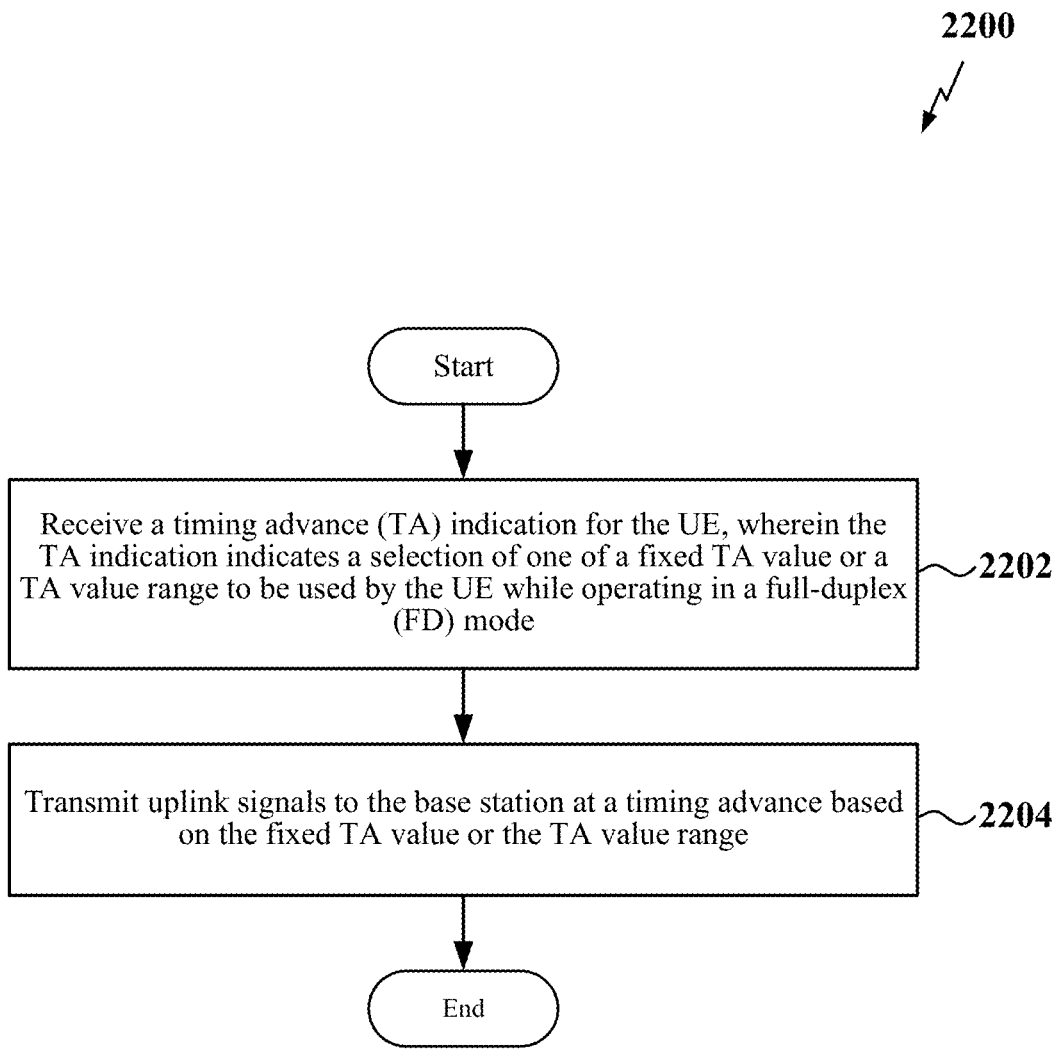
FIG. 22 is a flow chart of another example process for applying a timing advance according to some aspects.

FIG. 22 is a flow chart illustrating an example process 2200 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 2200 may be carried out by the UE 2100 illustrated in FIG. 21. In some examples, the process 2200 may be carried out by any suitable apparatus or means for carrying out the functions or algorithm described below.

At block 2202, the UE may receive, from the base station, a timing advance (TA) indication for the UE, wherein the TA indication indicates a selection of one of a fixed TA value and a TA value range to be used by the UE during FD mode.

At block 2204, the UE may transmit one or more uplink signals to the base station at a timing advance based on the fixed TA value when indicated and the TA value range when indicated.

Aspects Related to Timing Advance Capability and Full-Duplex Timing Advance

In addition to being configured to use FD mode, and in addition to being configured to apply timing advance to uplink transmissions, UEs according to some aspects described herein, may further be configured with a capability to adjust the timing advances provisioned to UEs in timing advance commands sent from a base station. The capability to adjust the timing advances provisioned to UEs in timing advance commands may further improve latency and spectral efficiency by allowing each UE to fine tune the timing advance provisioned to it by the base station.

However, not all UEs may be configured for timing advance adjustment. For example, low cost UEs may not have a capability to adjust timing advance due to lack of memory or reduced processing power (e.g., in comparison to UEs that do have a capability to adjust timing advance). According to some aspects described herein, UEs may inform a base station as to whether the UEs have the timing advance adjustment capability. Even low cost UEs could be configured with a feature that allows the low cost UEs to inform a base station of such a lack of capability. For example, in some cases, a UE may use a single bit within signaling transmitted to the base station to indicate timing advance adjustment capability of the UE. The single bit may be preconfigured in the UE. In some cases, the single bit may be included in any number of reserved (e.g., unused) bits presently available in uplink transmissions such as in RRC signaling, MAC signaling, or uplink control information signaling, by way of example.

Once the base station is provided with an indication of the UE's capability to perform timing advance adjustment, the base station may adjust its own timing to accommodate UEs that have the capability as well as UEs that do not have the capability.

Figure 23:
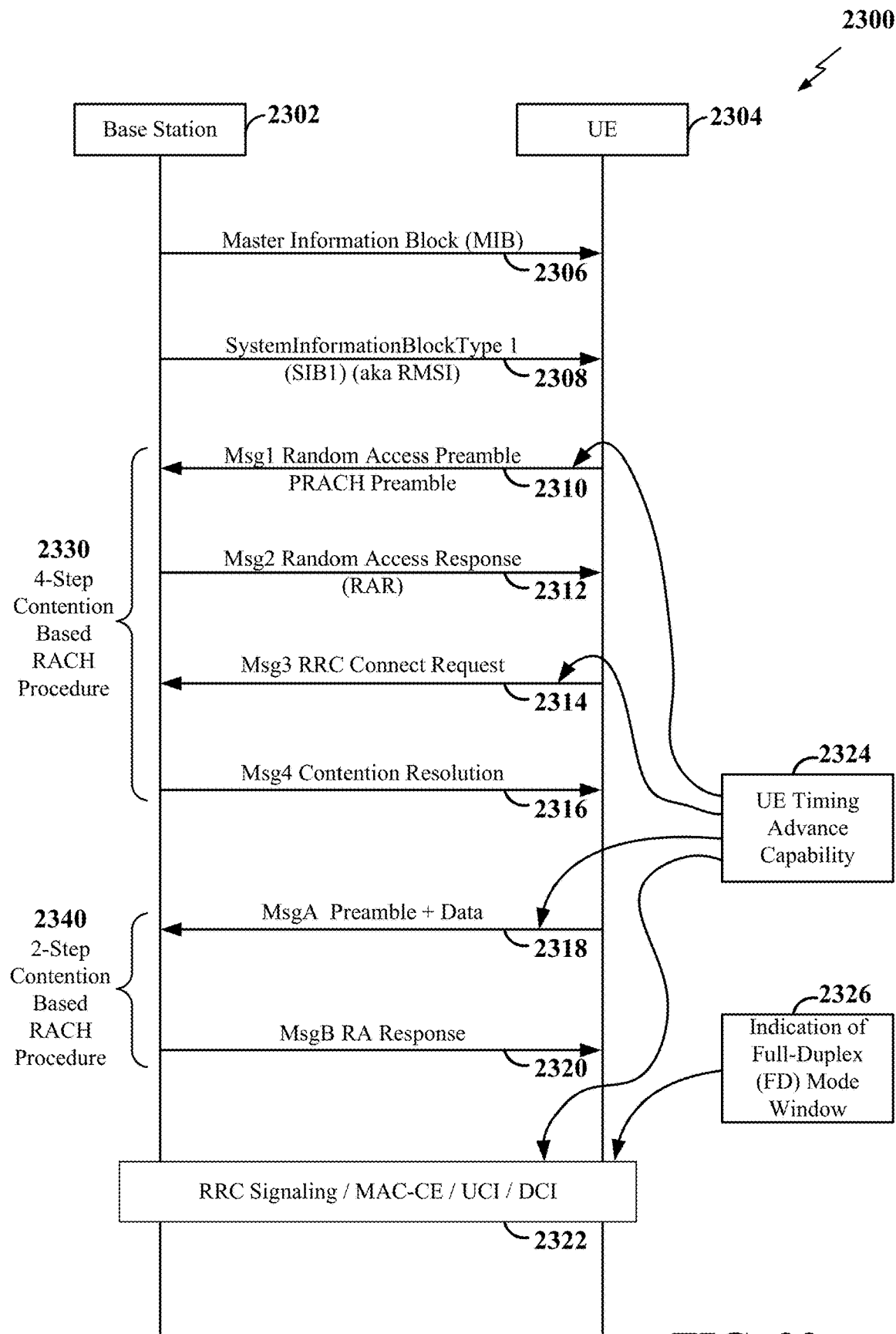
FIG. 23 is a signaling diagram illustrating a plurality of possible opportunities for a UE to inform a base station of the UE's capability regarding timing advance adjustment according to some aspects.

FIG. 23 is a signaling diagram 2300 illustrating a plurality of possible opportunities for a UE 2304 to inform a base station 2302 of a capability of the UE 2304 regarding timing advance adjustment according to some aspects. The base station 2302 (e.g., a network access node, a scheduling entity) may be similar to, for example, any of the base stations or scheduling entities shown in any of FIGS. 1, 2, 4, 5-8, 11-12, 23, and/or 29. The UE 1104 may be similar to, for example, any of the UEs or scheduled entities of FIGS. 1, 2, 4, 5-8, 11-12, and/or 23-24.

As shown in FIG. 23, the base station 2302 first broadcasts a master information block (MIB) 2308. The UE 2304 receives the MIB 2308. The MIB is transmitted over a broadcast channel (BCH) transport channel and a physical broadcast channel (PBCH) physical channel. The MIB 2308 includes parameters required to decode a first system information block (e.g., SystemInformationBlockType1 or SIB1) and other information. Thereafter, the base station 2302 broadcasts SIB1 2308. The SIB1 may also be referred to as the remaining minimum system information (RMSI). The base station 2302 may also transit other system information (OSI) (not shown).

When the UE 2304 has all relevant information (e.g., at least the MIB and SIB1), the UE 2304 may enter into a contention-based random access procedure. One random access channel (RACH) procedure may be known as a 4-step contention based RACH procedure 2330. To begin 4-step contention based RACH procedure 2330, the UE 2304 may transmit a contention-based PRACH preamble, also known as Msg1 2310. After detecting the Msg1 2310, the base station 2302 responds with a random-access response (RAR), also known as Msg2 2312. The Msg2 2312 may include the detected preamble ID, a time-advance command, a temporary C-RNTI (TC-RNTI), and an uplink grant for scheduling a PUSCH transmission from the UE 2304. The UE may transmit an RRC connect request, also known as the Msg3 2314 in response to the Msg2 2312. The Msg3 2312 may include an ID for contention resolution. Upon receiving Msg3 2312, the base station 2302 may transmit a contention resolution message, also known as Msg4 2314, with the contention resolution ID. The UE receives Msg4 2314, and if it finds its contention-resolution ID it sends an acknowledgement on a physical uplink control channel (PUCCH), which completes the 4-step random access procedure.

In 5G NR, an alternative to the 4-step contention based RACH procedure 2330 is available. The alternative may be referred to as a 2-step contention based RACH procedure 2340. The 4-step contention based RACH procedure 2330 utilizes two round-trip cycles between, for example, the UE 2304 and the base station 2302. The 2-step contention based RACH procedure 2340 may reduce latency and control-signaling overhead by its use of only one round trip cycle between the UE 2304 and the base station 2302. The round trip reduction may be achieved by combining the Msg1 and Msg3 of the 4-step contention based RACH procedure 2330 into a single message, referred to as MsgA 2318.

The UE 2304 may transmit MsgA 2318 up to the base station 2302. The MsgA 2318 may include the PRACH preamble and other data. The base station 2302 may respond to the UE 2304 with MsgB 2320. The MsgB 2320 may include content previously associated with Msg2 and Msg4, including timing advance.

According to aspects described herein, the message or signaling indicating a UE timing advance capability 2324 may be included with the Msg1 2310 random access preamble, the Msg3 2314 RRC connect request, or the MsgA 2318 preamble. An indication of a location of an FD mode window 2326 (e.g., an opportunity), may be transmitted from the base station 2302 to the UE 2304 in at least one of: RRC signaling, a medium access control-control element (MAC-CE), or downlink control information (DCI) 2322. The FD mode window may be used, for example, when the base station 2302 is interacting with a plurality of UEs in a dense network. The FD mode window may be used to permit the base station 2302 to communicate with the UE 2304 at an assigned time.

Figure 24:
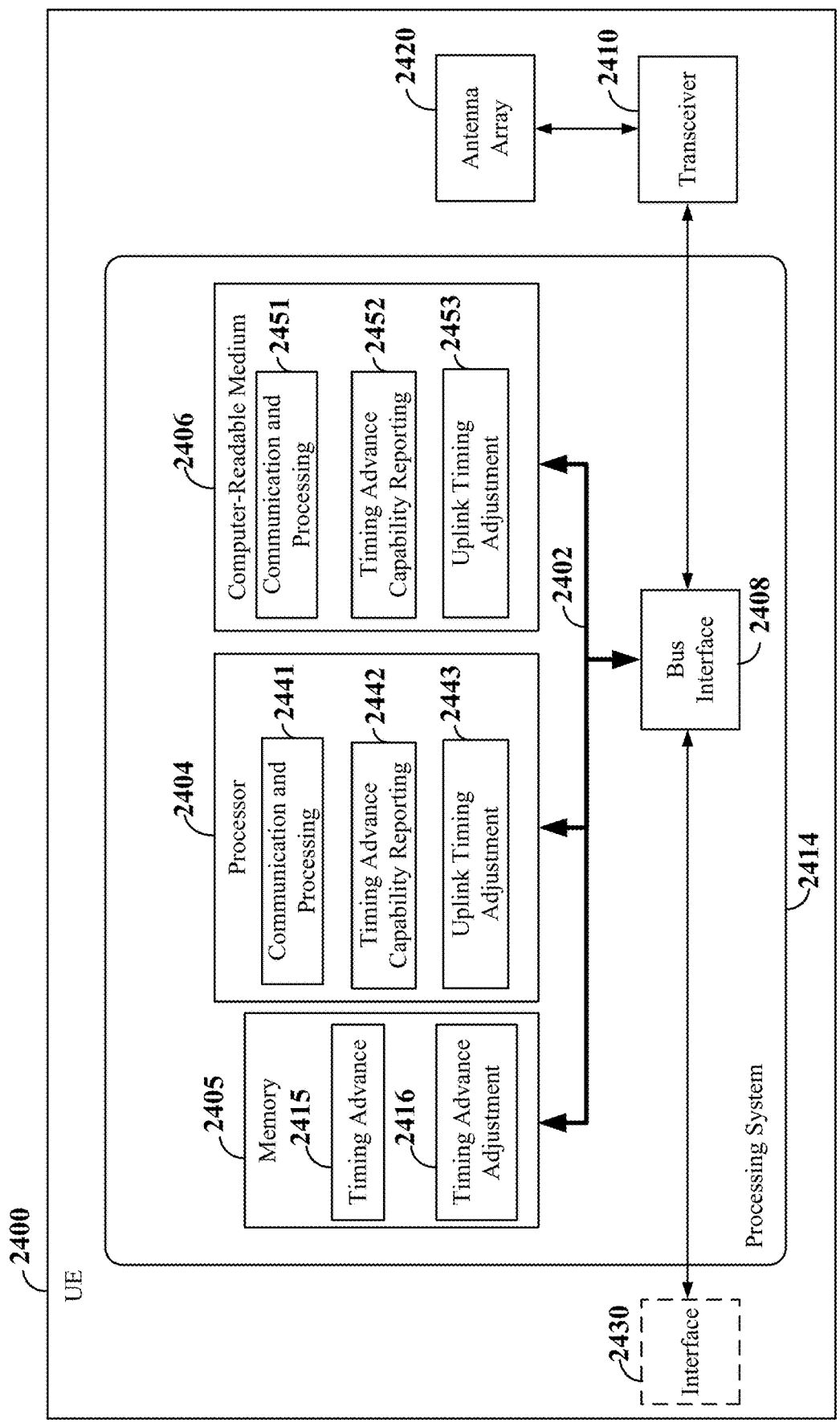
FIG. 24 is a block diagram illustrating an example of a hardware implementation of a user equipment (UE) employing a processing system according to some aspects.

FIG. 24 is a block diagram illustrating an example of a hardware implementation of a user equipment (UE) 2400 (e.g., a scheduled entity) employing a processing system 2414 according to some aspects. The UE 2400 may be similar to, for example, any of the UEs or scheduled entities of FIGS. 1, 2, 4, 5-8, 11-12, and/or 23-24.

In accordance with various aspects of the disclosure, an element, or any portion of an element, or any combination of elements may be implemented with a processing system 2414 that includes one or more processors, such as processor 2404. Examples of processors 2404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 2400 may be configured to perform any one or more of the functions described herein. That is, the processor 2404, as utilized in the UE 2400, may be used to implement any one or more of the methods or processes described and illustrated, for example, in FIGS. 25-28.

In this example, the processing system 2414 may be implemented with a bus architecture, represented generally by the bus 2402. The bus 2402 may include any number of interconnecting buses and bridges depending on the specific application of the processing system 2414 and the overall design constraints. The bus 2402 communicatively couples together various circuits including one or more processors (represented generally by the processor 2404), a memory 2405, and computer-readable media (represented generally by the computer-readable medium 2406). The bus 2402 may also link various other circuits such as timing sources, peripherals, voltage regulators, and power management circuits, which are well known in the art, and therefore, will not be described any further.

A bus interface 2408 provides an interface between the bus 2402 and a transceiver 2410. The transceiver 241210 may be, for example, a wireless transceiver. The transceiver 2410 provides a means for communicating with various other apparatus over a transmission medium (e.g., air interface). The transceiver 2410 may further be coupled to one or more antenna arrays 2420. The transceiver 2410 may be a wireless transceiver. The bus interface 2408 further provides an interface between the bus 2402 and a user interface 2412 (e.g., keypad, display, touch screen, speaker, microphone, control features, etc.). Of course, such a user interface 2412 is optional, and may be omitted in some examples.

One or more processors, such as processor 2404, may be responsible for managing the bus 2402 and general processing, including the execution of software stored on the computer-readable medium 2406. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 2406. The software, when executed by the processor 2404, causes the processing system 2414 to perform the various processes and functions described herein for any particular apparatus.

The computer-readable medium 2406 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2406 may reside in the processing system 2414, external to the processing system 2414, or distributed across multiple entities including the processing system 2414. The computer-readable medium 2406 may be embodied in a computer program product or article of manufacture. By way of example, a computer program product or article of manufacture may include a computer-readable medium in packaging materials. In some examples, the computer-readable medium 2406 may be part of the memory 2405. Those skilled in the art will recognize how best to implement the described functionality presented throughout this disclosure depending on the particular application and the overall design constraints imposed on the overall system. The computer-readable medium 2406 and/or the memory 2405 may also be used for storing data that is manipulated by the processor 2404 when executing software. For example, the memory 2405 may store a timing advance 2415 indicated to the UE 2400 in a timing advance command. In the way of another example, the memory 2405 may store a timing advance adjustment value 2416 that may be repeatedly used in connection with adjustment of timing of uplink signals transmitted to a base station (e.g., network access node).

In some aspects of the disclosure, the processor 2404 may include communication and processing circuitry 2441 configured for various functions, including for example communicating with a base station (e.g., a scheduled entity), a network core (e.g., a 5G core network), and another user equipment (UE) (e.g., a scheduled entity), or any other entity, such as, for example, local infrastructure or an entity communicating with the UE 2400 via the Internet, such as a network provider. In some examples, the communication and processing circuitry 2441 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 2441 may be configured to receive a timing advance command from a base station (e.g., network access node), send a value indicative of a timing advance capability to the base station; and transmit an uplink signal to the base station (e.g., a network access node) using an adjusted timing advance determined by the communication and processing circuitry 2441. The communication and processing circuitry 2441 may further be configured to execute communication and processing software 2451 stored on the computer-readable medium 2406 to implement one or more functions described herein.

In some aspects of the disclosure, the processor 2404 may include timing advance capability reporting circuitry 2442 configured for various functions, including, for example, determining to indicate the timing advance capability of the UE in a timing advance capability report, message, or signal, for example. In some examples, the timing advance capability reporting circuitry 2442 may include one or more hardware components that provide the physical structure that performs processes related to determining to indicate the timing advance capability of the UE in the timing advance capability report, message, or signal, for example. The timing advance capability reporting circuitry 2442 may further be configured to execute timing advance capability reporting software 2452 stored on the computer-readable medium 2406 to implement one or more functions described herein.

In some aspects of the disclosure, the processor 2404 may include uplink timing adjustment circuitry 2443 configured for various functions, including, for example, adjusting a timing advance indicated by the timing advance command based on the timing advance capability to yield an adjusted timing advance. In some examples, the uplink timing adjustment circuitry 2443 may include one or more hardware components that provide the physical structure that performs processes related to adjusting a timing advance indicated by the timing advance command based on the timing advance capability to yield an adjusted timing advance. The uplink timing adjustment circuitry 2443 may further be configured to execute uplink timing adjustment software 2453 stored on the computer-readable medium 2406 to implement one or more functions described herein.

Figure 25:
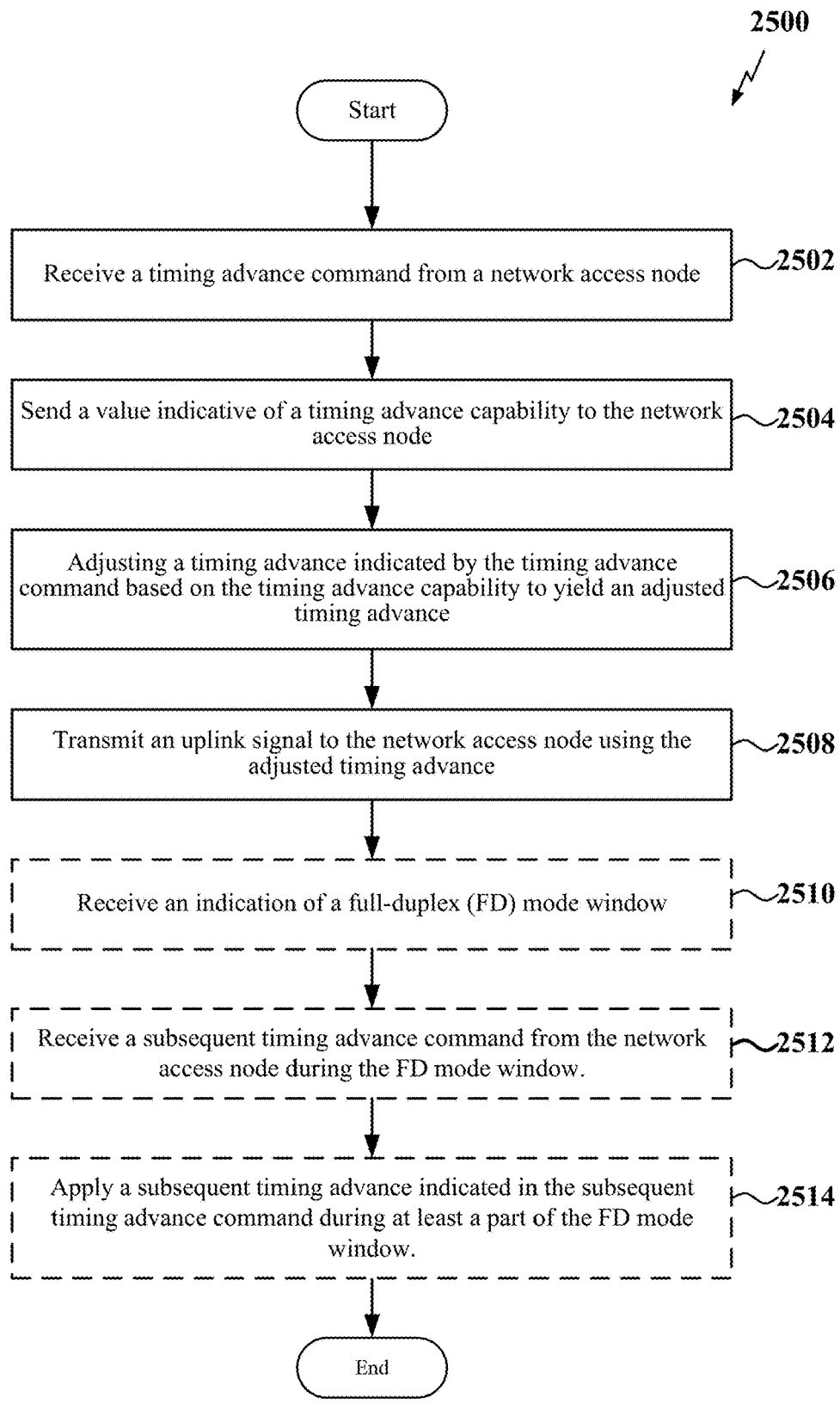
FIG. 25 is a flow chart illustrating an example process of wireless communication in a wireless communication network at a user equipment (UE) in accordance with some aspects.

FIG. 25 is a flow chart illustrating an example process 2500 (e.g., a method) of wireless communication in a wireless communication network at a user equipment (UE) in accordance with some aspects. As described below, some or all illustrated features may be omitted in a particular implementation within the scope of the present disclosure, and some illustrated features may not be required for implementation of all embodiments. In some examples, the process 2500 may be carried out by the UE 24500 (e.g., a scheduled entity) illustrated in FIG. 24. The UE 2400 may be similar to, for example, any of the UEs or scheduled entities of FIGS. 1, 2, 4, 5-8, 11-12, and/or 23-24. In some examples, the process 2500 may be carried out by any suitable apparatus or means for carrying out the functions or algorithm described below.

At block 2502, the UE may receive a timing advance command from a network access node (e.g., a base station). For example, the communication and processing circuitry 2441 shown and described above in connection with FIG. 24 may provide a means to receive a timing advance command from a network access node. At block 2504, the UE may send a value indicative of a timing advance capability to the network access node. According to some aspects, the timing advance capability may indicate that the UE has a capability to adjust the timing advance indicated by the timing advance command. In one example, the capability to indicate that the UE has the capability to adjust the timing advance indicated by the timing advance command may include the capability indicate that the UE does not have the capability to adjust the timing advance indicated by the timing advance command. For example, a timing advance capability bit could be set to a first state to indicate the UE has the capability and be set to a second state to indicate that the UE does not have the capability. In some cases, the states may be binary (e.g., 1, 0). According to some aspects, the UE may receive a random access channel (RACH) response (RAR) in a contention-based random access procedure prior to the sending the value indicative of the timing advance capability. In such an aspect, the sending the value indicative of the timing advance capability may further include sending the value indicative of the timing advance capability in a radio resource control (RRC) connection request in response to the receiving the RAR. According to some aspects, sending the value indicative of the timing advance capability may include sending the value indicative of the timing advance capability in a random access channel (RACH) preamble in a contention free random access procedure. According to some aspects, sending the value indicative of the timing advance capability further includes sending the value indicative of the timing advance capability in at least one of: radio resource control (RRC) signaling, medium access control-control element (MAC-CE), or uplink control information (UCI) signaling. For example, the timing advance capability reporting circuitry 2442 shown and described above in connection with FIG. 24 may provide a means to send a value indicative of a timing advance capability to the network access node.

At block 2506, the UE may adjust a timing advance indicated by the timing advance command based on the timing advance capability to yield an adjusted timing advance. According to some aspects, adjusting the timing advance indicted by the timing advance command includes maintaining (e.g., not adjusting) the timing advance when the timing advance capability indicates a lack of capability to adjust the timing advance. For example, the uplink timing adjustment circuitry 2443 shown and described above in connection with FIG. 24 may provide a means to send a value indicative of a timing advance capability to the network access node.

At block 2508, the UE may transmit an uplink signal to the network access node using the adjusted timing advance if the UE indicates a capability to adjust the timing advance. For example, the communication and processing circuitry 2441 and/or the transceiver 2410 shown and described above in connection with FIG. 24 may provide a means to transmit an uplink signal to the network access node using the adjusted timing advance.

According to some aspects, the UE may operate in an FD mode and may communicate with two TRPs (e.g., two spaced-apart base stations or one base station with two TRPs (e.g., two panels)); a first TRP may be configured for downlink only and a second TRP may be configured for uplink only. The UE receives downlink from the first TRP and transmits uplink to the second TRP. In other words, in this example, neither of the TRPs are configured for FD mode; neither of the TRPs are configured for simultaneous uplink and downlink. The UE may establish RRC connections with both TRPs. The UE may receive an indication of an assigned FD mode window 2510 from the first TRP. The FD mode window may be used to permit the base station to communicate with the UE only at an assigned time in a dense network with a number of base stations or backhauls. The UE may maintain the RRC connections during the assigned FD mode window. The UE may receive a subsequent timing advance command (e.g. a second timing advance command) from the first TRP during the assigned FD mode window 2512. Still further the UE may optionally apply a subsequent timing advance indicated in the subsequent timing advance command during at least a part of the FD mode window 2514 to uplink transmissions to the second TRP. At least one of: the subsequent timing advance command, or the indication of the assigned FD mode window may be received in at least one of: RRC signaling, a MAC-CE, or downlink control information (DCI) signaling.

According to some aspects, the subsequent timing advance command may be indicative of a timing advance of 0. In this example, the first TRP and/or the second TRP may not have timing constraints because they each only communicate with the UE during the assigned FD mode window and only in one direction. According to this aspect, the first TRP can adjust its downlink timing to align the UE's uplink transmissions with the first TRP's downlink transmissions. In this example, the first TRP may indicate this condition (e.g., no need for the UE to adjust timing) by transmitting a timing command with a timing advance of 0. Here, the UE follows its own timing (e.g. UE sending PRACH timing) and the first TRP may adjust its downlink transmission timing to align the downlink timing with the UE's uplink timing. This also benefits the UEs that do not have a capability to adjust the timing advance.

In one configuration, the UE 2400 includes means for receiving a timing advance command from a network access node, means for sending a value indicative of a timing advance capability to the network access node, means for adjusting a timing advance indicated by the timing advance command based on the timing advance capability to yield an adjusted timing advance, and means for transmitting an uplink signal to the network access node using the adjusted timing advance.

In one aspect, the aforementioned means for receiving a timing advance command from a network access node, means for sending a value indicative of a timing advance capability to the network access node, means for adjusting a timing advance indicated by the timing advance command based on the timing advance capability to yield an adjusted timing advance, and means for transmitting an uplink signal to the network access node using the adjusted timing advance may be the processor(s) 2404 shown in FIG. 24 configured to perform the functions recited by the aforementioned means. For example, the aforementioned means for receiving the timing advance command from the network access node may include the communication and processing circuitry 2441, the transceiver 2410, and/or the antenna array 2420 shown in FIG. 24. For example, the aforementioned means for sending the value indicative of the timing advance capability to the network access node may include the timing advance capability reporting circuitry 2442, the transceiver 2410, and/or the antenna array 2420 shown in FIG. 24. For example, the aforementioned means for adjusting the timing advance indicated by the timing advance command based on the timing advance capability to yield the adjusted timing advance may include the uplink timing adjustment circuitry 2443, the transceiver 2410, and/or the antenna array 2420 shown in FIG. 24. For example, the aforementioned means for transmitting the uplink signal to the network access node using the adjusted timing advance may include the communication and processing circuitry 2441 the transceiver 2410, and/or the antenna array 2420 shown in FIG. 24. In another aspect, the aforementioned means may be a circuit or any apparatus configured to perform the functions recited by the aforementioned means.

Figure 26:
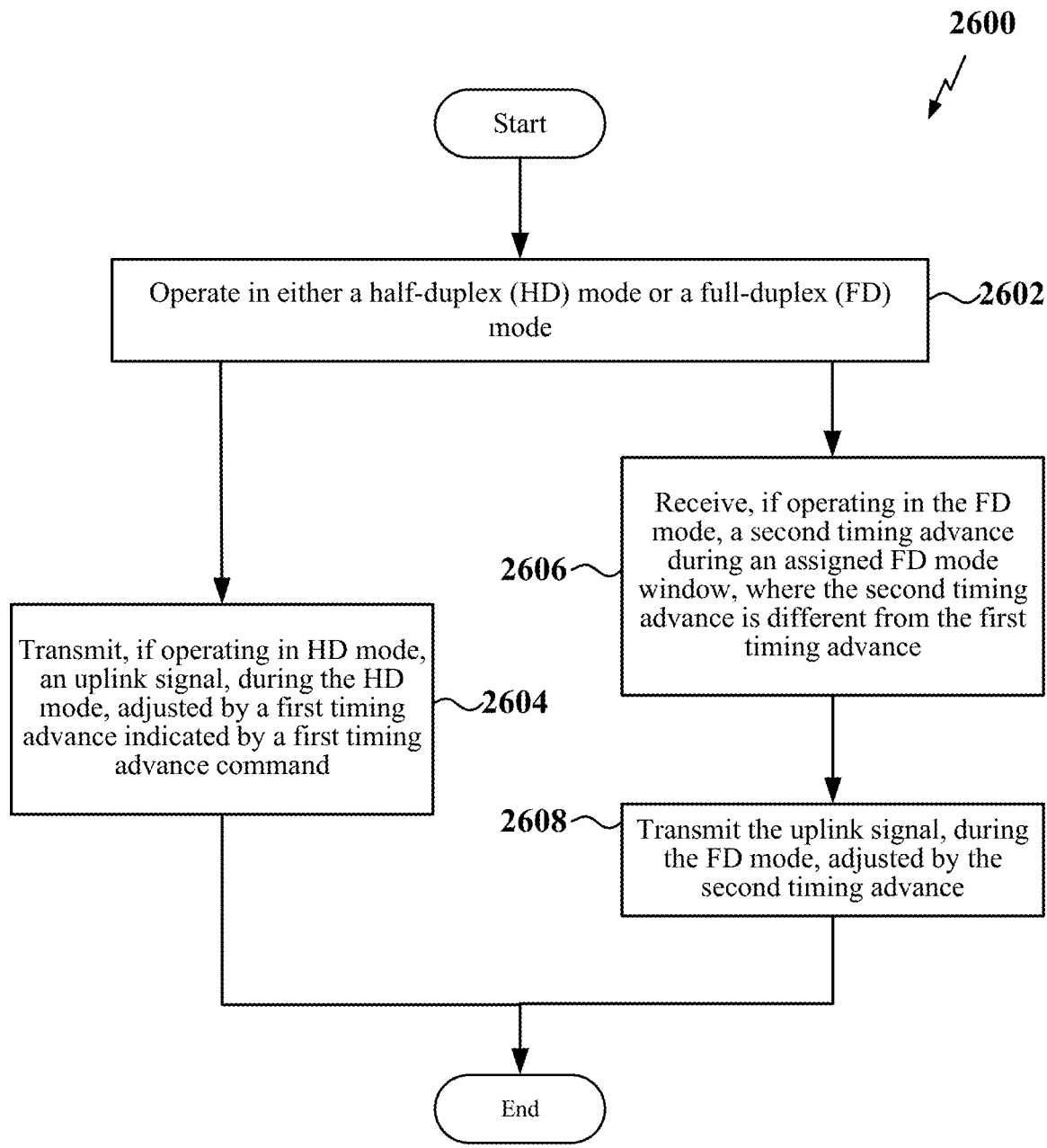
FIG. 26 is a flow chart illustrating another example process of wireless communication in a wireless communication network at a user equipment (UE) in accordance with some aspects.

FIG. 26 is a flow chart illustrating another example process 2600 (e.g., a method) of wireless communication in a wireless communication network at a user equipment (UE) in accordance with some aspects. As described below, some or all illustrated features may be omitted in a particular implementation within the scope of the present disclosure, and some illustrated features may not be required for implementation of all embodiments. In some examples, the process 2600 may be carried out by the UE 2400 (e.g., a scheduled entity) illustrated in FIG. 24. The UE 2400 may be similar to, for example, any of the UEs or scheduled entities of FIGS. 1, 2, 4, 5-8, 11-12, and/or 23-24. In some examples, the process 2600 may be carried out by any suitable apparatus or means for carrying out the functions or algorithm described below.

At block 2602, the UE may operate in either a half-duplex (HD) mode or a full-duplex (FD) mode. If the UE is operating in HD mode, the process may advance to block 2604. At block 2604, the UE may transmit an uplink signal, during the HD mode, adjusted by a first timing advance indicated by a first timing advance command. However, if the UE is operating in FD mode, then, at block 2606, the UE may receive a second timing advance during an assigned FD mode window, where the second timing advance is different from the first timing advance. The assigned FD mode window may be used, for example, when the base station is communicating with the UE in a dense network. The FD mode window may be used to permit the base station to communicate with the UE at an assigned time. Then, at block 2608, the UE may transmit the uplink signal, during the FD mode, adjusted by the second timing advance. According to some aspects, the UE may receive an indication of the assigned FD mode window in at least one of: RRC signaling, a MAC-CE, or DCI signaling.

In one configuration, the UE 2400 includes means for operating in either a half-duplex (HD) mode or a full-duplex (FD) mode, means for transmitting an uplink signal, during the HD mode, adjusted by a first timing advance indicated by a first timing advance command, means for receiving a second timing advance during an assigned FD mode window, where the second timing advance is different from the first timing advance, and means for transmitting the uplink signal, during the FD mode, adjusted by a second timing advance.

In one aspect, the aforementioned means to for operating in either a half-duplex (HD) mode or a full-duplex (FD) mode, means for transmitting an uplink signal, during the HD mode, adjusted by a first timing advance indicated by a first timing advance command, means for receiving a second timing advance during an assigned FD mode window, where the second timing advance is different from the first timing advance, and means for transmitting the uplink signal, during the FD mode, adjusted by a second timing advance may be the processor(s) 2404 shown in FIG. 24 configured to perform the functions recited by the aforementioned means. For example, the aforementioned means for operating in either a half-duplex (HD) mode or a full-duplex (FD) mode may include the communication and processing circuitry 2441, the transceiver 2410, and/or the antenna array 2420 shown in FIG. 24. For example, the aforementioned means for transmitting an uplink signal, during the HD mode, adjusted by a first timing advance indicated by a first timing advance command may include the uplink timing adjustment circuitry 2443, the communication and processing circuitry 2441, the transceiver 2410, and/or the antenna array 2420 shown in FIG. 24. For example, the aforementioned means receiving a second timing advance during an assigned FD mode window, where the second timing advance is different from the first timing advance may include the uplink timing adjustment circuitry 2443, the communication and processing circuitry 2441, the transceiver 2410, and/or the antenna array 2420 as shown in FIG. 24. For example, the aforementioned means for transmitting an uplink signal, during the FD mode, adjusted by a second timing advance, may include the uplink timing adjustment circuitry 2443, the communication and processing circuitry 2441, the transceiver 2410, and/or the antenna array 2420 shown in FIG. 24. In another aspect, the aforementioned means may be a circuit or any apparatus configured to perform the functions recited by the aforementioned means.

Figure 27:
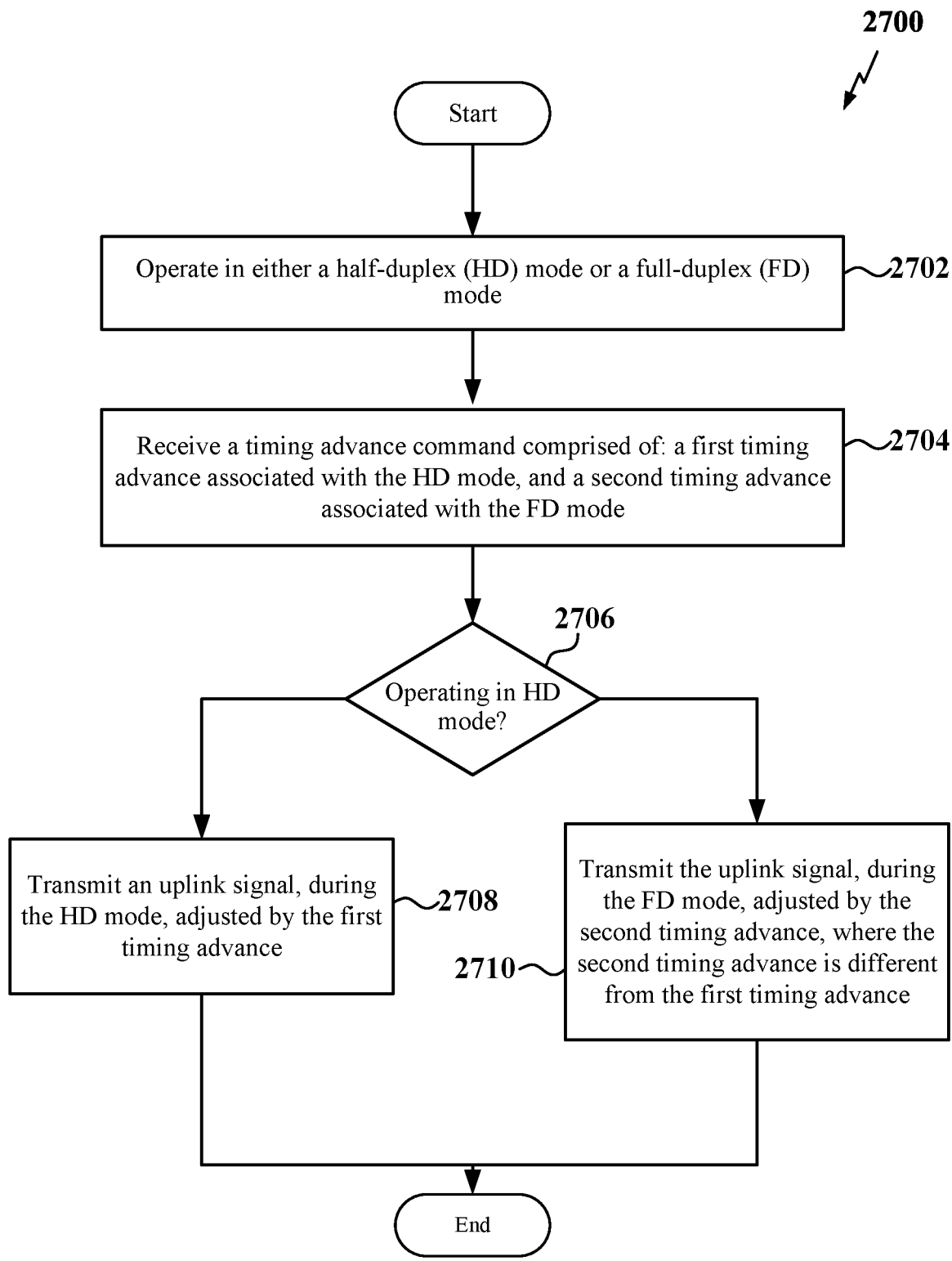
FIG. 27 is a flow chart illustrating another example process of wireless communication in a wireless communication network at a user equipment (UE) in accordance with some aspects.

FIG. 27 is a flow chart illustrating another example process 2700 (e.g., a method) of wireless communication in a wireless communication network at a user equipment (UE) in accordance with some aspects. As described below, some or all illustrated features may be omitted in a particular implementation within the scope of the present disclosure, and some illustrated features may not be required for implementation of all embodiments. In some examples, the process 2700 may be carried out by the UE 2400 (e.g., a scheduled entity) illustrated in FIG. 24. The UE 2400 may be similar to, for example, any of the UEs or scheduled entities of FIGS. 1, 2, 4, 5-8, 11-12, and/or 23-24. In some examples, the process 2700 may be carried out by any suitable apparatus or means for carrying out the functions or algorithm described below.

At block 2702, the UE may operate in either a half-duplex (HD) mode or a full-duplex (FD) mode. At block 2704 the UE may receive a timing advance command comprised of: a first timing advance associated with the HD mode, and a second timing advance associated with the FD mode. At block 2706, a determination may be made as to in which mode the UE is operating. If the UE is operating in HD mode, the process may advance to block 2708. At block 2708, the UE may transmit an uplink signal, during the HD mode, adjusted by a first timing advance. However, if it is determined at block 2706 that the UE is operating in FD mode, then, at block 2710, the UE may transmit the uplink signal, during the FD mode, adjusted by the second timing advance, where the second timing advance is different from the first timing advance. According to some aspects, the receiving the timing advance command may also include receiving the timing advance command in at least one of: RRC signaling, a MAC-CE, or DCI signaling.

In one configuration, the UE 2400 includes means for operating in either: a half-duplex (HD) mode, or a full-duplex (FD) mode, means for receiving a timing advance command comprised of: a first timing advance associated with the HD mode, and a second timing advance associated with the FD mode, means for transmitting an uplink signal, during the HD mode, adjusted by the first timing advance, and mans for transmitting the uplink signal, during the FD mode, adjusted by the second timing advance, where the second timing advance is different from the first timing advance.

In one aspect, the aforementioned means for operating in either: a half-duplex (HD) mode, or a full-duplex (FD) mode, means for receiving a timing advance command comprised of: a first timing advance associated with the HD mode, and a second timing advance associated with the FD mode, means for transmitting an uplink signal, during the HD mode, adjusted by the first timing advance, and mans for transmitting the uplink signal, during the FD mode, adjusted by the second timing advance, where the second timing advance is different from the first timing advance may be the processor(s) 2404 shown in FIG. 24 configured to perform the functions recited by the aforementioned means. For example, the aforementioned means for operating in either a half-duplex (HD) mode or a full-duplex (FD) mode may include the communication and processing circuitry 2441, the transceiver 2410, and/or the antenna array 2420 shown in FIG. 24. For example, the aforementioned means for receiving a timing advance command comprised of: a first timing advance associated with the HD mode, and a second timing advance associated with the FD mode may include the communication and processing circuitry 2441, the uplink timing adjustment circuitry 2443, the transceiver 2410, an/or the antenna array 2420 shown in FIG. 24. For example, the aforementioned means for transmitting an uplink signal, during the HD mode, adjusted by a first timing advance may include the uplink timing adjustment circuitry 2443, the communication and processing circuitry 2441, the transceiver 2410, and/or the antenna array 2420 shown in FIG. 24. For example, the aforementioned means for transmitting an uplink signal, during the FD mode, adjusted by a second timing advance may include the uplink timing adjustment circuitry 2443, the communication and processing circuitry 2441, the transceiver 2410, and/or the antenna array 2420 as shown in FIG. 24. In another aspect, the aforementioned means may be a circuit, or any apparatus configured to perform the functions recited by the aforementioned means.

Figure 28:
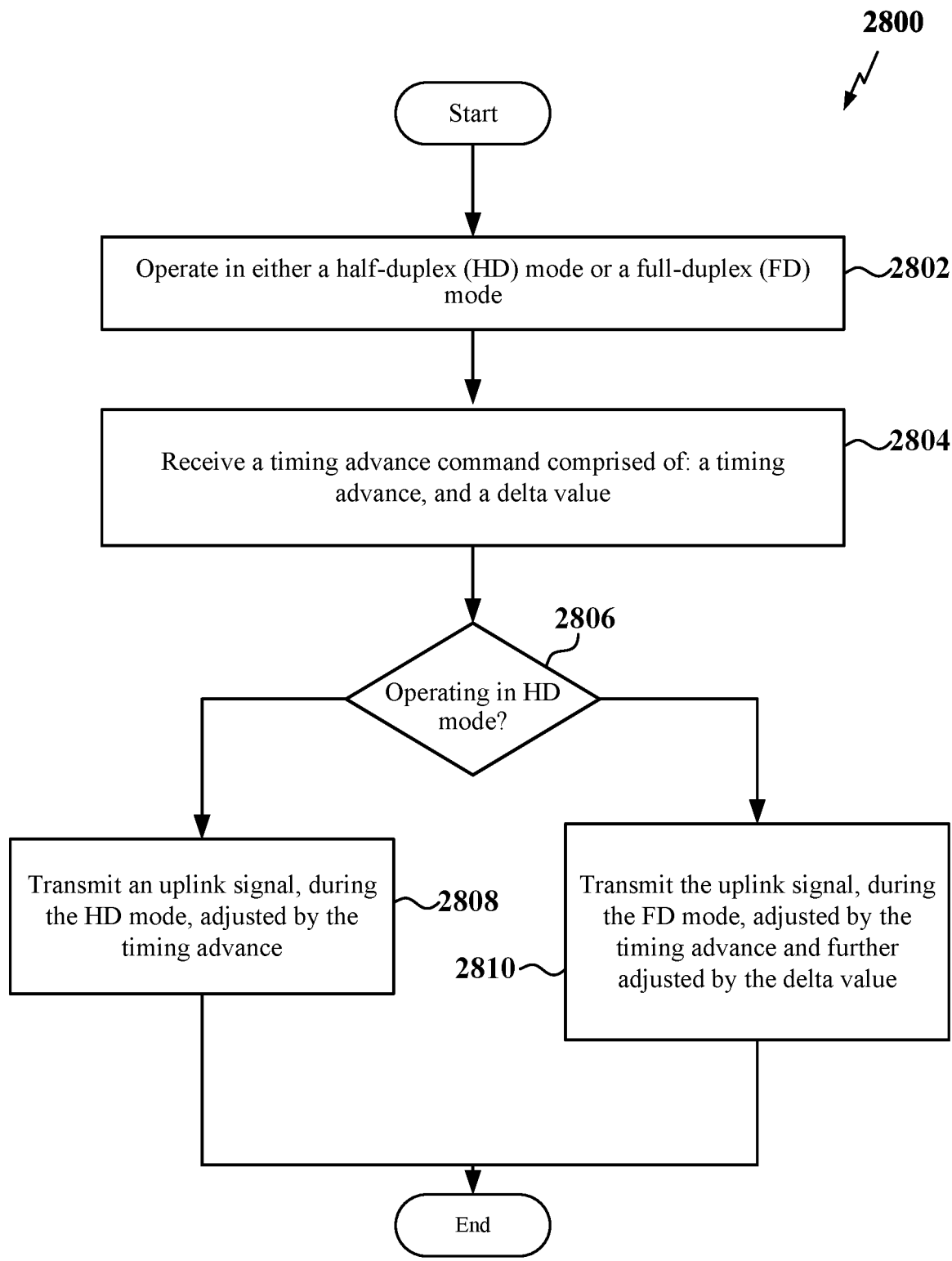
FIG. 28 is a flow chart illustrating another example process of wireless communication in a wireless communication network at a user equipment (UE) in accordance with some aspects.

FIG. 28 is a flow chart illustrating another example process 2800 (e.g., a method) of wireless communication in a wireless communication network at a user equipment (UE) in accordance with some aspects. As described below, some or all illustrated features may be omitted in a particular implementation within the scope of the present disclosure, and some illustrated features may not be required for implementation of all embodiments. In some examples, the process 2800 may be carried out by the UE 2400 (e.g., a scheduled entity) illustrated in FIG. 24. The UE 2400 may be similar to, for example, any of the UEs or scheduled entities of FIGS. 1, 2, 4, 5-8, 11-12, and/or 23-24. In some examples, the process 2800 may be carried out by any suitable apparatus or means for carrying out the functions or algorithm described below.

At block 2802, the UE may operate in either a half-duplex (HD) mode or a full-duplex (FD) mode. At block 2804 the UE may receive a timing advance command comprised of: a timing advance and a delta value. At block 2806, a determination may be made as to in which mode the UE is operating. If the UE is operating in HD mode, the process may advance to block 2808. At block 2808, the UE may transmit an uplink signal, during the HD mode, adjusted by a first timing advance. However, if it is determined at block 2806 that the UE is operating in FD mode, then, at block 2810, the UE may transmit the uplink signal, during the FD mode, adjusted by the timing advance and further adjusted by the delta value. According to some aspects, the receiving the timing advance command may also include receiving the timing advance command in at least one of: RRC signaling, a MAC-CE, or DCI signaling.

In one configuration, the UE 2400 includes means for operating in either: a half-duplex (HD) mode, or a full-duplex (FD) mode, means for receiving a timing advance command comprised of: a timing advance, and a delta value, means for transmitting an uplink signal, during the HD mode, adjusted by the timing advance, and means for transmitting the uplink signal, during the FD mode, adjusted by the timing advance and further adjusted by the delta value.

In one aspect, the aforementioned means for operating in either: a half-duplex (HD) mode, or a full-duplex (FD) mode, means for receiving a timing advance command comprised of: a timing advance, and a delta value, means for transmitting an uplink signal, during the HD mode, adjusted by the timing advance, and means for transmitting the uplink signal, during the FD mode, adjusted by the timing advance and further adjusted by the delta value may be the processor (s) 2404 shown in FIG. 24 configured to perform the functions recited by the aforementioned means. For example, the aforementioned means for operating in either a half-duplex (HD) mode or a full-duplex (FD) mode may include the communication and processing circuitry 2441, the transceiver 2410, and/or the antenna array 2420 shown in FIG. 24. For example, the aforementioned means for receiving a timing advance command comprised of: a timing advance, and a delta value may include the uplink timing adjustment circuitry 2443, the communication and processing circuitry 2441, the transceiver 2410, and/or the antenna array 2420 as shown in FIG. 24. For example, the aforementioned means for transmitting an uplink signal, during the HD mode, adjusted by the timing advance may include the uplink timing adjustment circuitry 2443, the communication and processing circuitry 2441, the transceiver 2410, and/or the antenna array 2420 as shown in FIG. 24. For example, the aforementioned means for transmitting the uplink signal, during the FD mode, adjusted by the timing advance and further adjusted by the delta value, may include the uplink timing adjustment circuitry 2443, the communication and processing circuitry 2441, the transceiver 2410, and/or the antenna array 2420 as shown in FIG. 24. In another aspect, the aforementioned means may be a circuit, or any apparatus configured to perform the functions recited by the aforementioned means.

Figure 29:
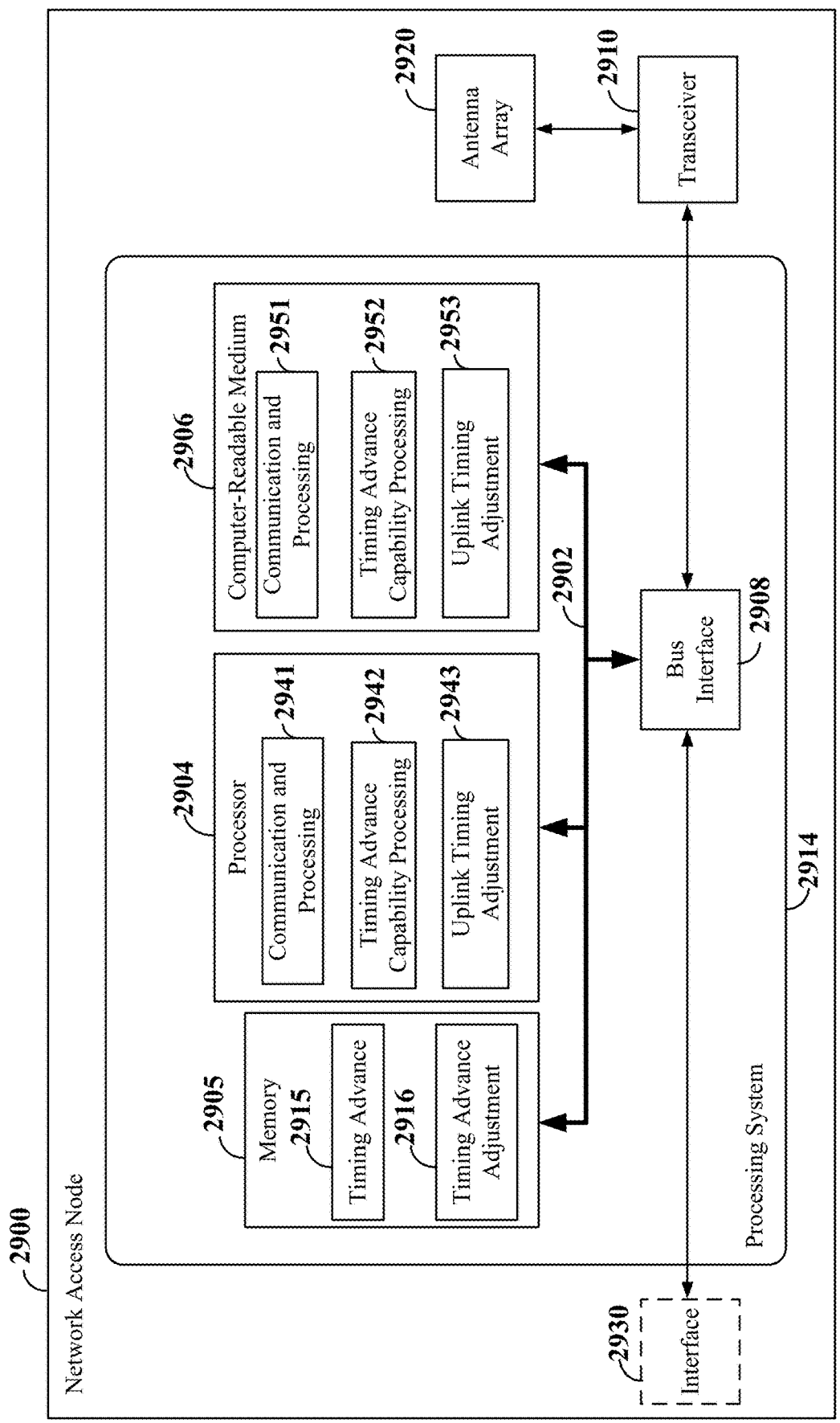
FIG. 29 is a block diagram illustrating an example of a hardware implementation of a network access node (e.g., a base station) employing a processing system according to some aspects.

FIG. 29 is a block diagram illustrating an example of a hardware implementation of a network access node 2900 (e.g., a base station, a scheduling entity) employing a processing system 2914 according to some aspects. The network access node 2900 may be similar to, for example, any of the network access nodes or scheduling entities of FIGS. 1, 2, 4, 5-8, 11-12, 23, and/or 29.

The processing system 2914 may be substantially the same as the processing system 2414 illustrated in FIG. 24, including a bus interface 2908, a bus 2902, memory 1705, a processor 1704, and a computer-readable medium 2906. In accordance with various aspects of the disclosure, an element, or any portion of an element, or any combination of elements may be implemented with a processing system 2914 that includes one or more processors, such as processor 2904. Furthermore, the network access node 2900 may include a user interface 2912, a transceiver 2910, and one or more antenna arrays 2920 substantially similar to those described above in FIG. 24. The transceiver 2910 may be, for example, a wireless transceiver. The processor 2904, as utilized in a network access node 2900, may be used to implement any one or more of the processes described herein and illustrated, for example, in FIGS. 30-33.

In some aspects of the disclosure, the processor 2904 may include communication and processing circuitry 2941 configured for various functions, including for example communicating with a user equipment (UE), a network core (e.g., a 5G core network), and another network access node, or any other entity, such as, for example, local infrastructure or an entity communicating with the network access node 2900 via the Internet, such as a network provider. In some examples, the communication and processing circuitry 2941 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 2941 may be configured to transmit a timing advance command to a user equipment (UE), receive a value indicative of a timing advance capability of the UE; and receive an uplink signal adjusted by a timing advance in accordance with the timing advance capability of the UE. The communication and processing circuitry 2941 may further be configured to execute communication and processing software 2951 stored on the computer-readable medium 2906 to implement one or more functions described herein.

In some aspects of the disclosure, the processor 2904 may include timing advance capability processing circuitry 2942 configured for various functions, including, for example, determining the timing advance capability of the UE based on the timing advance capability signaled or messaged to the network access node 2900, for example. In some examples, the timing advance capability processing circuitry 2942 may include one or more hardware components that provide the physical structure that performs processes related to determining the timing advance capability of the UE based on the timing advance capability signaled or messaged to the network access node 2900. The timing advance capability processing circuitry 2942 may further be configured to execute timing advance capability processing software 2952 stored on the computer-readable medium 2906 to implement one or more functions described herein.

In some aspects of the disclosure, the processor 2904 may include uplink timing adjustment circuitry 2943 configured for various functions, including, for example, verifying that the uplink signal is correctly adjusted in timing. In some examples, the uplink timing adjustment circuitry 2943 may include one or more hardware components that provide the physical structure that performs processes related to verifying that the uplink signal is correctly adjusted in timing. The uplink timing adjustment circuitry 2943 may further be configured to execute uplink timing adjustment software 2953 stored on the computer-readable medium 2906 to implement one or more functions described herein.

Figure 30:
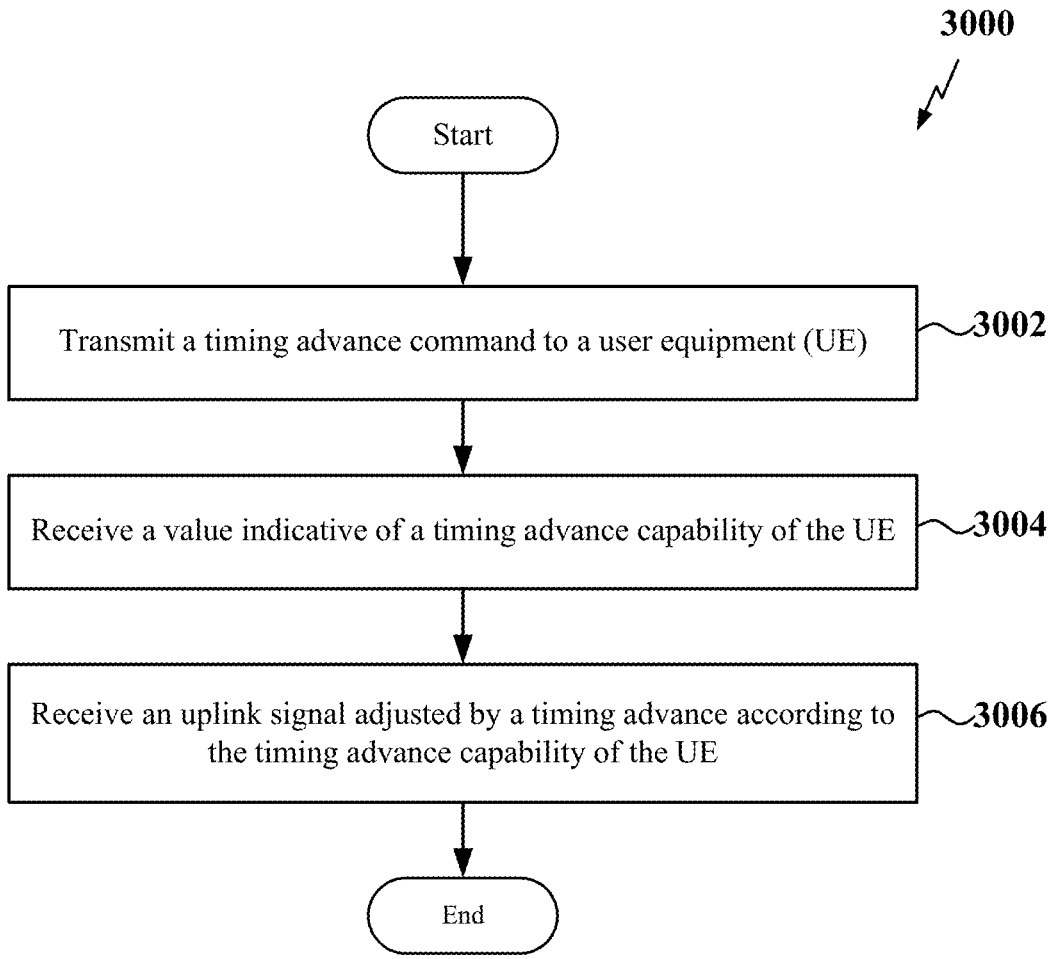
FIG. 30 is a flow chart illustrating an exemplary process at a network access node (e.g., a base station, a scheduling entity) in accordance with some aspects.

FIG. 30 is a flow chart illustrating an exemplary process 3000 (e.g., a method) at a network access node (e.g., a base station, a scheduling entity) in accordance with some aspects. As described below, some or all illustrated features may be omitted in a particular implementation within the scope of the present disclosure, and some illustrated features may not be required for implementation of all embodiments. In some examples, the process 3000 may be carried out by the network access node 2900 (e.g., a base station, a scheduling entity) illustrated in FIG. 29. The network access node 2900 may be similar to, for example, any of the network access nodes or scheduling entities of FIGS. 1, 2, 4, 5-8, 11-12, 23, and/or 29. In some examples, the process 3000 may be carried out by any suitable apparatus or means for carrying out the functions or algorithms described herein.

At block 3002, the network access node may transmit a timing advance command to a user equipment (UE). At block 3004, the network access node may receive a value indicative of a timing advance capability to the UE. According to some aspects, the timing advance capability may indicate that the UE has a capability to adjust the timing advance indicated by the timing advance command. In one example, the capability to indicate that the UE has the capability to adjust the timing advance indicated by the timing advance command may include the capability to indicate that the UE does not have the capability to adjust the timing advance indicated by the timing advance command. For example, a timing advance capability bit could be set to a first state to indicate the UE has the capability and be set to a second state to indicate that the UE does not have the capability. In some cases, the states may be binary (e.g., 1, 0). According to some aspects, receiving the uplink signal adjusted by the timing advance according to the timing advance capability of the UE may include receiving the uplink signal adjusted by a timing advance indicated in the timing advance command when the timing advance capability indicates a lack of capability to adjust the timing advance.

According to some aspects, the network access node may transmit a random access channel (RACH) response (RAR) in a contention-based random access procedure prior to receiving the value indicative of the timing advance capability of the UE. In such an aspect, the receiving the value indicative of the timing advance capability of the UE may further include receiving the value indicative of the timing advance capability in a radio resource control (RRC) connection request in response to the transmitting the RAR. According to some aspects, receiving the value indicative of the timing advance capability of the UE may include receiving the value indicative of the timing advance capability in a random access channel (RACH) preamble in a contention free random access procedure. According to some aspects, receiving the value indicative of the timing advance capability may further include receiving the value indicative of the timing advance capability of the UE in at least one of: radio resource control (RRC) signaling, medium access control-control element (MAC-CE), or uplink control information (UCI) signaling.

At block 3006, the network access node may receive an uplink signal adjusted by a timing advance according to the timing advance capability of the UE.

According to some aspects, the UE may operate in an FD mode and may communicate with two TRPs (e.g., two spaced-apart network access nodes, or one network access node comprising two collocated TRPs (e.g., two panels)); a first TRP may be configured for downlink only and a second TRP may be configured for uplink only. The UE receives downlink from the first TRP and transmits uplink to the second TRP. In other words, in this example, neither of the TRPs are configured for FD mode; neither of the TRPs are configured for simultaneous uplink and downlink. The UE may establish RRC connections with both TRPs. The first TRP (referred to as a network access node) may transmit an indication of an assigned FD mode window to the UE. The network access node may maintain the RRC connections during the assigned FD mode window. The network access node may transmit a subsequent timing advance command (e.g. a second timing advance command) during the assigned FD mode window. At least one of: the subsequent timing advance command, or the indication of the assigned FD mode window may be received in at least one of: RRC signaling, a MAC-CE, or DCI signaling.

According to some aspects, the subsequent timing advance command may be indicative of a timing advance of 0. In this example, the first TRP (e.g., the network access node) and/or the second TRP may not have timing constraints because they each only communicates with the UE during the assigned FD mode window and only in one direction. According to this aspect, the first TRP can adjust its downlink timing to align the UE's uplink transmissions with the first TRP's downlink transmissions. In this example, the first TRP may indicate this condition (e.g., no need for the UE to adjust timing) by transmitting a timing command with a timing advance of 0. In that case, the UE would follow its own timing (e.g. UE sending PRACH timing) and the first TRP may adjust its downlink transmission timing to align the downlink timing with the UE's uplink timing.

In one configuration, the network access node 2900 includes means for transmitting a timing advance command to a UE, means for receiving a value indicative of a timing advance capability of the UE, and means for receiving an uplink signal adjusted by a timing advance according to the timing advance capability of the UE.

In one aspect, the aforementioned means for transmitting a timing advance command to the UE, means for receiving a value indicative of a timing advance capability of the UE, and means for receiving an uplink signal adjusted by a timing advance according to the timing advance capability of the UE may include the processor(s) 2904 shown in FIG. 29 configured to perform the functions recited by the aforementioned means. For example, the aforementioned means for transmitting a timing advance command to a user equipment (UE) may include the communication and processing circuitry 2941, the antenna array 2920, and the transceiver 2910 shown in FIG. 29. For example, the aforementioned means for receiving a value indicative of a timing advance capability of the UE may include the timing advance capability processing circuitry 2942, the transceiver 2910, and/or the antenna array 2920 as shown in FIG. 29. For example, the aforementioned means for receiving an uplink signal adjusted by a timing advance according to the timing advance capability of the UE may include the uplink timing adjustment circuitry 2943, the communication and processing circuitry 2941, the transceiver 2910, and/or the antenna array 2920 as shown in FIG. 29. In another aspect, the aforementioned means may be a circuit, or any apparatus configured to perform the functions recited by the aforementioned means.

Figure 31:
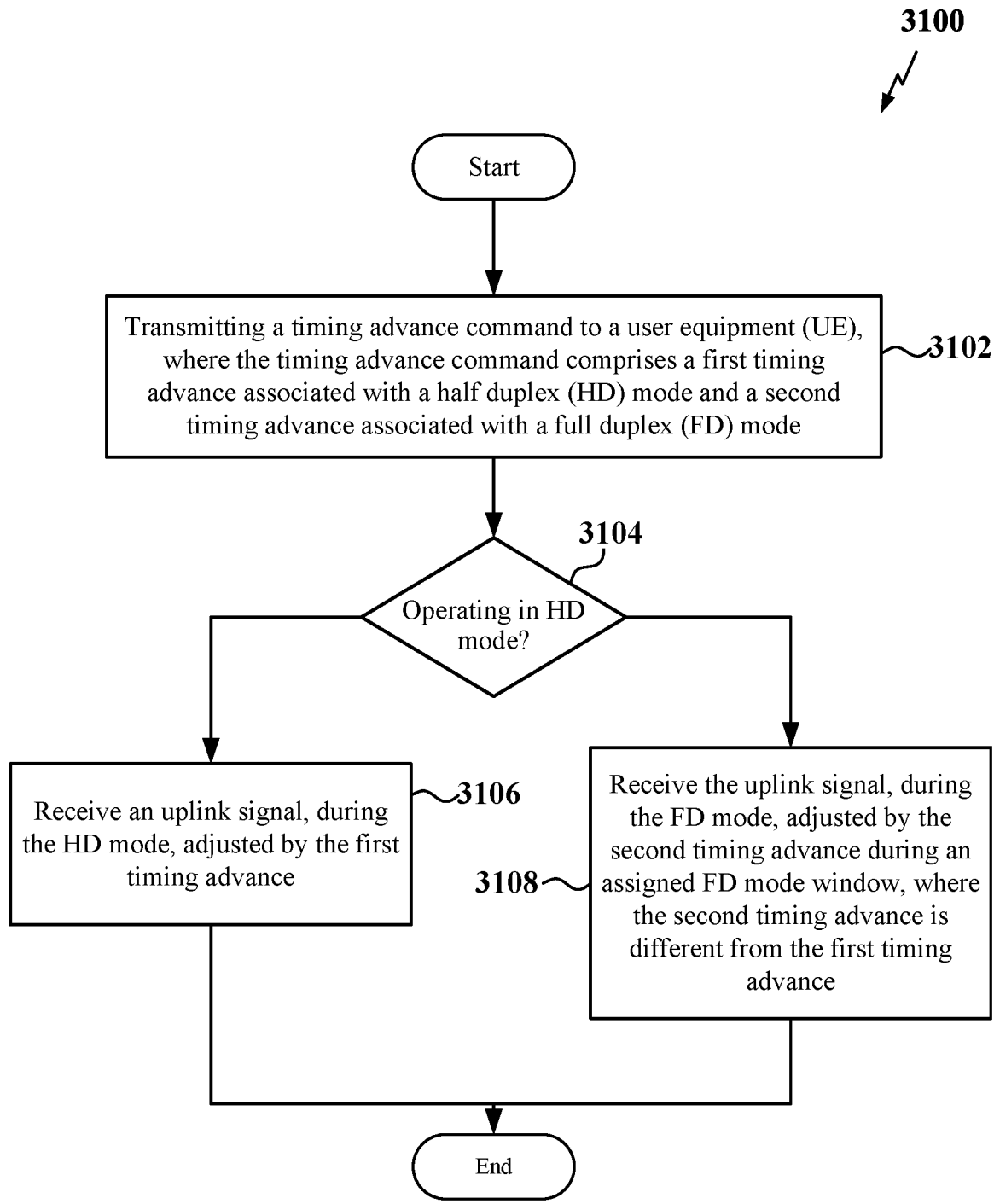
FIG. 31 is a flow chart illustrating another exemplary process at a network access node (e.g., a base station, a scheduling entity) in accordance with some aspects.

FIG. 31 is a flow chart illustrating another exemplary process 3100 at a network access node (e.g., a base station, a scheduling entity) in accordance with some aspects. As described below, some or all illustrated features may be omitted in a particular implementation within the scope of the present disclosure, and some illustrated features may not be required for implementation of all embodiments. In some examples, the process 311900 may be carried out by the network access node 2900 (e.g., a base station, a scheduling entity) illustrated in FIG. 29. The network access node 2900 may be similar to, for example, any of the network access nodes or scheduling entities of FIGS. 1, 2, 4, 5-8, 11-12, 23, and/or 29. In some examples, the process 3100 may be carried out by any suitable apparatus or means for carrying out the functions or algorithm described below.

At block 3102, the network access node may transmit a timing advance command to a user equipment (UE), where the timing advance command comprises a first timing advance associated with a half-duplex (HD) mode and a second timing advance associated with a full-duplex (FD) mode. At block 3104, a determination may be made as to in which mode the UE is operating. If the UE is operating in HD mode, the process may advance to block 3106. At block 3106, the network access node may receive an uplink signal, during the HD mode, adjusted by the first timing advance. However, if it is determined at block 3104 that the UE is operating in FD mode, then, at block 3108, the network access node may receive the uplink signal, during the FD mode, adjusted by a second timing advance during an assigned FD mode window, where the second timing advance is different from the first timing advance. According to some aspects, the timing advance command may be transmitted on at least one of: RRC signaling, a MAC-CE, or DCI signaling.

In one configuration, the network access node 2900 includes means for transmitting a timing advance command to the UE, where the timing advance command comprises a first timing advance associated with a half-duplex (HD) mode and a second timing advance associated with a full-duplex (FD) mode, means for receiving an uplink signal, during the HD mode, adjusted by the first timing advance, and means for receiving the uplink signal, during the FD mode, adjusted by a second timing advance during an assigned FD mode window, where the second timing advance is different from the first timing advance. In one aspect, the aforementioned means for transmitting a timing advance command to the UE, where the timing advance command comprises a first timing advance associated with an HD mode and a second timing advance associated with an FD mode, means for receiving an uplink signal, during the HD mode, adjusted by the first timing advance, and means for receiving the uplink signal, during the FD mode, adjusted by a second timing advance during an assigned FD mode window, where the second timing advance is different from the first timing advance may be the processor(s) 2904 shown in FIG. 29 configured to perform the functions recited by the aforementioned means. For example, the aforementioned means for transmitting a timing advance command to the UE, where the timing advance command comprises a first timing advance associated with an HD mode and a second timing advance associated with an FD mode may include the uplink timing adjustment circuitry 2943, the antenna array 2920, and the transceiver 2910 shown in FIG. 29. For example, the aforementioned means for receiving an uplink signal, during the HD mode, adjusted by the first timing advance may include the communication and processing circuitry 2941, the transceiver 2910, and/or the antenna array 2920 as shown in FIG. 29. For example, the aforementioned means for receiving the uplink signal, during the FD mode, adjusted by a second timing advance during an assigned FD mode window, where the second timing advance is different from the first timing advance may include the uplink timing adjustment circuitry 2943, the communication and processing circuitry 2941, the transceiver 2910, and/or the antenna array 2920 as shown in FIG. 29. In another aspect, the aforementioned means may be a circuit, or any apparatus configured to perform the functions recited by the aforementioned means.

Figure 32:
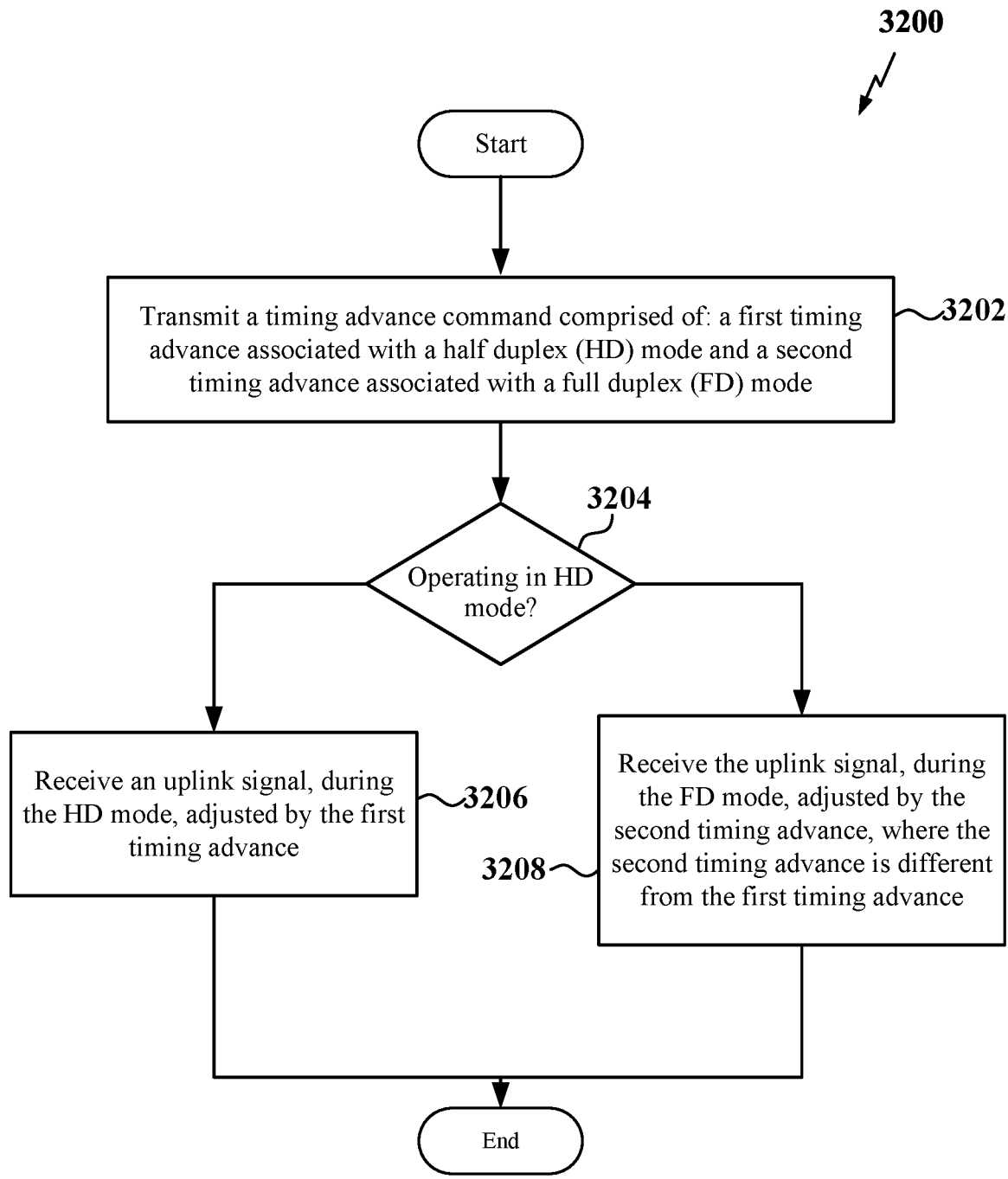
FIG. 32 is a flow chart illustrating another exemplary process at a network access node (e.g., a base station, a scheduling entity) in accordance with some aspects.

FIG. 32 is a flow chart illustrating another exemplary process 3200 at a network access node (e.g., a base station, a scheduling entity) in accordance with some aspects. As described below, some or all illustrated features may be omitted in a particular implementation within the scope of the present disclosure, and some illustrated features may not be required for implementation of all embodiments. In some examples, the process 3200 may be carried out by the network access node 2900 (e.g., a base station, a scheduling entity) illustrated in FIG. 29. The network access node 2900 may be similar to, for example, any of the network access nodes or scheduling entities of FIGS. 1, 2, 4, 5-8, 11-12, 23, and/or 29. In some examples, the process 3200 may be carried out by any suitable apparatus or means for carrying out the functions or algorithm described below.

At block 3202, the network access node may transmit a timing advance command comprised of: a first timing advance associated with the HD mode, and a second timing advance associated with the FD mode. At block 3204, a determination may be made as to in which mode the UE is operating. If the UE is operating in HD mode, the process may advance to block 3206. At block 3206, the network access node may receive an uplink signal, during the HD mode, adjusted by a first timing advance. However, if it is determined at block 3204 that the UE is operating in FD mode, then, at block 3208, the network access node may receive the uplink signal, during the FD mode, adjusted by the second timing advance, where the second timing advance is different from the first timing advance. According to some aspects, the transmitting the timing advance command may also include transmitting the timing advance command in at least one of: RRC signaling, a MAC-CE, or DCI signaling.

In one configuration, the network access node 2900 includes means for transmitting a timing advance command comprised of: a first timing advance associated with the HD mode, and a second timing advance associated with the FD mode, means for receiving an uplink signal, during the HD mode, adjusted by the first timing advance, and means for receiving the uplink signal, during the FD mode, adjusted by the second timing advance, where the second timing advance is different from the first timing advance.

In one aspect, the aforementioned means for transmitting a timing advance command comprised of: a first timing advance associated with the HD mode, and a second timing advance associated with the FD mode, means for receiving an uplink signal, during the HD mode, adjusted by the first timing advance, and means for receiving the uplink signal, during the FD mode, adjusted by the second timing advance, where the second timing advance is different from the first timing advance may be the processor(s) 2904 shown in FIG. 29 configured to perform the functions recited by the aforementioned means. For example, the aforementioned means for transmitting a timing advance command transmitting a timing advance command comprised of: a first timing advance associated with the HD mode, and a second timing advance associated with the FD mode may include the uplink timing adjustment circuitry 2943, the antenna array 2920, and the transceiver 2910 shown in FIG. 29. For example, the aforementioned means for receiving an uplink signal, during the HD mode, adjusted by the first timing advance may include the communication and processing circuitry 2941, the transceiver 2910, and/or the antenna array 2920 as shown in FIG. 29. For example, the aforementioned means for receiving the uplink signal, during the FD mode, adjusted by the second timing advance, where the second timing advance is different from the first timing advance may include the uplink timing adjustment circuitry 2943, the communication and processing circuitry 2941, the transceiver 2910, and/or the antenna array 2920 as shown in FIG. 29. In another aspect, the aforementioned means may be a circuit, or any apparatus configured to perform the functions recited by the aforementioned means.

Figure 33:
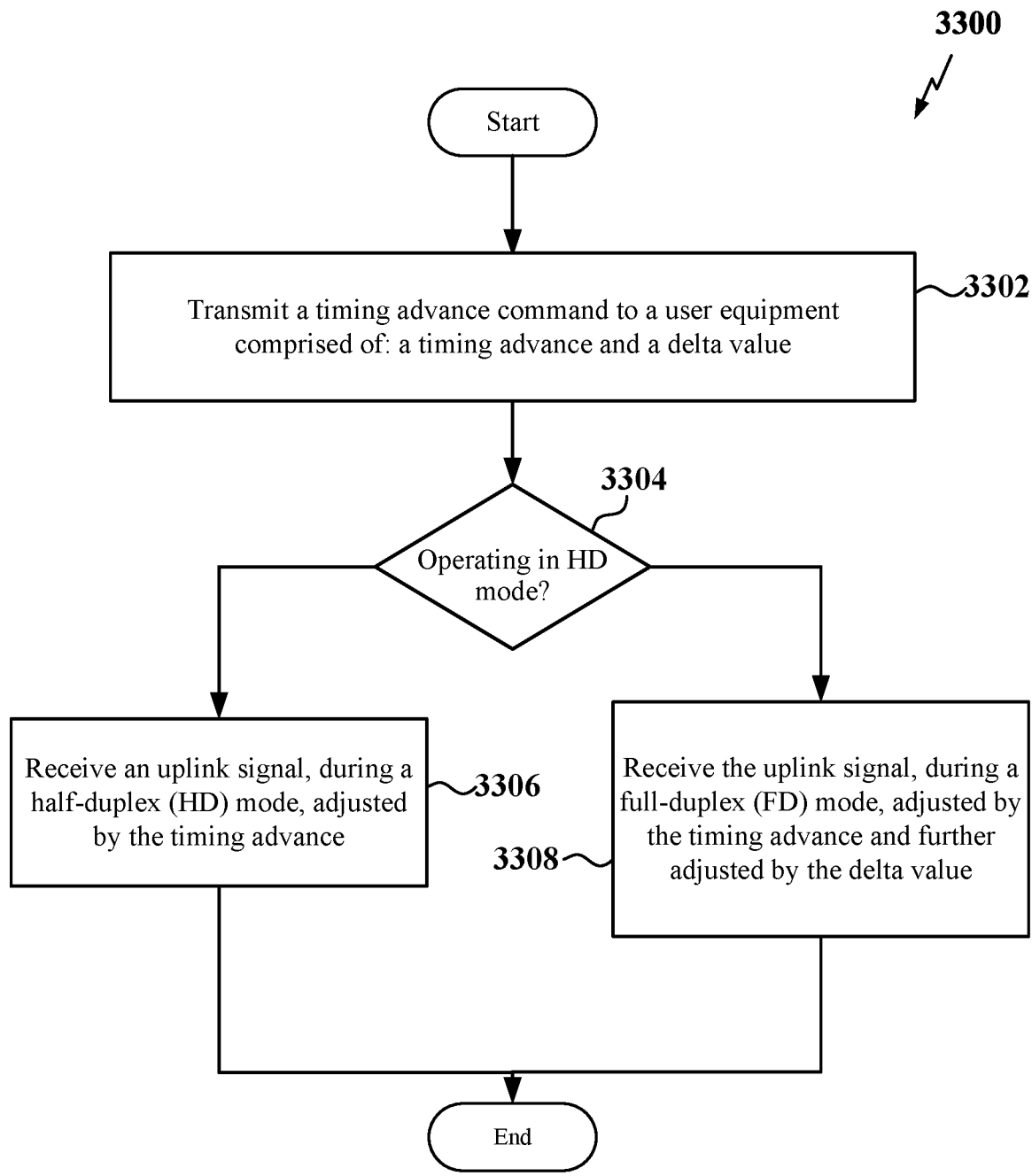
FIG. 33 is a flow chart illustrating another exemplary process at a network access node (e.g., a base station, a scheduling entity) in accordance with some aspects.

FIG. 33 is a flow chart illustrating another exemplary process 3300 at a network access node (e.g., a base station, a scheduling entity) in accordance with some aspects. As described below, some or all illustrated features may be omitted in a particular implementation within the scope of the present disclosure, and some illustrated features may not be required for implementation of all embodiments. In some examples, the process 3300 may be carried out by the network access node 2900 (e.g., a base station, a scheduling entity) illustrated in FIG. 29. The network access node 2900 may be similar to, for example, any of the network access nodes or scheduling entities of FIGS. 1, 2, 4, 5-8, 11-12, 23, and/or 29. In some examples, the process 3300 may be carried out by any suitable apparatus or means for carrying out the functions or algorithm described below.

At block 3302, the network access node may transmit a timing advance command to a user equipment (UE) comprised of: a timing advance and a delta value. At block 3304, a determination may be made as to in which mode the UE is operating. If the UE is operating in HD mode, the process may advance to block 3306. At block 3306, the network access node may receive an uplink signal, during the HD mode, adjusted by the timing advance. However, if it is determined at block 3304 that the UE is operating in FD mode, then, at block 3308, the network access node may receive the uplink signal, during the FD mode, adjusted by the timing advance and further adjusted by the delta value. According to some aspects, the timing advance command is transmitted on at least one of: RRC signaling, a MAC-CE, or DCI signaling.

In one configuration, the network access node 2900 includes means for transmitting a timing advance command to the UE, wherein the timing advance command comprises a timing advance and a delta value, means for receiving an uplink signal, during the HD mode, adjusted by the timing advance, and means for receiving the uplink signal, during the FD mode, adjusted by the timing advance and further adjusted by the delta value.

In one aspect, the aforementioned means for transmitting the timing advance command to the UE, wherein the timing advance command comprises a timing advance and a delta value, means for receiving an uplink signal, during the HD mode, adjusted by the timing advance, and means for receiving the uplink signal, during the FD mode, adjusted by the timing advance and further adjusted by the delta value may include the processor(s) 2904 shown in FIG. 29 configured to perform the functions recited by the aforementioned means. For example, the aforementioned means for transmitting the timing advance command to the UE, wherein the timing advance command comprises a timing advance and a delta value may include the uplink timing adjustment circuitry 2943, the antenna array 2920, and the transceiver 2910 shown in FIG. 29. For example, the aforementioned means for receiving an uplink signal, during the HD mode, adjusted by the timing advance may include the communication and processing circuitry 2941, the transceiver 2910, and/or the antenna array 2920 as shown in FIG. 29. For example, the aforementioned means for receiving the uplink signal, during the FD mode, adjusted by the timing advance and further adjusted by the delta value may include the uplink timing adjustment circuitry 2943, the communication and processing circuitry 2941, the transceiver 2910, and/or the antenna array 2920 as shown in FIG. 29. In another aspect, the aforementioned means may be a circuit, or any apparatus configured to perform the functions recited by the aforementioned means.

Example Clauses

Implementation examples are described in the following numbered clauses:

Clause 1: A method, performed by a base station, for timing alignment of signals in a wireless communication system, the method comprising: determining at least a user equipment (UE) in the wireless communication system is operating in a full-duplex (FD) mode with the base station;

and sending a timing advance (TA) indication for the UE, wherein the TA indication indicates a selection of one of a fixed TA value or a TA value range to be used by the UE while operating in the FD mode.

Clause 2: The method of Clause 1, wherein sending the TA indication comprises transmitting the TA indication in at least one of a random access response (RAR), or a media access control (MAC) control element (MAC-CE).

Clause 3: The method of any one of Clauses 1-2, wherein the TA indication is configured for at least one of a particular panel of the UE, a particular beam group of the UE, or a particular beam pair of the UE.

Clause 4: The method of any one of Clauses 1-3, wherein sending the TA indication comprises sending the TA value range to the UE via at least one of radio resource control (RRC) signaling, a media access control (MAC) control element (MAC-CE), or downlink control information (DCI).

Clause 5: The method of any one of Clauses 1-4, wherein the TA value range is a predefined range.

Clause 6: The method of Clause 5, wherein a TA value to be applied at the UE ($TA_{applied}$) is configured to be in a range of TA values based on the fixed TA value ($TA_{indicated}$) and a time duration of a cyclic prefix (CP) value used in the wireless communication system.

Clause 7: The method of Clause 6, further comprising determining $TA_{applied}$ based on $TA_{indicated}$ within the TA value range and the time duration of the CP value according to a relationship: $TA_{indicated} - CP \le TA_{applied} \le TA_{indicated}$.

Clause 8: The method of Clause 7, further comprising determining $TA_{applied}$ based on a correction factor ($\delta$), wherein $TA_{applied} = TA_{indicated} - \delta$ and the $\delta$ is bounded by the range from zero to the time duration of the CP value where $\delta = [0, CP]$.

Clause 9: The method of Clause 8, wherein: the wireless communication system comprises a multiple transmission and reception point (TRP) system having at least a first TRP and a second TRP, and the method further comprises: determining $\delta$ based on measurement of a timing difference between a first timing t1 for a downlink transmission from the first TRP received at the UE and a second timing t2 for an uplink transmission to the second TRP also received at the UE, wherein $\delta$ is determined according to a relationship: $t1 - t2 - \delta < CP$.

Clause 10: The method of Clause 7, further comprising determining $TA_{applied}$ based on $TA_{indicated}$ within the TA value range, the time duration of the CP value, and a delay (d1) according to a relationship: $TA_{indicated} - CP - d1 \le TA_{applied} \le TA_{indicated} - d1$, wherein d1 is a self-interference propagation delay associated with a downlink beam of the base station and an uplink beam of the base station.

Clause 11: The method of Clause 6, further comprising determining $TA_{applied}$ based on $TA_{indicated}$ within the TA value range, the time duration of the CP value, and a delay spread (DS) of a downlink propagation delay time according to a relationship: $TA_{indicated} - CP + DS \le TA_{applied} \le TA_{indicated}$.

Clause 12: The method of Clause 11, further comprising determining $TA_{applied}$ with a correction factor $\delta$, wherein $TA_{applied} = TA_{indicated} - \delta$ and the correction factor ($\delta$) is bounded by the range from zero to the time duration of the CP value less the delay spread DS where $\delta = [0, CP-DS]$.

Clause 13: The method of Clause 12, further comprising: the wireless communication system comprises a multiple transmission and reception point (TRP) system having at least a first TRP and a second TRP, and the method further comprises: determining $\delta$ based on measurement of a timing difference between a first timing t1 for a downlink transmission from the first TRP received at the UE and a second timing t2 for an uplink transmission to the second TRP also received at the UE, wherein $\delta$ is determined according to a relationship: $t1 - t2 - \delta < CP$.

Clause 14: The method of Clause 6, further comprising determining $TA_{applied}$ based on $TA_{indicated}$ within the TA value range, the time duration of the CP value, and a delay spread DS of a downlink delay time according to a relationship: $TA_{indicated} - CP - d1 + DS \le TA_{applied} \le TA_{indicated} - d1$, wherein d1 is a self-interference propagation delay associated with a downlink beam of the base station and an uplink beam of the base station.

Clause 15: A method, performed by a user equipment (UE), for timing alignment of signals in a wireless communication system, the method comprising: receiving, from a base station, a timing advance (TA) indication for the UE, wherein the TA indication indicates a selection of one of a fixed TA value or a TA value range to be used by the UE while operating in a full-duplex (FD) mode; and transmitting one or more uplink signals to the base station at a timing advance based on the fixed TA value or the TA value range.

Clause 16: The method of Clause 15, wherein receiving the TA indication comprises receiving the TA indication in at least one of a random access channel (RACH) preamble, a random access response (RAR), or a media access control (MAC) control element (MAC-CE).

Clause 17: The method of any one of Clauses 15-16, wherein the TA indication is configured for a particular panel in the UE, a particular beam group of the UE, or a particular beam pair of the UE.

Clause 18: The method of any one of Clauses 15-17, wherein receiving the TA indication comprises receiving the TA value range from the base station via one of radio resource control (RRC) signaling, a media access control (MAC) control element (MAC-CE), or downlink control information (DCI).

Clause 19: The method of any one of Clauses 15-18, wherein the TA value range is a predefined range.

Clause 20: The method of any one of Clauses 15-19, wherein a TA value to be applied by the UE ($TA_{applied}$) is configured to be in a range of TA values based on the fixed TA value ($TA_{indicated}$) and a time duration of a cyclic prefix (CP) value used in the wireless communication system.

Clause 21: The method of Clause 20, further comprising determining $TA_{applied}$ based on $TA_{indicated}$ within the TA value range and the time duration of the CP value according to a relationship: $TA_{indicated} - CP \le TA_{applied} \le TA_{indicated}$.

Clause 22: The method of Clause 21 further comprising determining $TA_{applied}$ based further on a correction factor ($\delta$) wherein $TA_{applied} = TA_{indicated} - \delta$ and $\delta$ is bounded by the range from zero to the time duration of the CP value where $\delta = [0, CP]$.

Clause 23: The method of Clause 21, wherein: the wireless communication system comprises a multiple transmission and reception point (TRP) system having at least a first TRP and a second TRP, and the method further comprises: determining $\delta$ based on measurement of a timing difference between a first timing t1 for a downlink transmission from the first TRP received at the UE and a second timing t2 for an uplink transmission to the second TRP also received at the UE, wherein $\delta$ is determined according to a relationship: $t1 - t2 - \delta < CP$.

Clause 24: The method of Clause 20, further comprising determining $TA_{applied}$ based on $TA_{indicated}$ within the TA value range, the time duration of the CP value, and a delay (d1) according to a relationship: $TA_{indicated} - CP - d1 \le TA_{applied} \le TA_{indicated} - d1$, wherein d1 is a self-interference propagation delay associated with a downlink beam of the base station and an uplink beam of the base station.

Clause 25: The method of Clause 20, further comprising determining $TA_{applied}$ based on $TA_{indicated}$ within the TA value range, the time duration of the CP value, and a delay spread (DS) of a downlink propagation delay time according to a relationship: $TA_{indicated} - CP + DS \leq TA_{applied} \leq TA_{indicated}$.

Clause 26: The method of Clause 25, further comprising determining $TA_{applied}$ with a correction factor ($\delta$) wherein $TA_{applied} = TA_{indicated} - \delta$ and $\delta$ is bounded by the range from zero to the time duration of the CP value less the DS, wherein $\delta = [0, CP-DS]$.

Clause 27: The method of Clause 26, wherein: the wireless communication system comprises a multiple transmission and reception point (TRP) system having at least a first TRP and a second TRP, and the method further comprises: determining $\delta$ based on measurement of a timing difference between a first timing t1 for a downlink transmission from the first TRP received at the UE and a second timing t2 for an uplink transmission to the second TRP also received at the UE, wherein $\delta$ is determined according to a relationship: $t1 - t2 - \delta < CP$.

Clause 28: The method of Clause 20, further comprising $TA_{applied}$ based on $TA_{indicated}$ within the TA value range, the time duration of the CP value, and a delay spread (DS) of a downlink delay time according to a relationship: $TA_{indicated} - CP - d1 + DS \leq TA_{applied} \leq TA_{indicated} - d1$, wherein d1 is a self-interference propagation delay associated with a downlink beam of the base station and an uplink beam of the base station.

Clause 29: The method of any one of Clauses 1-28, wherein the fixed TA comprises a TA value sent in a TA command used in the communication system.

Clause 30: A method of wireless communication by a user equipment (UE) in a wireless communication network, comprising: receiving a timing advance command from a network access node; sending a value indicative of a timing advance capability to the network access node; adjusting a timing advance indicated by the timing advance command based on the timing advance capability to yield an adjusted timing advance; and transmitting an uplink signal to the network access node using the adjusted timing advance.

Clause 31: The method of Clause 30, wherein the timing advance capability indicates that the UE has a capability to adjust the timing advance indicated by the timing advance command.

Clause 32: The method of any one of Clauses 30-31, wherein adjusting the timing advance indicated by the timing advance command further comprises: maintaining the timing advance when the timing advance capability indicates a lack of capability to adjust the timing advance.

Clause 33: The method of any one of Clauses 30-32, further comprising: receiving a random access channel (RACH) response (RAR) in a contention-based random access procedure prior to the sending the value indicative of the timing advance capability, wherein the sending the value indicative of the timing advance capability further comprises: sending the value indicative of the timing advance capability in a radio resource control (RRC) connection request in response to the receiving the RAR.

Clause 34: The method of and one of Clauses 30-33, wherein the sending the value indicative of the timing advance capability further comprises: sending the value indicative of the timing advance capability in a random access channel (RACH) preamble in a contention free random access procedure.

Clause 35: The method of any one of Clauses 30-33, wherein the sending the value indicative of the timing advance capability further comprises: sending the value indicative of the timing advance capability in at least one of: radio resource control (RRC) signaling, a medium access control-control element (MAC-CE), or uplink control information (UCI) signaling.

Clause 36: The method of any one of Clauses 30-35, wherein the UE operates in a full-duplex (FD) mode and the network access node operates in a different mode other than the FD mode, the method further comprising: receiving an indication of an assigned FD mode window from the network access node; and receiving a subsequent timing advance command from the network access node during the assigned FD mode window.

Clause 37: The method of Clause 36, further comprising: applying a subsequent timing advance indicated in the subsequent timing advance command during at least a part of the assigned FD mode window.

Clause 38: The method of Clause 36, wherein at least one of: the subsequent timing advance command, or the indication of the assigned FD mode window is received in at least one of: radio resource control (RRC) signaling, a medium access control-control element (MAC-CE), or downlink control information (DCI) signaling.

Clause 39: A method of wireless communication by a user equipment (UE) in a wireless communication network, comprising: operating in either a half-duplex (HD) mode or a full-duplex (FD) mode; transmitting an uplink signal, during the HD mode, adjusted by a first timing advance indicated by a first timing advance command; and transmitting the uplink signal, during the FD mode, adjusted by a second timing advance received during an assigned FD mode window, wherein the second timing advance is different from the first timing advance.

Clause 40: The method of Clause 39, wherein at least one of: the first timing advance, the second timing advance, or the assigned FD mode window are indicated by at least one of: radio resource control (RRC) signaling, a medium access control-control element (MAC-CE), or downlink control information (DCI) signaling.

Clause 41: A method of wireless communication in a wireless communication network at a user equipment (UE), comprising: operating in either: a half-duplex (HD) mode, or a full-duplex (FD) mode; receiving a timing advance command comprised of: a first timing advance associated with the HD mode, and a second timing advance associated with the FD mode; transmitting an uplink signal, during the HD mode, adjusted by the first timing advance; and transmitting the uplink signal, during the FD mode, adjusted by the second timing advance, wherein the second timing advance is different from the first timing advance.

Clause 42: The method of Clause 41, wherein the receiving the timing advance command further comprises, receiving the timing advance command in at least one of: radio resource control (RRC) signaling, a medium access control-control element (MAC-CE), or downlink control information (DCI) signaling.

Clause 43: A method of wireless communication in a wireless communication network at a user equipment (UE), comprising: operating in either: a half-duplex (HD) mode, or a full-duplex (FD) mode; receiving a timing advance command comprised of: a timing advance, and a delta value; transmitting an uplink signal, during the HD mode, adjusted by the timing advance; and transmitting the uplink signal, during the FD mode, adjusted by the timing advance and further adjusted by the delta value.

Clause 44: The method of Clause 43, wherein the receiving the timing advance command further comprises, receiving the timing advance command in at least one of: radio resource control (RRC) signaling, a medium access control-control element (MAC-CE), or downlink control information (DCI) signaling.

Clause 45: A method of wireless communication in a wireless communication network at a network access node, comprising: transmitting a timing advance command to a user equipment (UE); receiving a value indicative of a timing advance capability of the UE; and receiving an uplink signal adjusted by a timing advance according to the timing advance capability of the UE.

Clause 46: The method of Clause 45, wherein the timing advance capability indicates that the UE has a capability to adjust the timing advance indicated by the timing advance command.

Clause 47: The method of any one of Clauses 45-46, wherein receiving the uplink signal adjusted by the timing advance according to the timing advance capability of the UE further comprises: receiving the uplink signal adjusted by the timing advance indicated in the timing advance command when the timing advance capability indicates a lack of capability to adjust the timing advance.

Clause 48: The method of any one of Clauses 45-47, further comprising: transmitting a random access channel (RACH) response (RAR) in a contention-based random access procedure prior to the receiving the value indicative of the timing advance capability of the UE, wherein the receiving the value indicative of the timing advance capability of the UE further comprises: receiving the value indicative of the timing advance capability of the UE in a radio resource control (RRC) connection request in response to the transmitting the RAR.

Clause 49: The method of any one of Clauses 45-48, wherein the receiving the value indicative of the timing advance capability of the UE further comprises: receiving the value indicative of the timing advance capability of the UE in a random access channel (RACH) preamble in a contention free random access procedure.

Clause 50: The method of any one of Clauses 45-48, wherein the receiving the value indicative of the timing advance capability of the UE further comprises: receiving the value indicative of the timing advance capability of the UE in at least one of: radio resource control (RRC) signaling, a medium access control-control element (MAC-CE), or uplink control information (UCI) signaling.

Clause 51: The method of any one of Clauses 45-50, wherein the UE operates in a full-duplex (FD) mode and the network access node operates in different mode other than the FD mode, the method further comprising: transmitting an indication of an assigned FD mode window to the UE; and transmitting a subsequent timing advance command to the UE during the assigned FD mode window.

Clause 52: The method of Clause 51, wherein receiving the uplink signal adjusted by the timing advance according to the timing advance capability of the UE further comprises: receiving the uplink signal adjusted by the subsequent timing advance command during at least a part of the assigned FD mode window.

Clause 53: The method of any one of Clauses 51-52, wherein at least one of: the subsequent timing advance command, or the indication of the assigned FD mode window is transmitted in at least one of: radio resource control (RRC) signaling, a medium access control—control element (MAC-CE), or a downlink control information (DCI).

Clause 54: A method of wireless communication in a wireless communication network at a network access node, comprising: transmitting a timing advance command to a user equipment (UE), wherein the timing advance command comprises a first timing advance associated with a half-duplex (HD) mode and a second timing advance associated with a full-duplex (FD) mode; receiving an uplink signal, during the HD mode, adjusted by the first timing advance; and receiving the uplink signal, during the FD mode, adjusted by the second timing advance during an assigned FD mode window, wherein the second timing advance is different from the first timing advance.

Clause 55: The method of Clause 54, wherein the timing advance command is transmitted on at least one of: radio resource control (RRC) signaling, a medium access control-control element (MAC-CE), or downlink control information (DCI) signaling.

Clause 56: A method of wireless communication in a wireless communication network at a network access node, comprising: transmitting a timing advance command comprised of: a first timing advance associated with a half-duplex (HD) mode, and a second timing advance associated with a full-duplex (FD) mode; and receiving an uplink signal, during the HD mode, adjusted by the first timing advance; and receiving the uplink signal, during the FD mode, adjusted by the second timing advance, wherein the second timing advance is different from the first timing advance.

Clause 57: The method of Clause 56, wherein the transmitting the timing advance command further comprises, transmitting the timing advance command in at least one of: radio resource control (RRC) signaling, a medium access control-control element (MAC-CE), or downlink control information (DCI) signaling.

Clause 58: A method of wireless communication in a wireless communication network at a network access node, comprising: transmitting a timing advance command to a user equipment (UE), wherein the timing advance command comprises a timing advance and a delta value; receiving an uplink signal, during the HD mode, adjusted by the timing advance; and receiving the uplink signal, during the FD mode, adjusted by the timing advance and further adjusted by the delta value.

Clause 59: The method of Clause 59, wherein the timing advance command is transmitted on at least one of: radio resource control (RRC) signaling, a medium access control-control element (MAC-CE), or downlink control information (DCI) signaling.

Clause 60: An apparatus, comprising: transceiver; a memory; and a processor communicatively coupled to the transceiver and the memory, wherein the processor and the memory are configured to perform a method in accordance with any one of Clauses 1-59.

Clause 61: An apparatus, comprising means for performing a method in accordance with any one of Clauses 1-59.

Clause 62: A non-transitory computer-readable medium comprising instructions executable by one or more processors of an apparatus to perform a method in accordance with any one of Clauses 1-59.

Clause 63: A computer program product embodied on a computer-readable storage medium comprising code for performing a method in accordance with any one of Clauses 1-59.

Additional Considerations

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-33 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in any one or more of FIGS. 1-33 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. similarly, the construct "a and/or b" is intended to cover a; b; and a and b. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, performed by a base station, for timing alignment of signals in a wireless communication system, the method comprising:

determining a user equipment (UE) in the wireless communication system is operating in a full-duplex (FD) mode with the base station; and sending a timing advance (TA) indication for the UE, wherein the TA indication indicates a selection of one of a fixed TA value or a TA value range to be used by the UE while operating in the FD mode, and wherein an applied TA value to be applied at the UE is configured to be in a range of TA values based on the fixed TA value and a time duration of a cyclic prefix (CP) value used in the wireless communication system, and wherein the method further comprises:

determining the applied TA value based on the fixed TA value and the time duration of the CP value according to a first relationship: the fixed TA value–CP≤the applied TA value≤the fixed TA value; or determining the applied TA value based on the fixed TA value, the time duration of the CP value, and a delay (d1) according to a second relationship: the fixed TA value–CP–d1≤the applied TA value≤the fixed TA value–d1, wherein d1 is a self-interference propagation delay associated with a downlink beam and an uplink beam; or determining the applied TA value based on the fixed TA value, the time duration of the CP value, and a delay spread (DS) of a downlink propagation delay time according to a fourth relationship: the fixed TA value–CP+DS≤the applied TA value≤the fixed TA value; or determining the applied TA value based on the fixed TA value, the time duration of the CP value, and the delay spread DS of the downlink delay time according to a fourth relationship: the fixed TA value–CP–d1+DS≤the applied TA value≤the fixed TA value–d1, wherein d1 is the self-interference propagation delay associated with the downlink beam and the uplink beam.

2. The method of claim 1, comprising determining the applied TA value based on the fixed TA value and the time duration of the CP value according to the first relationship: the fixed TA value–CP≤the applied TA value≤the fixed TA value.

3. The method of claim 2, further comprising determining the applied TA value based on a correction factor ($\delta$), wherein the applied TA value=the fixed TA value$-\delta$ and the $\delta$ is bounded by the range from zero to the time duration of the CP value where $\delta=[0, CP]$.

4. The method of claim 1, comprising determining the applied TA value based on the fixed TA value, the time duration of the CP value, and a delay (d1) according to the second relationship: the fixed TA value$-CP-d1 \leq$ the applied TA value$\leq$ the fixed TA value$-d1$, wherein d1 is the self-interference propagation delay associated with the downlink beam and the uplink beam.

5. The method of claim 1, comprising determining the applied TA value based on the fixed TA value, the time duration of the CP value, and the delay spread (DS) of the downlink propagation delay time according to the third relationship: the fixed TA value$-CP+DS \leq$ the applied TA value$\leq$ the fixed TA value.

6. The method of claim 5, further comprising determining the applied TA value based on a correction factor ($\delta$), wherein the applied TA value=the fixed TA value$-\delta$ and the $\delta$ is bounded by the range from zero to the time duration of the CP value less the delay spread DS where $\delta=[0, CP-DS]$.

7. The method of claim 1, comprising determining the applied TA value based on the fixed TA value, the time duration of the CP value, and the delay spread DS of the downlink delay time according to the fourth relationship: the fixed TA value$-CP-d1+DS \leq$ the applied TA value$\leq$ the fixed TA value$-d1$, wherein d1 is the self-interference propagation delay associated with the downlink beam and the uplink beam.

8. A method, performed by a user equipment (UE), for timing alignment of signals in a wireless communication system, the method comprising:
  receiving, from a base station, a timing advance (TA) indication for the UE,
  wherein the TA indication indicates a selection of one of a fixed TA value or a TA value range to be used by the UE while operating in a full-duplex (FD) mode; and
  transmitting one or more uplink signals to the base station at a timing advance based on the fixed TA value or the TA value range,
  wherein an applied TA value to be applied by the UE is configured to be in a range of TA values based on the fixed TA value and a time duration of a cyclic prefix (CP) value used in the wireless communication system, and
  wherein the method comprises:
    determining the applied TA value based on the fixed TA value and the time duration of the CP value according to a first relationship: the fixed TA value$-CP \leq$ the applied TA value$\leq$ the fixed TA value; or
    determining the applied TA value based on the fixed TA value, the time duration of the CP value, and a delay (d1) according to a second relationship: the fixed TA value$-CP-d1 \leq$ the applied TA value$\leq$ the fixed TA value$-d1$, wherein d1 is a self-interference propagation delay associated with a downlink beam and an uplink beam; or
    determining the applied TA value based on the fixed TA value, the time duration of the CP value, and a delay spread (DS) of a downlink propagation delay time according to a third relationship: the fixed TA value$-CP+DS \leq$ the applied TA value$\leq$ the fixed TA value; or
    determining the applied TA value based on the fixed TA value, the time duration of the CP value, and the delay spread DS of the downlink delay time according to a fourth relationship: the fixed TA value$-CP-d1+DS \leq$ the applied TA value$\leq$ the fixed TA value$-d1$, wherein d1 is the self-interference propagation delay associated with the downlink beam and the uplink beam.

9. The method of claim 8, further comprising determining the applied TA value based on the fixed TA value and the time duration of the CP value according to the first relationship: the fixed TA value$-CP \leq$ the applied TA value$\leq$ the fixed TA value.

10. The method of claim 9, further comprising determining the applied TA value based on a correction factor ($\delta$), wherein the applied TA value=the fixed TA value$-\delta$ and the $\delta$ is bounded by the range from zero to the time duration of the CP value where $\delta=[0, CP]$.

11. The method of claim 8, further comprising determining the applied TA value based on the fixed TA value, the time duration of the CP value, and a delay (d1) according to the second relationship: the fixed TA value$-CP-d1 \leq$ the applied TA value$\leq$ the fixed TA value$-d1$, wherein d1 is the self-interference propagation delay associated with the downlink beam and the uplink beam.

12. The method of claim 8, comprising determining the applied TA value based on the fixed TA value, the time duration of the CP value, and the delay spread (DS) of the downlink propagation delay time according to the third relationship: the fixed TA value$-CP+DS \leq$ the applied TA value$\leq$ the fixed TA value.

13. The method of claim 12, further comprising determining the applied TA value based on a correction factor ($\delta$), wherein the applied TA value=the fixed TA value$-\delta$ and the $\delta$ is bounded by the range from zero to the time duration of the CP value less the delay spread DS where $\delta=[0, CP-DS]$.

14. The method of claim 8, comprising determining the applied TA value based on the fixed TA value, the time duration of the CP value, and the delay spread DS of the downlink delay time according to the fourth relationship: the fixed TA value$-CP-d1+DS \leq$ the applied TA value$\leq$ the fixed TA value$-d1$, wherein d1 is the self-interference propagation delay associated with the downlink beam and the uplink beam.

15. A user equipment (UE) in a wireless communication system, comprising one or more processors coupled to memory and configured to:
  receive, from a base station, a timing advance (TA) indication for the UE, wherein the TA indication indicates a selection of one of a fixed TA value or a TA value range to be used by the UE while operating in a full-duplex (FD) mode; and
  transmit one or more uplink signals to the base station at a timing advance based on the fixed TA value or the TA value range,
  wherein an applied TA value to be applied by the UE is configured to be in a range of TA values based on the fixed TA value and a time duration of a cyclic prefix (CP) value used in the wireless communication system, and
  wherein the one or more processors are configured to:
    determine the applied TA value based on the fixed TA value and the time duration of the CP value according to a first relationship: the fixed TA value$-CP \leq$ the applied TA value$\leq$ the fixed TA value; or
    determine the applied TA value based on the fixed TA value, the time duration of the CP value, and a delay (d1) according to a second relationship: the fixed TA value$-CP-d1 \leq$ the applied TA value$\leq$ the fixed TA value−d1, wherein d1 is a self-interference propagation delay associated with a downlink beam and an uplink beam; or determine the applied TA value based on the fixed TA value, the time duration of the CP value, and a delay spread (DS) of a downlink propagation delay time according to a third relationship: the fixed TA value−CP+DS≤the applied TA value≤the fixed TA value; or determine the applied TA value based on the fixed TA value, the time duration of the CP value, and the delay spread DS of the downlink delay time according to a fourth relationship: the fixed TA value−CP−d1+DS≤the applied TA value≤the fixed TA value−d1, wherein d1 is the self-interference propagation delay associated with the downlink beam and the uplink beam.

16. The UE of claim 15, wherein the one or more processors are configured to determine the applied TA value based on the fixed TA value and the time duration of the CP value according to the first relationship: the fixed TA value−CP≤the applied TA value≤the fixed TA value.

17. The UE of claim 16, wherein the one or more processors are configured to determine the applied TA value based on a correction factor (δ), wherein the applied TA value=the fixed TA value−δ and the δ is bounded by the range from zero to the time duration of the CP value where δ=[0,CP].

18. The UE of claim 15, wherein the one or more processors are configured to determine the applied TA value based on the fixed TA value, the time duration of the CP value, and a delay (d1) according to the second relationship: the fixed TA value−CP−d1≤the applied TA value≤the fixed TA value−d1, wherein d1 is the self-interference propagation delay associated with the downlink beam and the uplink beam.

19. The UE of claim 15, wherein the one or more processors are configured to determine the applied TA value based on the fixed TA value, the time duration of the CP value, and the delay spread (DS) of the downlink propagation delay time according to the third relationship: the fixed TA value−CP+DS≤the applied TA value≤the fixed TA value.

20. The UE of claim 19, wherein the one or more processors are configured to determine the applied TA value based on a correction factor (δ), wherein the applied TA value=the fixed TA value−δ and the δ is bounded by the range from zero to the time duration of the CP value less the delay spread DS where δ=[0, CP−DS].

21. The UE of claim 15, wherein the one or more processors are configured to determine the applied TA value based on the fixed TA value, the time duration of the CP value, and the delay spread DS of the downlink delay time according to the fourth relationship: the fixed TA value−CP−d1+DS≤the applied TA value≤the fixed TA value−d1, wherein d1 is the self-interference propagation delay associated with the downlink beam and the uplink beam.

22. A base station in a wireless communication system, comprising one or more processors coupled to memory and configured to:

determine a user equipment (UE) in the wireless communication system is operating in a full-duplex (FD) mode with the base station; and send a timing advance (TA) indication for the UE, wherein the TA indication indicates a selection of one of a fixed TA value or a TA value range to be used by the UE while operating in the FD mode, and wherein an applied TA value to be applied at the UE is configured to be in a range of TA values based on the fixed TA value and a time duration of a cyclic prefix (CP) value used in the wireless communication system, and wherein the one or more processors are configured to:

determine the applied TA value based on the fixed TA value and the time duration of the CP value according to a first relationship: the fixed TA value−CP≤the applied TA value≤the fixed TA value; or determine the applied TA value based on the fixed TA value, the time duration of the CP value, and a delay (d1) according to a second relationship: the fixed TA value−CP−d1≤the applied TA value≤the fixed TA value−d1, wherein d1 is a self-interference propagation delay associated with a downlink beam and an uplink beam; or determine the applied TA value based on the fixed TA value, the time duration of the CP value, and a delay spread (DS) of a downlink propagation delay time according to a fourth relationship: the fixed TA value−CP+DS≤the applied TA value≤the fixed TA value; or determine the applied TA value based on the fixed TA value, the time duration of the CP value, and the delay spread DS of the downlink delay time according to a fourth relationship: the fixed TA value−CP−d1+DS≤the applied TA value≤the fixed TA value−d1, wherein d1 is the self-interference propagation delay associated with the downlink beam and the uplink beam.

23. The base station of claim 22, wherein the one or more processors are configured to determine the applied TA value based on the fixed TA value and the time duration of the CP value according to the first relationship: the fixed TA value−CP≤the applied TA value≤the fixed TA value.

24. The base station of claim 23, wherein the one or more processors are configured to determine the applied TA value based on a correction factor (δ), wherein the applied TA value=the fixed TA value−δ and the δ is bounded by the range from zero to the time duration of the CP value where δ=[0,CP].

25. The base station of claim 22, wherein the one or more processors are configured to determine the applied TA value based on the fixed TA value, the time duration of the CP value, and a delay (d1) according to the second relationship: the fixed TA value−CP−d1≤the applied TA value≤the fixed TA value−d1, wherein d1 is the self-interference propagation delay associated with the downlink beam and the uplink beam.

26. The base station of claim 22, wherein the one or more processors are configured to determine the applied TA value based on the fixed TA value, the time duration of the CP value, and the delay spread (DS) of the downlink propagation delay time according to the third relationship: the fixed TA value−CP+DS≤the applied TA value≤the fixed TA value.

27. The base station of claim 26, wherein the one or more processors are configured to determine the applied TA value based on a correction factor (δ), wherein the applied TA value=the fixed TA value−δ and the δ is bounded by the range from zero to the time duration of the CP value less the delay spread DS where δ=[0, CP−DS].

28. The base station of claim 22, wherein the one or more processors are configured to determine the applied TA value based on the fixed TA value, the time duration of the CP value, and the delay spread DS of the downlink delay time according to the fourth relationship: the fixed TA value−CP−d1+DS≤the applied TA value≤the fixed TA value−d1, wherein d1 is the self-interference propagation delay associated with the downlink beam and the uplink beam.

\* \* \* \* \*